INVENTOR
Carl Wilmer Chanlund
BY
Bacon & Thomas
ATTORNEYS

INVENTOR
Carl Wilmer Chanlund
BY Bacon & Thomas
ATTORNEYS

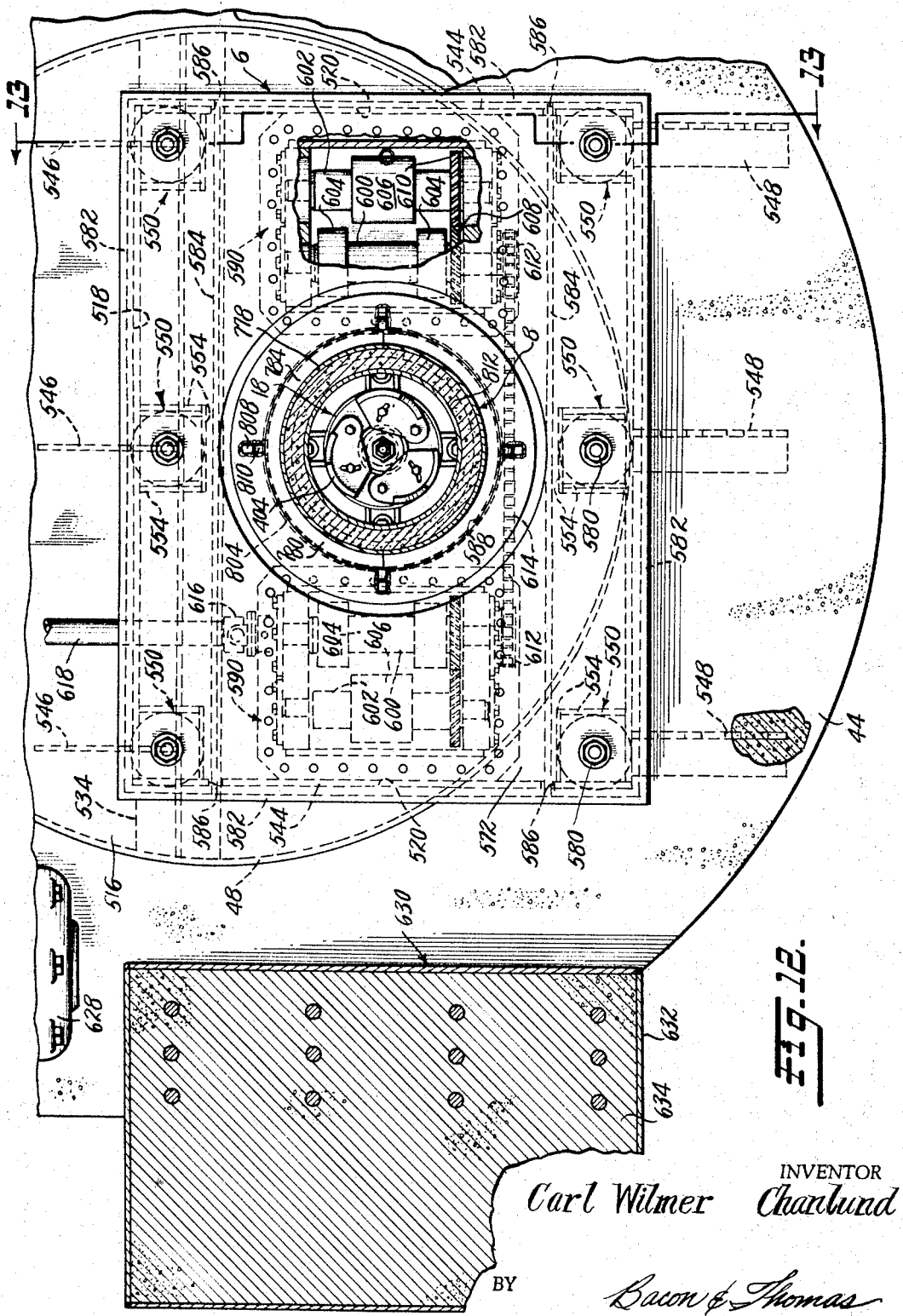

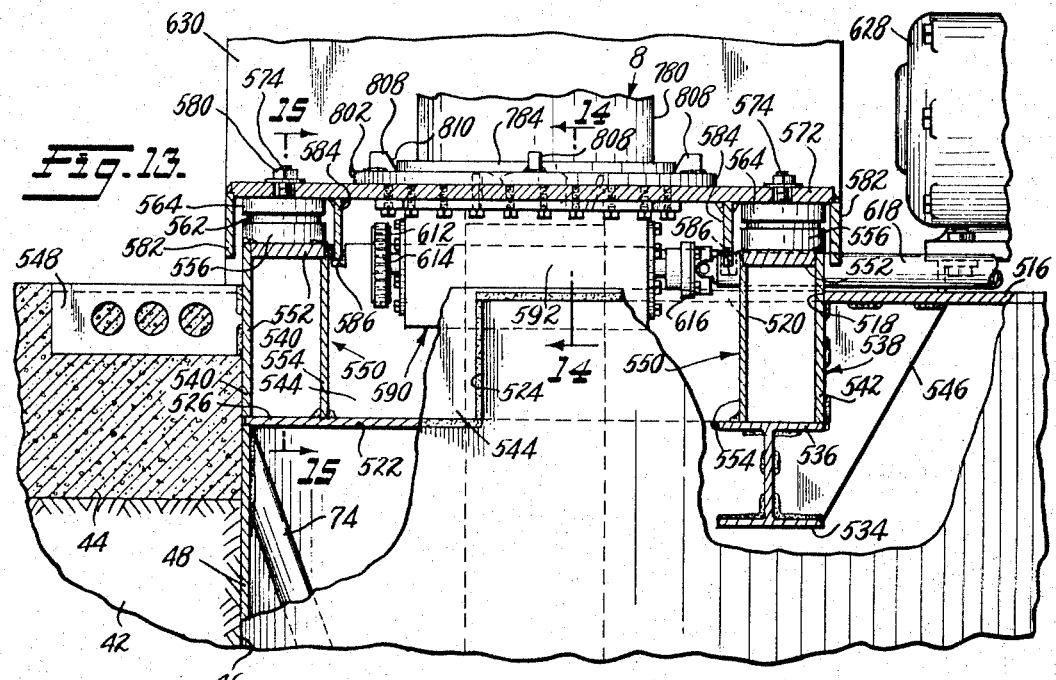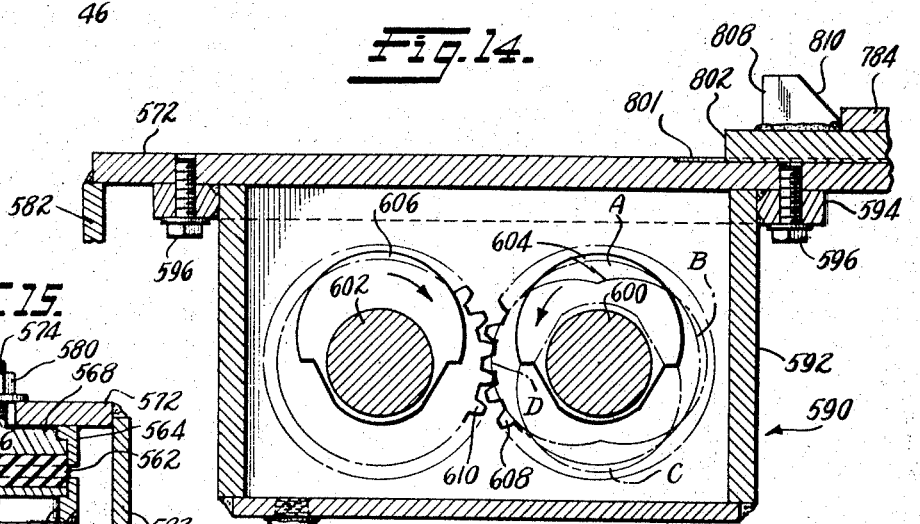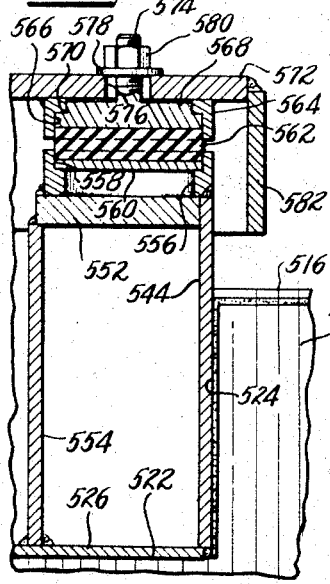

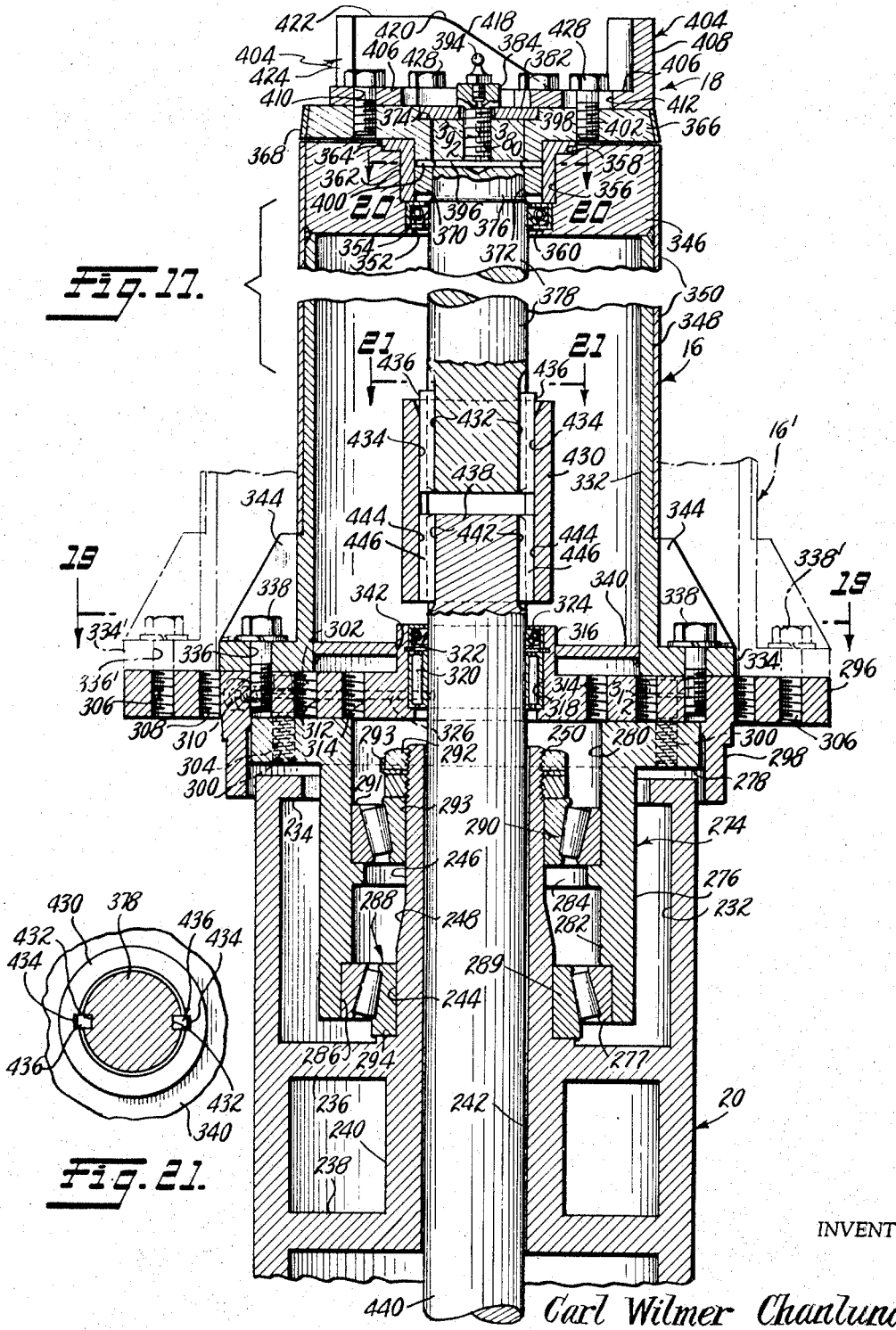

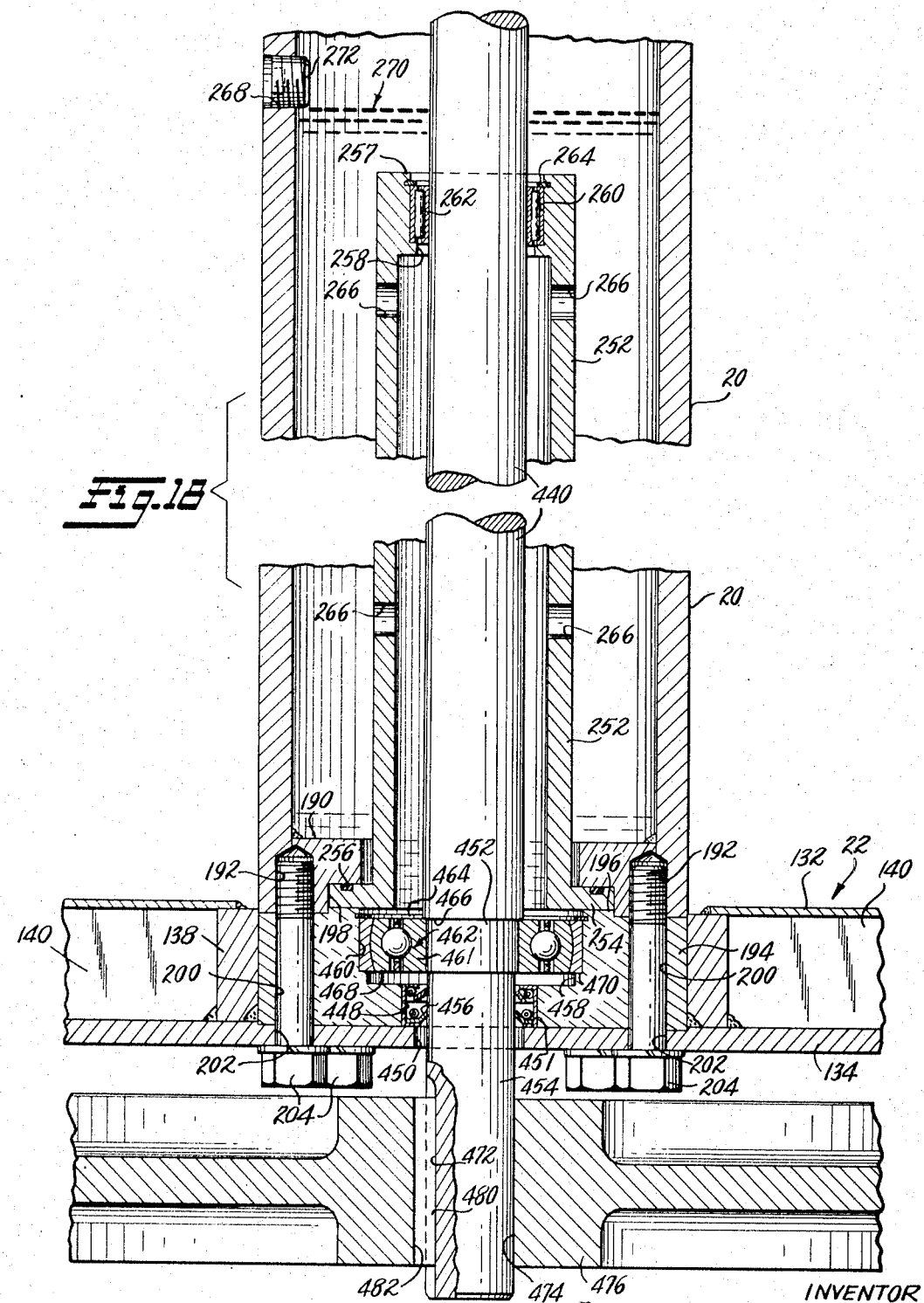

July 8, 1969
C. W. CHANLUND
3,453,706
CONCRETE PIPE MAKING MACHINE WITH NOVEL PACKING
HEAD ROTATABLY MOUNTED ON CORE FOLLOWER
AND MOLD INDEXING MECHANISM
Filed Nov. 10, 1964
Sheet 14 of 23
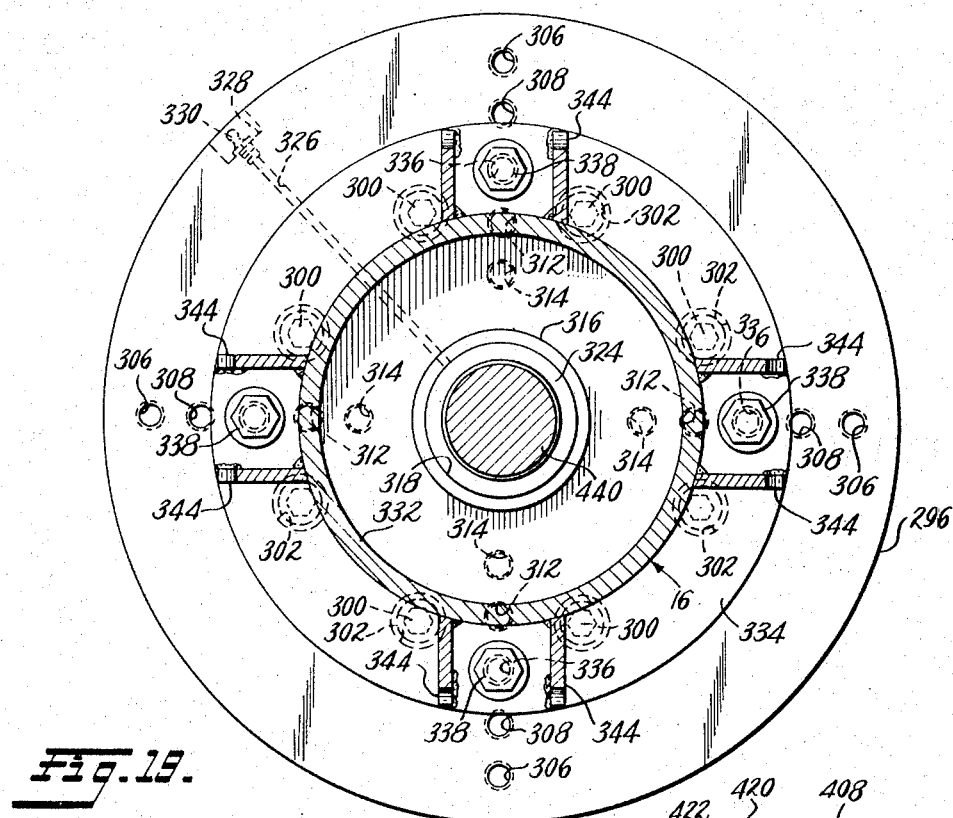
Fig.19.
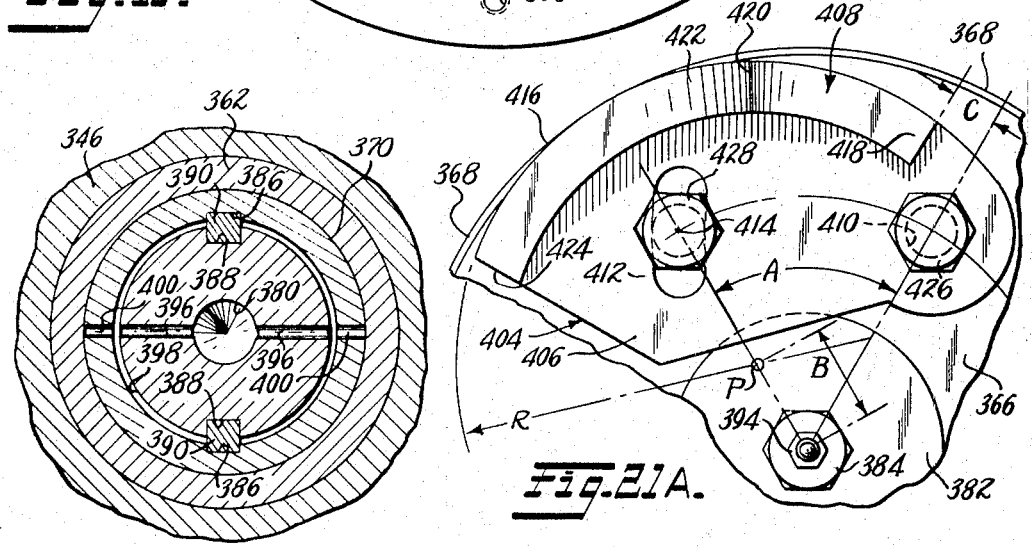
Fig.20.
Fig.21A.
INVENTOR
Carl Wilmer Chanlund
BY Bacon & Thomas
ATTORNEYS

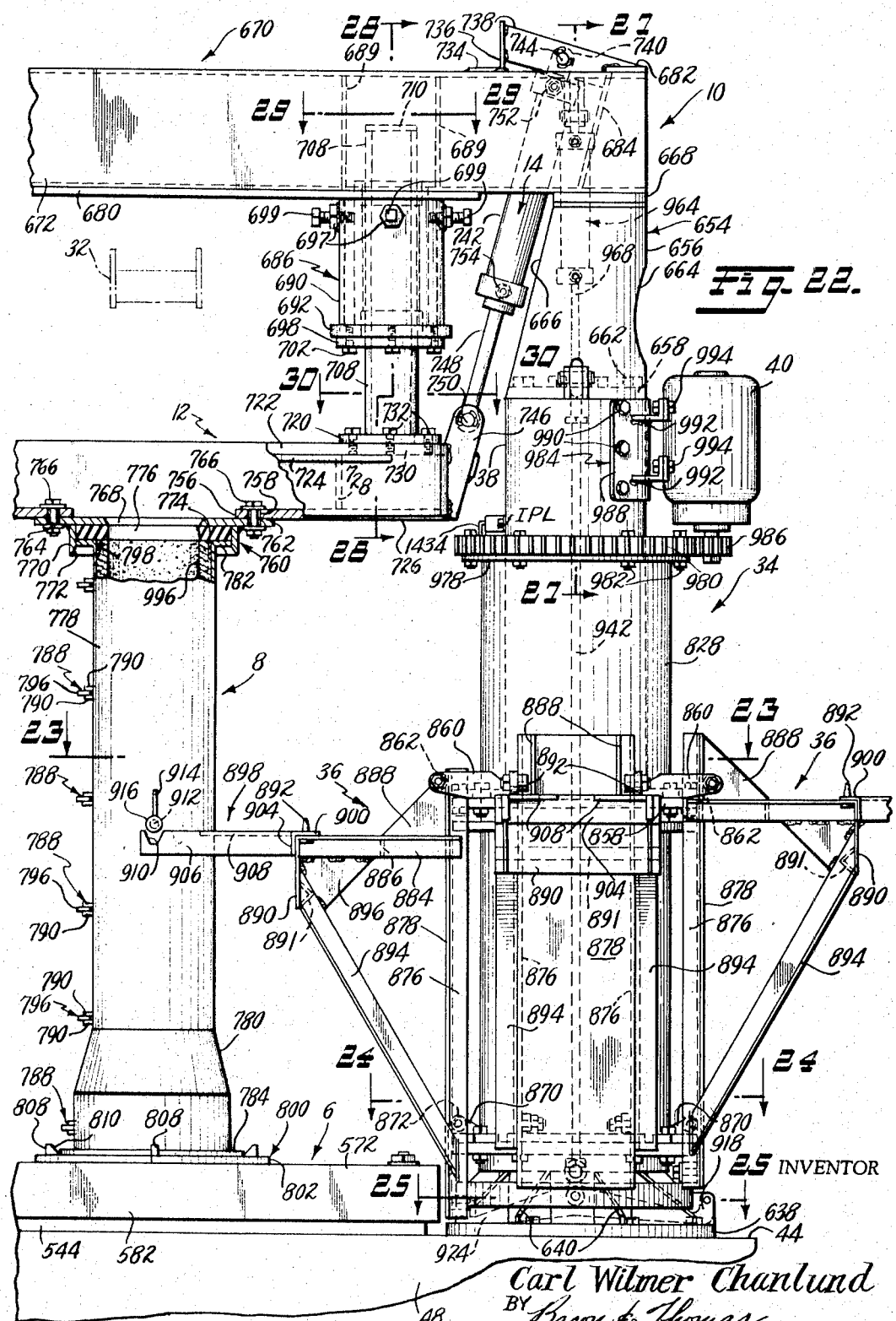

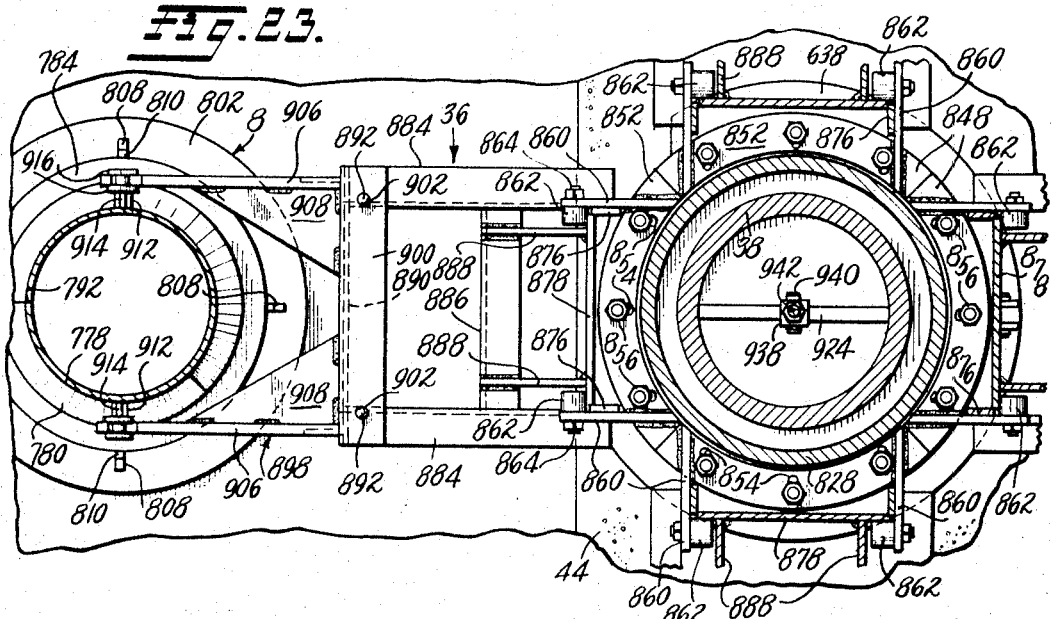
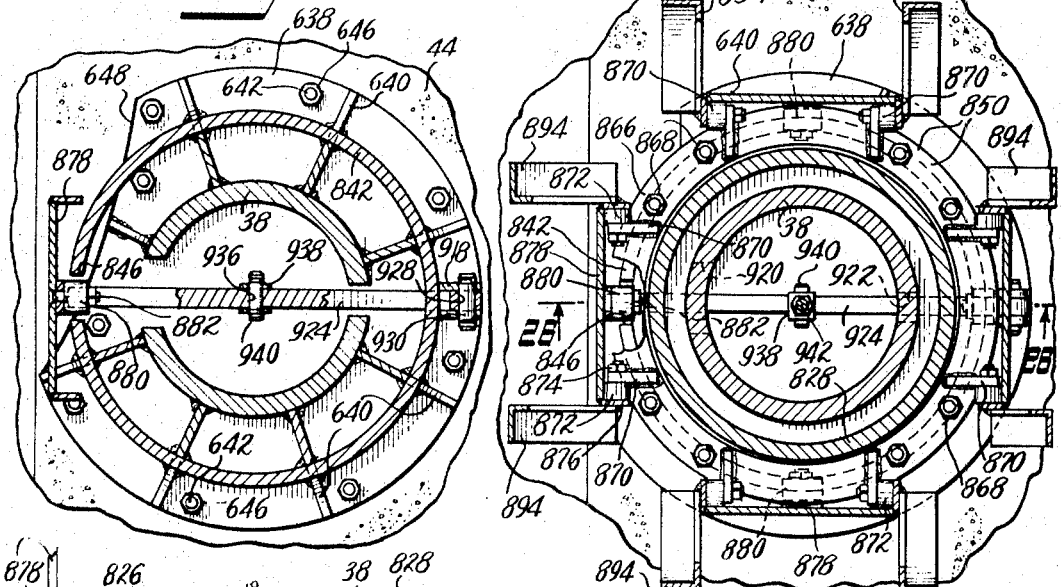
INVENTOR
Carl Wilmer Chanlund
BY
Bacon & Thomas
ATTORNEYS

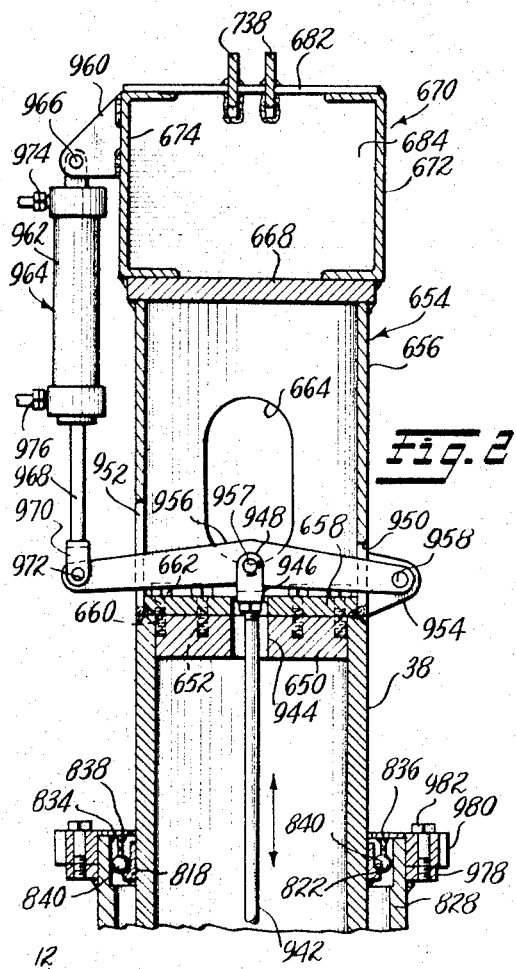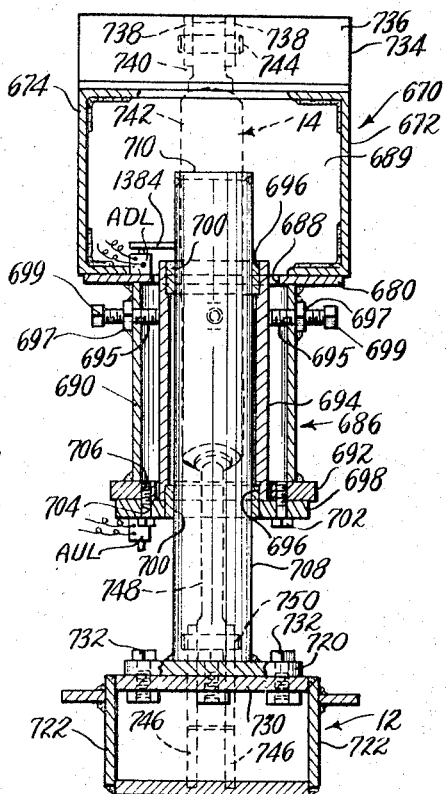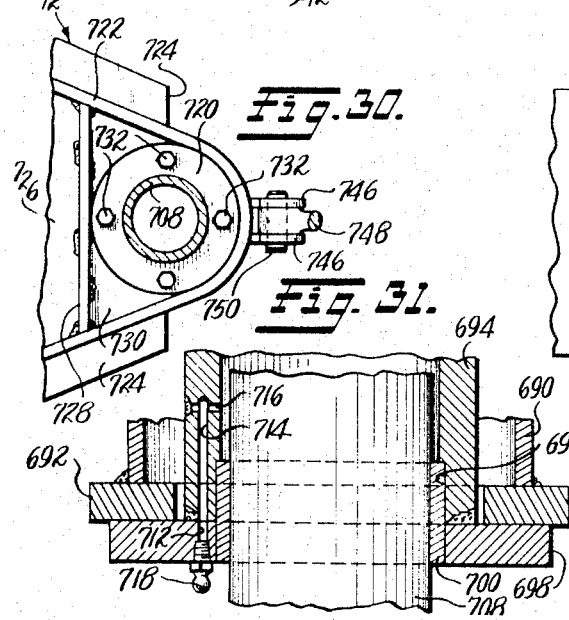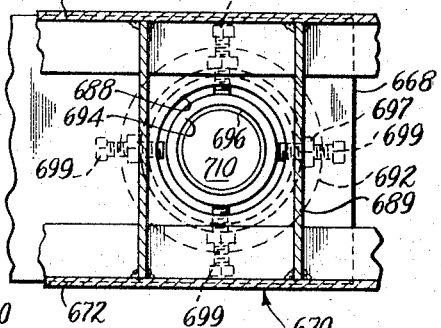

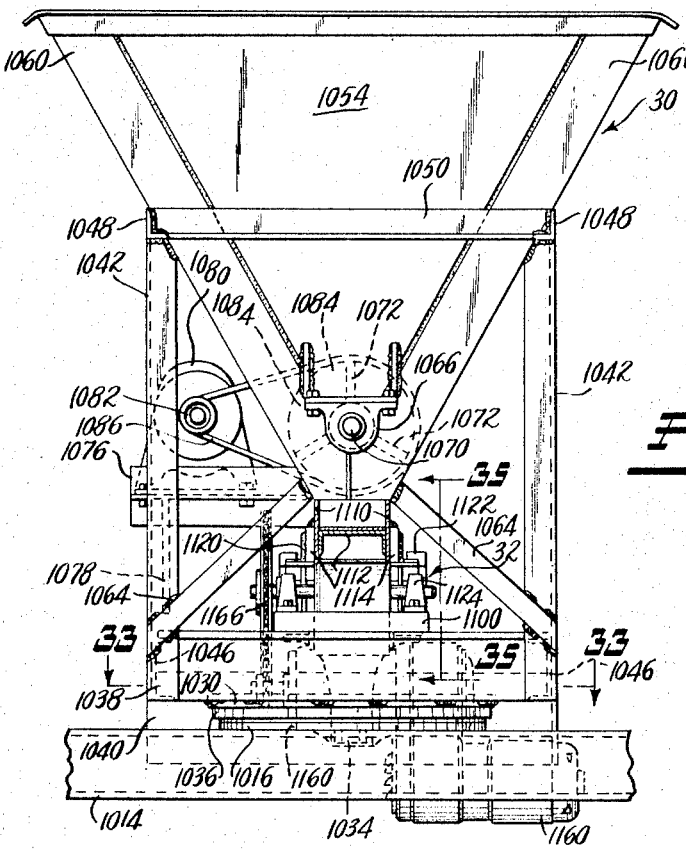
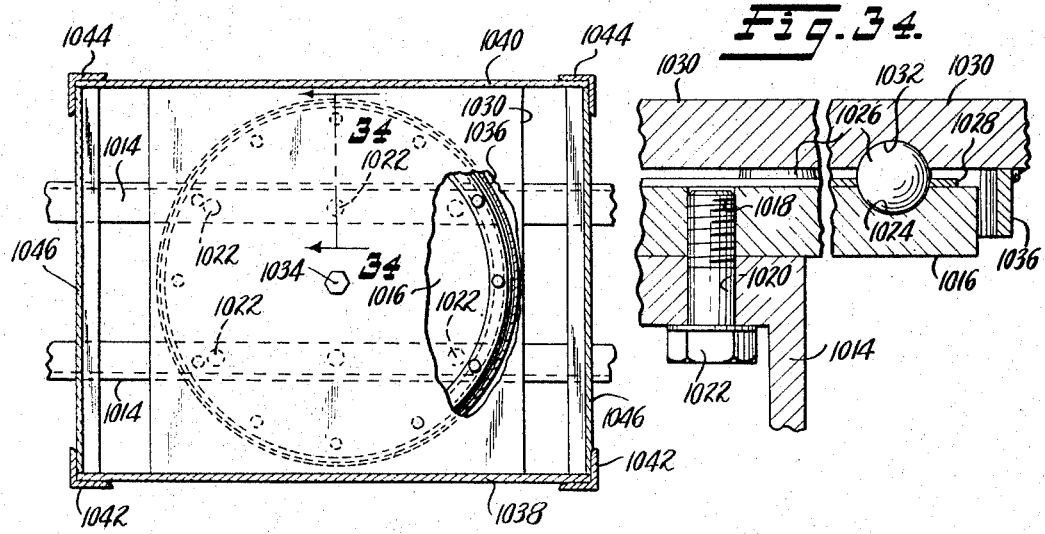

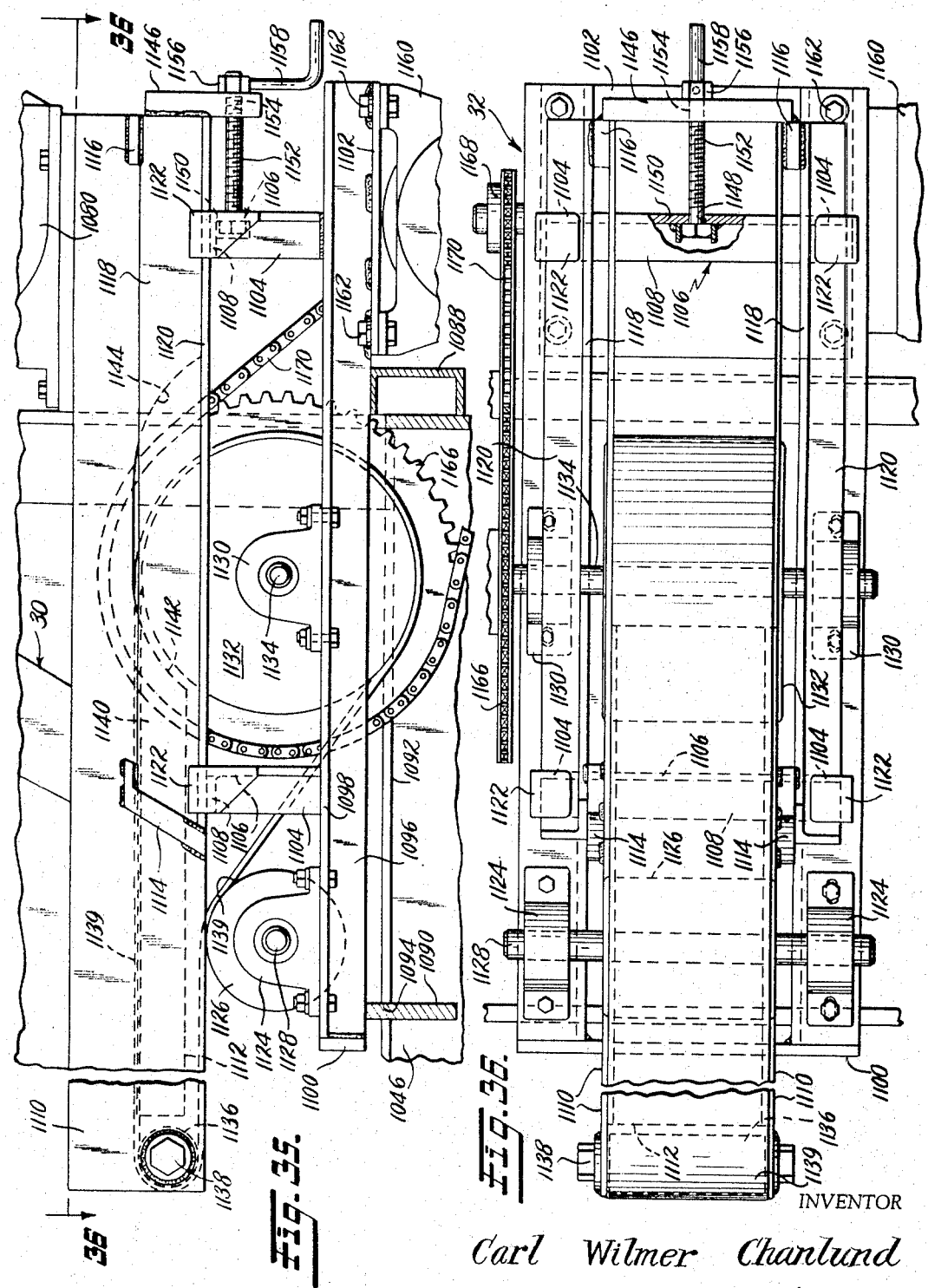

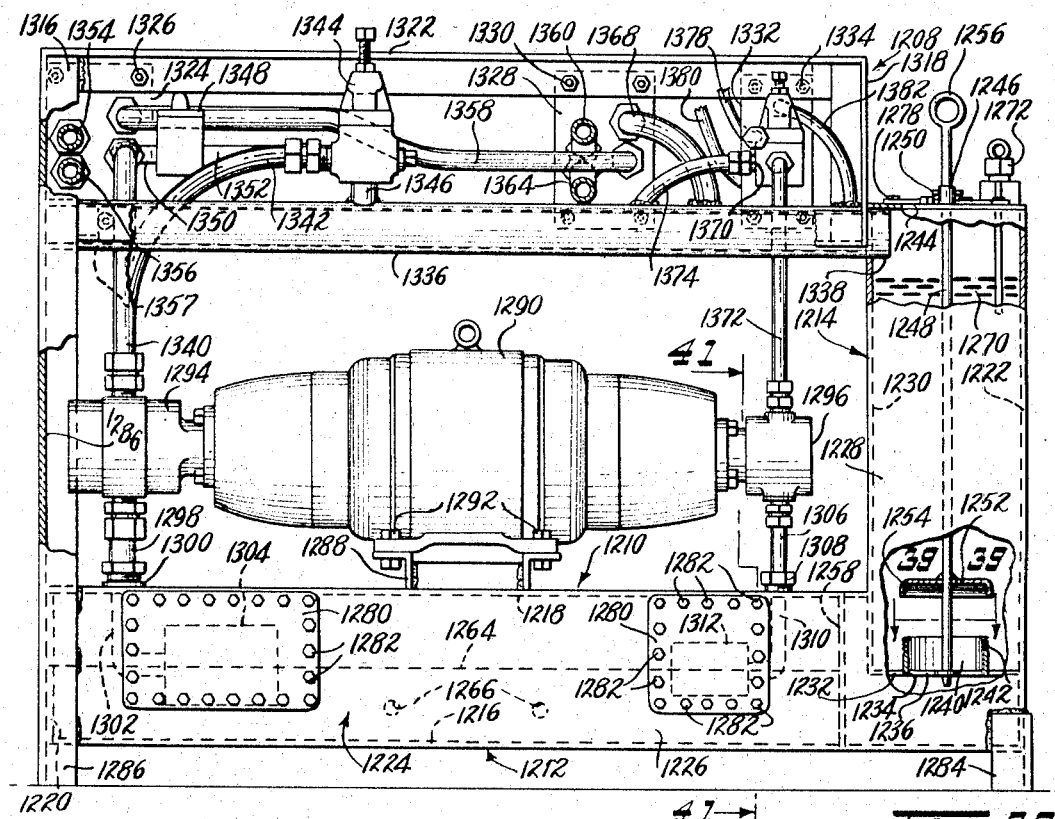
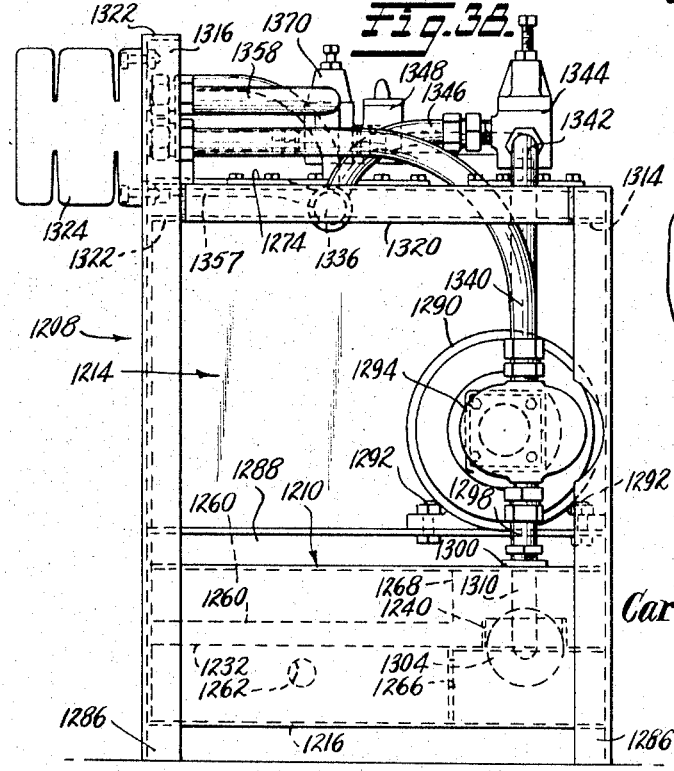
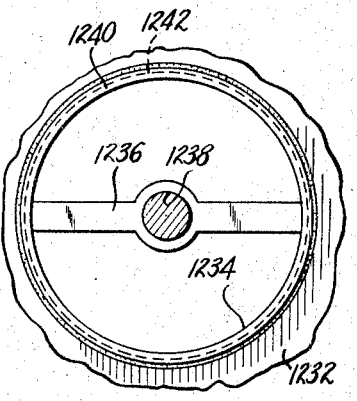

INVENTOR
Carl Wilmer Chanlund
BY Bacon & Thomas
ATTORNEYS

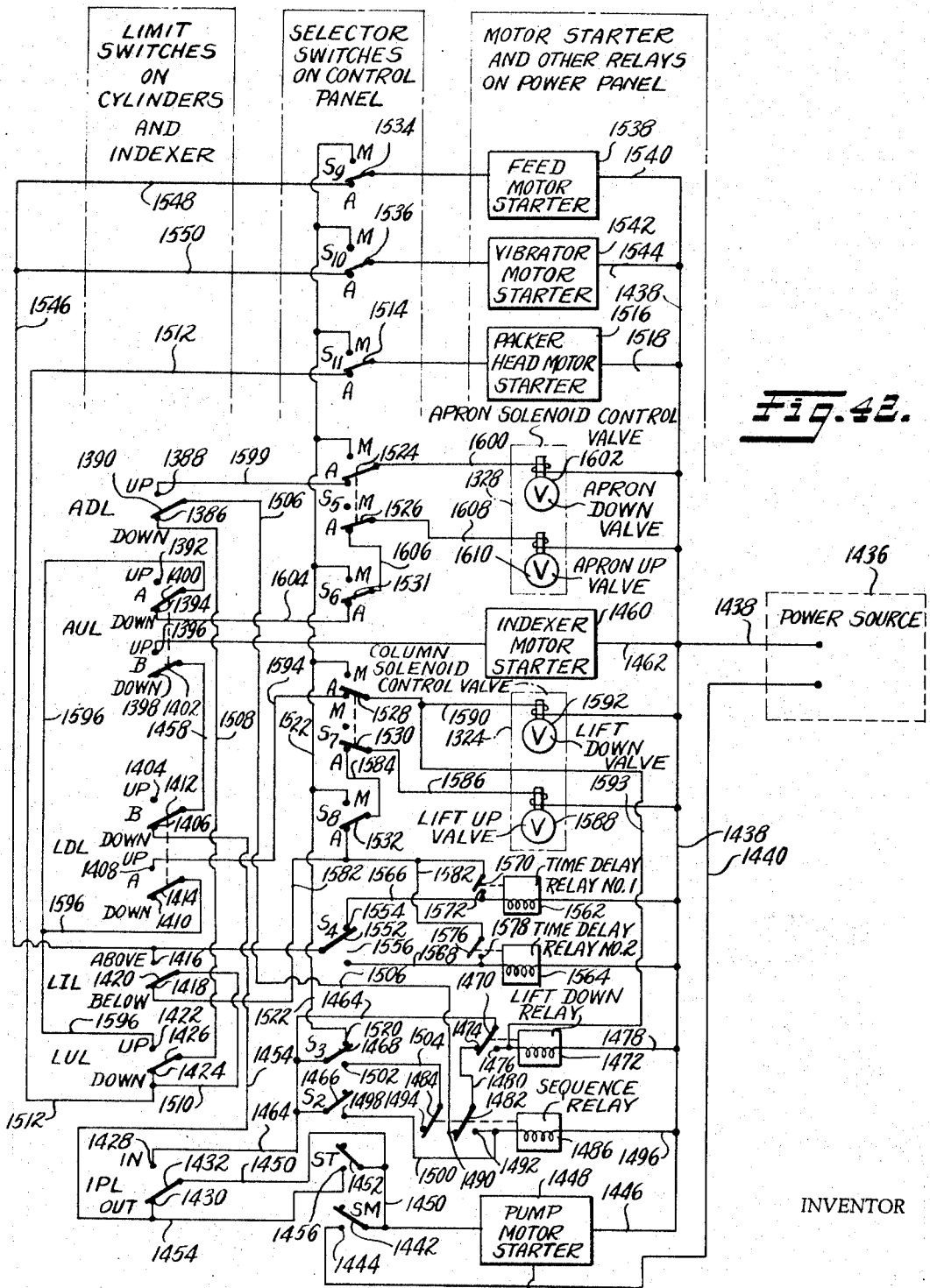

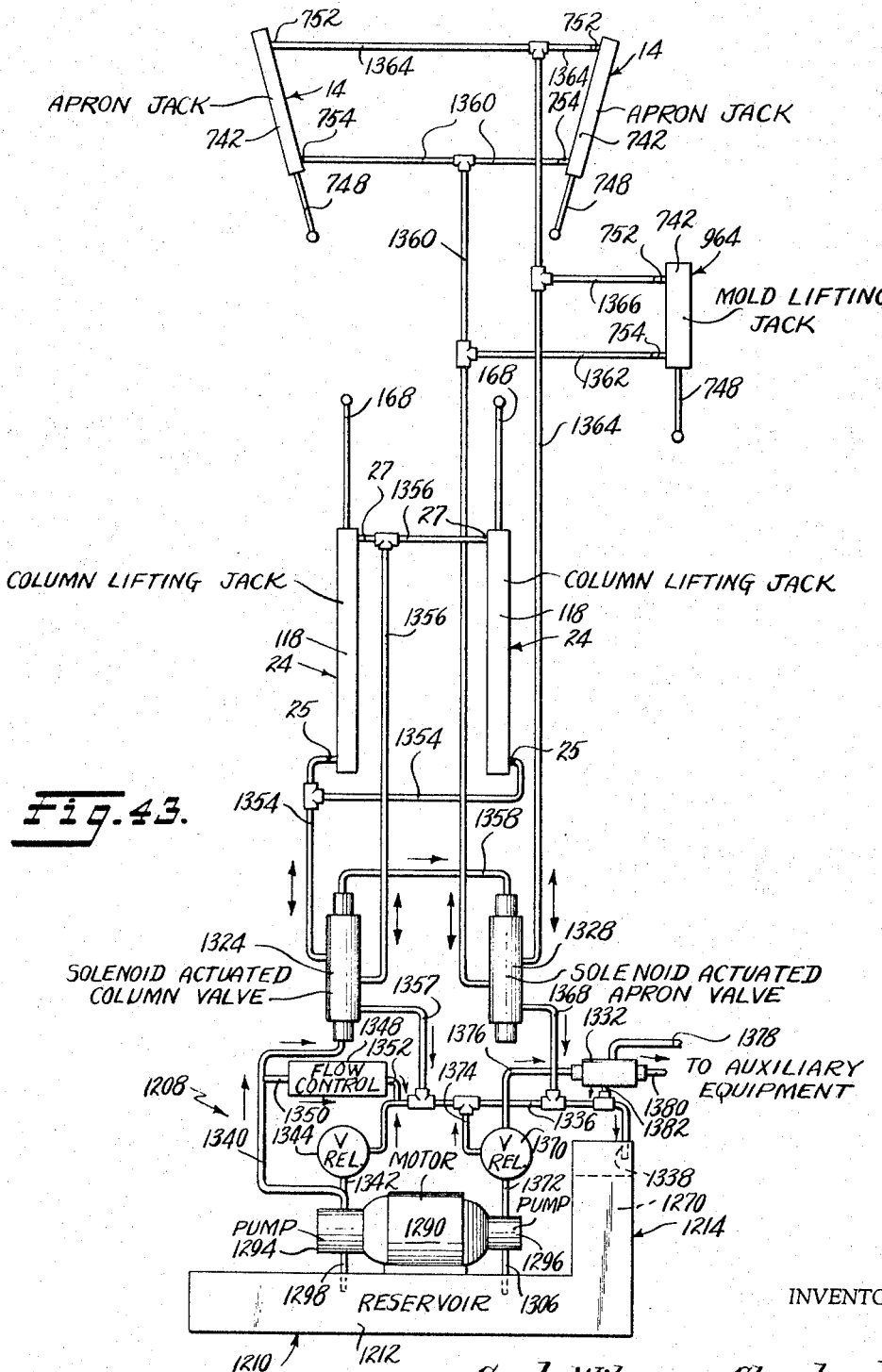

United States Patent Office 3,453,706
Patented July 8, 1969

3,453,706
CONCRETE PIPE MAKING MACHINE WITH NOVEL PACKING HEAD ROTATABLY MOUNTED ON CORE FOLLOWER AND MOLD INDEXING MECHANISM
Carl Wilmer Chanlund, Nampa, Idaho, assignor, by mesne assignments, to Pre-Cast Concrete Products, Limited, Santa Ana, Calif., a partnership
Filed Nov. 10, 1964, Ser. No. 410,078
Int. Cl. B28b 1/00, 7/00
U.S. Cl. 25—36         36 Claims This invention relates generally to an apparatus for making hollow tubular sections of circular and non-circular external configuration.

More particularly, the invention relates to an improved apparatus for automatically making concrete pipe, either plain or reinforced, rapidly and in a manner to provide a product having a homogeneous, dense wall structure and accurate dimensions.

Concrete pipe presently is in widespread use for drains, storm sewers, water conduits, and the like. It is desirable that concrete pipe utilized for such purposes have a homogeneous wall structure of high strength, that it have a longitudinally smooth bore, and that it be relatively impervious to the passage of fluid. In addition, modern bell and spigot joints utilized to connect sections of concrete pipe require that the dimensions of the pipe be held within close tolerances for proper sealing and operation of the joint structure. The present invention is directed to an apparatus for automatically and rapidly producing concrete pipe within close dimensional tolerances, and which has a compacted, dense, high-strength homogeneous wall structure.

In practicing the present invention, a mold for a pipe or other element is positioned to rest vertically on a vibration table, and is clamped in cushioned position by an apron operable by hydraulic jacks. The vibration table is designed to vibrate the mold, and includes vibrator units which can be adjusted to provide different amplitudes and directions of vibration; normally, the vibrator units are adjusted to vibrate the mold only along its vertical axis.

After the mold is clamped in a vertical position to the vibration table, a rotatable packing head, mounted atop a separately rotatable core, is moved upwardly through an opening in the vibration table into the lower end of the mold, where it is caused to pause momentarily. The packing head includes a plurality of upstanding wings, and is constructed to rotate at a speed relative to the combined vibration, pressure, feed and packing forces required to produce a dense structure. A relatively dry, or no-slump, concrete mixture is then preferably gradually fed into the upper end of the mold from a novel batching and charger apparatus, and falls vertically within the mold into contact with the rapidly rotating packing head. The wings on the rotating packing head distribute the concrete mixture outwardly into contact with the cylindrical internal wall of the mold.

While concrete mixture is being fed into the mold the vibration table is started, and after the lower end of the form is adequately filled and packed, the rotating packing head and the core upon which it is mounted are slowly and continuously elevated, and are moved through the length of the vertical mold until the packing head has reached the upper end thereof. The actions of the rotating packing head and the core compact the mixture and shape the interior of the pipe, and the vibrations produced by the vibration table further compact the mixture into a homogeneous structure of substantially uniform density, and together with the mold produce a pipe section with dimensions held to within close tolerances. If desired, steel rod, mesh or other reinforcing members can be placed within the mold before pouring the concrete mixture therein, the apparatus of the invention being effective to produce a reinforced pipe section without placing undesirable torsional stresses on such reinforcing elements during the manufacturing operation.

After the mold has been filled, the vibration table is stopped and allowed to come to a complete halt. The core, with the packing head thereon, is then withdrawn from the mold. After withdrawal of the core the filled mold is removed from the table and an empty mold is placed thereon, this being done by the indexing and transfer mechanism. The empty mold is then clamped to the table, and the next manufacturing cycle begun. The filled mold is removed from the indexer mechanism, and is replaced by an empty mold.

The pipe making machine of the invention, as has been stated, is designed for automatic operation, and can be operated through repeated cycles. Further, the control apparatus for the machine is such so that the operation of the machine can be halted at any step of the cycle, and further, is such that when the machine is again started it will commence operation at the step where it was halted. In addition, the control apparatus is designed to be operated in either an automatic or a manual mode, at the discretion of the operator.

The pipe making machine of the present invention is designed to repeatedly produce concrete pipe of uniform wall structure and high strength characteristics, and which has a smooth surface. Further, the machine will maintain dimensions of the molded product to within very close tolerances during manufacture, thus insuring that pipe sections produced thereby can be readily and easily joined together.

In the past, certain concrete pipe making machines have produced pipe with a radially inwardly directed, feathered rib at one or both ends thereof. These ribs, while usually small in radial extent, nevertheless have tended to cause restriction of flow, which in a long run of pipe can accumulate to objectionable values. The present machine does not form such a radial rib at the pipe ends, any projection that might occur from withdrawal of the core and packing head being axially directed, and hence incapable of restricting flow.

It is an object of the present invention to provide a machine for making tubular sections, including pipe, constructed to automatically and rapidly mold such sections with a homogeneous wall structure with dense, high strength characteristics, and which will mold such sections to within close dimensional tolerances.

Another object is to provide apparatus for making concrete pipe and other tubular sections having a homogeneous dense structure and high strength characteristics, a smooth internal and external finish, and which is substantially free of undesirable stresses.

A more specific object is to provide a concrete pipe making machine for producing reinforced concrete pipe having a dense wall structure with high strength characteristics, and which will produce such pipe without placing undesirable torsional stresses on the reinforcing material.

Still another object is to provide a machine for producing concrete pipe and the like having a substantially uniform internal diameter, and which has an internal surface free of any spiral or circumferentially extending ridges or markings.

It is also an object to provide a concrete pipe making machine for producing a dense, homogeneous pipe from a concrete mixture having a low water to cement ratio, to thereby produce a product of superior structural strength.

Another object is to provide a packing head and core constructed to uniformly distribute, shape and retain a concrete mixture within an outer encircling mold as said packing head and core are moved therethrough.

A further object is to provide a pipe making machine incorporating a vibration table for receiving and vibrating a mold, clamping means including a cushion for clamping said mold to said table; and a rotatable packing head and core assembly movable through said mold while it is clamped to the table, said rotatable packing head and core assembly and said vibration table being constructed to cooperate for uniformly distributing and compacting a concrete mixture placed within said mold.

A still further object is to provide a mold indexing and transfer apparatus for an automatic pipe making machine, and the like, constructed to successively, automatically and precisely position empty molds for receiving a concrete mixture and to automatically remove the filled molds.

It is also an object to provide a concrete mixture batching and charging apparatus for an automatic pipe making machine, and the like, constructed to automatically weigh out and mix a batch of concrete, and to transfer said mixture at a desired rate to a mold supported on the pipe making machine.

Another object is to provide a conveyor for a concrete batching apparatus, said conveyor including an endless conveyor belt, and being constructed to provide ready adjustment of the tension on said endless belt.

It is also an object to provide an automatic electrical control circuit for an automatic pipe making machine, constructed to control the operation of said machine and to automatically run it through a series of steps comprising an operating cycle, so that the machine can be halted at any step of a cycle and will resume at said step when the machine is restarted.

Other objects and many of the attendant advantages of the present invention will become readily apparent from the following detailed description when considered in connection with the accompanying drawings, wherein:

FIG. 1A is an enlarged, horizontal sectional view, taken along the line 1A—1A of FIG. 1, through an axially split pipe mold, showing one of the latches utilized for holding the mold in a closed position;

FIG. 3A is a top, plan view of the upper end of the well with the vibration table removed, showing the supporting structure for said vibration table;

FIG. 12 is an enlarged, fragmentary, horizontal sectional view, with certain parts broken away for clarity, taken on the line 12—12 of FIG. 5;

FIG. 13 is an enlarged, fragmentary, vertical sectional view through the vibration table, taken on the line 13—13 of FIG. 12;

FIG. 14 is an enlarged, fragmentary, vertical sectional view through one of the vibrator units, taken on the line 14—14 of FIG. 13, and showing by phantom lines different relative positions for the eccentric weights;

FIG. 15 is an enlarged, fragmentary, vertical sectional view through one of the resilient supporting legs for the vibration table, taken on the line 15—15 of FIG. 13;

FIG. 16 is a force diagram showing the resultant force directions obtainable from the vibration table by different relative arrangements of the eccentric vibrator weights of FIG. 13;

FIG. 17 is an enlarged, fragmentary, vertical sectional view of the packing head, the core, the upper portion of the supporting column, and the associated drive components, together with the adapter arrangement for receiving cores of different sizes for making correspondingly sized concrete pipe, said view being taken on the line 17—17 of FIG. 5;

FIG. 18 is an enlarged, fragmentary, vertical sectional view of the lower portion of the supporting column, showing the manner in which said column is secured to the lifting harness;

FIG. 19 is a horizontal, sectional view showing the adapter plate, taken on the line 19—19 of FIG. 17;

FIG. 20 is an enlarged, fragmentary, horizontal sectional view, taken on the line 20—20 of FIG. 17;

FIG. 21 is a view similar to FIG. 20, taken on the line 21—21 of FIG. 17;

FIG. 21A is an enlarged, fragmentary plan view of the packing head of FIG. 17, showing the geometric configuration and structure of one of the wings;

FIG. 22 is an enlarged, fragmentary elevational view, partly in section, of the mold indexing and transfer mechanism of the present invention;

FIG. 23 is an enlarged, fragmentary, horizontal sectional view, showing one of the pipe molds supported by one of the arms of the mold indexing and transfer mechanism, taken on the line 23—23 of FIG. 22;

FIG. 24 is an enlarged, fragmentary, horizontal sectional view, taken on the line 24—24 of FIG. 22;

FIG. 25 is an enlarged, fragmentary, horizontal sectional view, particularly showing one of the indexing rollers and the lifting arm associated therewith for raising the roller out of its indexing groove, said view being taken on the line 25—25 of FIG. 22;

FIG. 26 is a fragmentary, vertical sectional view through one of the indexing rollers and the lifting arm, as viewed on the line 26—26 of FIG. 24;

FIG. 27 is an enlarged, fragmentary, vertical sectional view showing the mechanism which actuates the lifting arm for raising the mold indexing and transfer mechanism, said view being taken on the line 27—27 of FIG. 22;

FIG. 28 is an enlarged, fragmentary, vertical sectional view through a guide for the apron utilized to apply pressure to the upper end of the pipe mold, taken on the line 28—28 of FIG. 22;

FIG. 29 is an enlarged, fragmentary, horizontal sectional view through the upper portion of the guide of FIG. 28, taken on the line 29—29 of FIG. 22;

FIG. 30 is an enlarged, fragmentary, horizontal sectional view illustrating details of the connection between the apron and one of the pair of piston rods for actuating said apron, taken on the line 30—30 of FIG. 22;

FIG. 31 is an enlarged, fragmentary, vertical sectional view, showing the lubricating passages for the apron cylinder guide;

FIG. 32 is a fragmentary, vertical elevational view, partially in section, of the charger unit of the machine, taken on the line 32—32 of FIG. 4;

FIG. 33 is a fragmentary, horizontal sectional view through the charging unit, taken on the line 33—33 of FIG. 32, and showing in particular the construction of the turntable;

FIG. 34 is an enlarged, vertical sectional view showing the arrangement of the ball bearing support for the turntable of the charger unit, taken on the line 34—34 of FIG. 33;

FIG. 35 is an enlarged, fragmentary, side elevational view of a portion of the charging conveyor, taken generally on the line 35—35 of FIG. 32;

FIG. 36 is a fragmentary, horizontal sectional view, taken on the line 36—36 of FIG. 5;

FIG. 37 is a side elevational view, partially in section, of the motor, pumps and operating fluid reservoir of the hydraulic unit for the pipe making machine;

FIG. 38 is an enlarged, elevational view of the hydraulic unit of the mechanism, as viewed from the left side of the apparatus shown in FIG. 37;

FIG. 39 is an enlarged, fragmentary, secitonal view, taken on the line 39—39 of FIG. 37;

FIG. 42 is a schematic wiring diagram of the electrical control circuit of the automatic pipe making machine of the present invention;

FIG. 43 is a schematic layout diagram of the hydraulic control system of the present invention.

Figure 1:
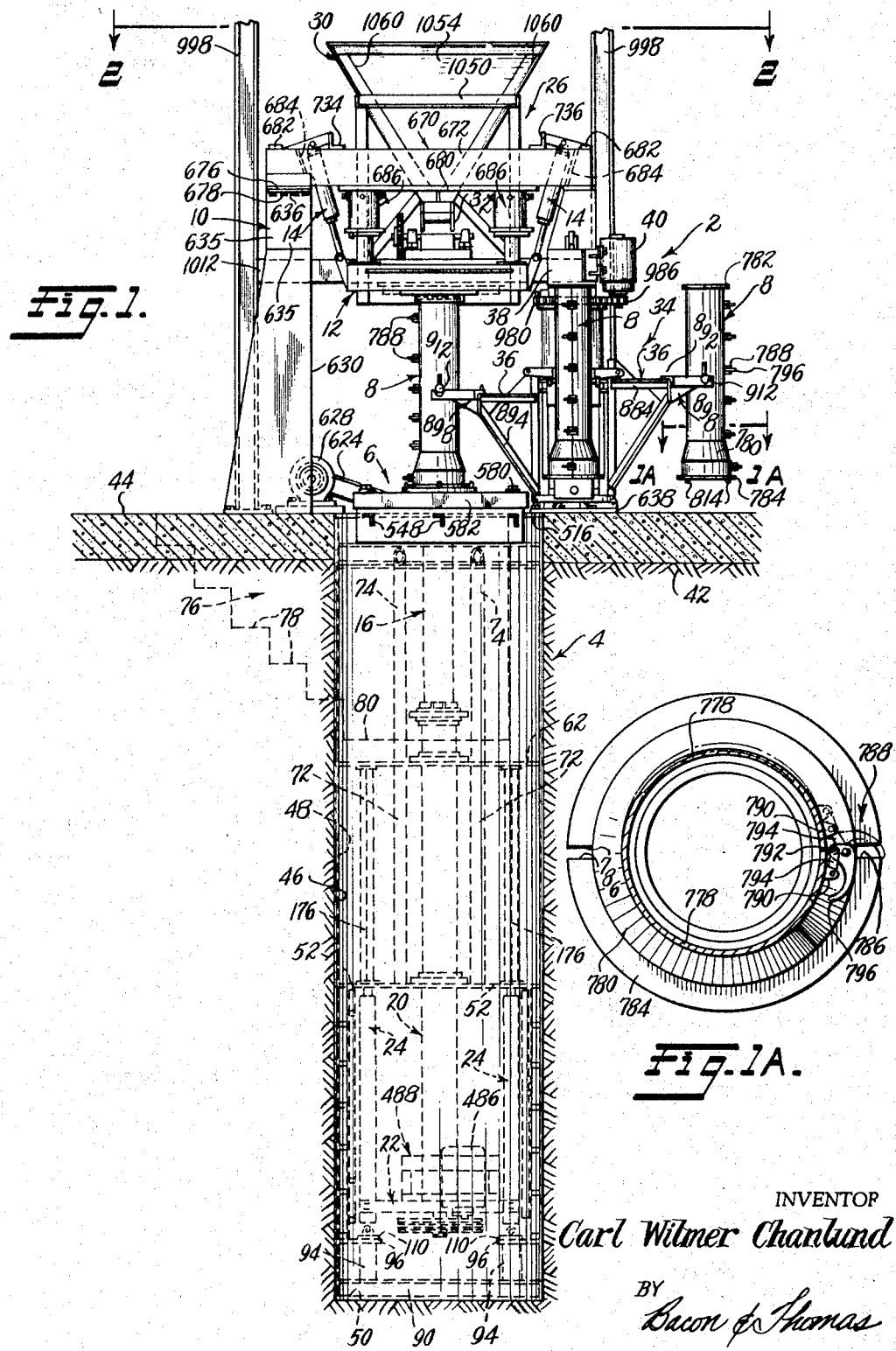
FIG. 1 is a fragmentary, front elevational view of the pipe making machine.
Figure 2:
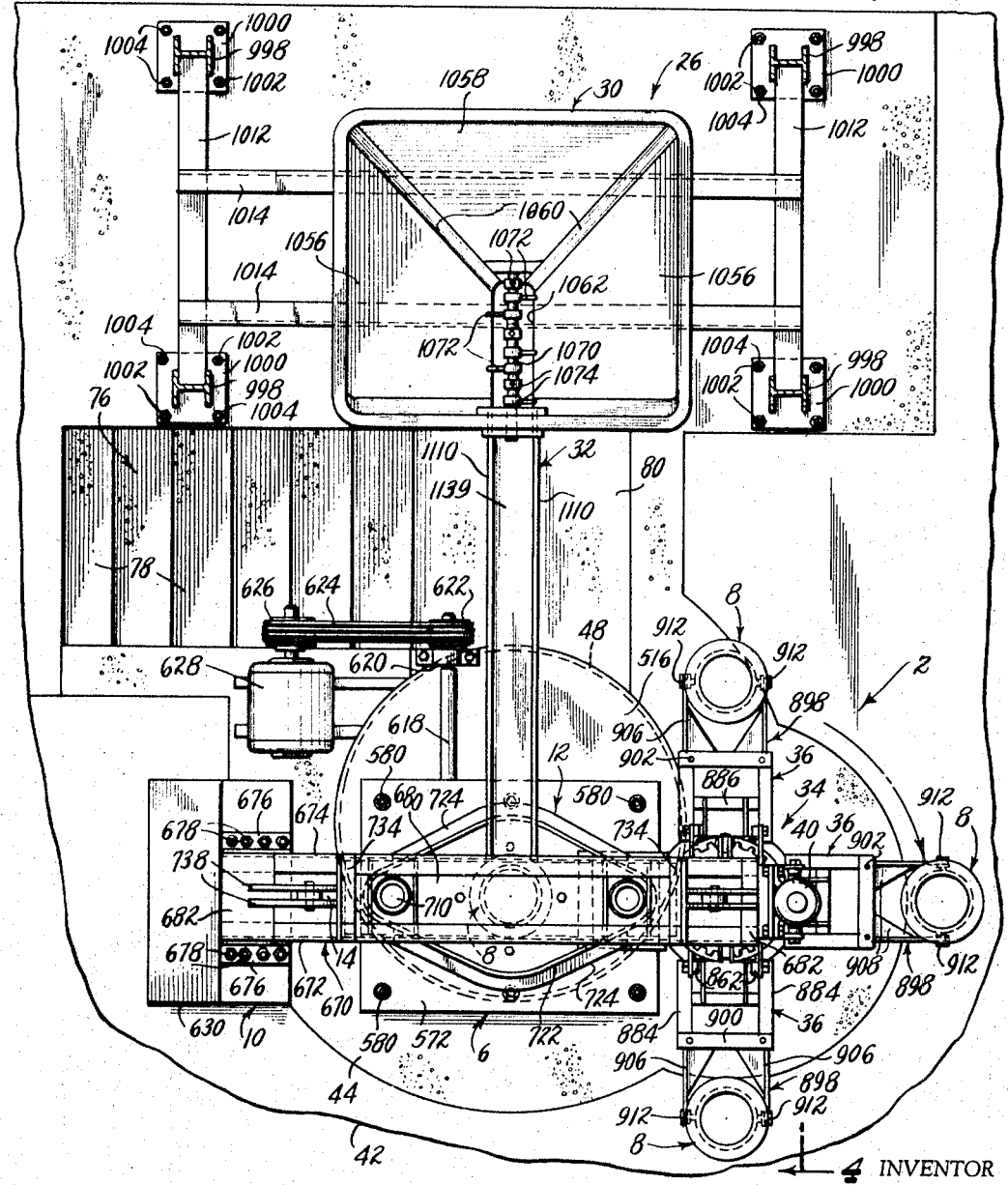
FIG. 2 is an enlarged, fragmentary plan view, partly in cross-section, taken along the line 2—2 in FIG. 1.
Figure 3:
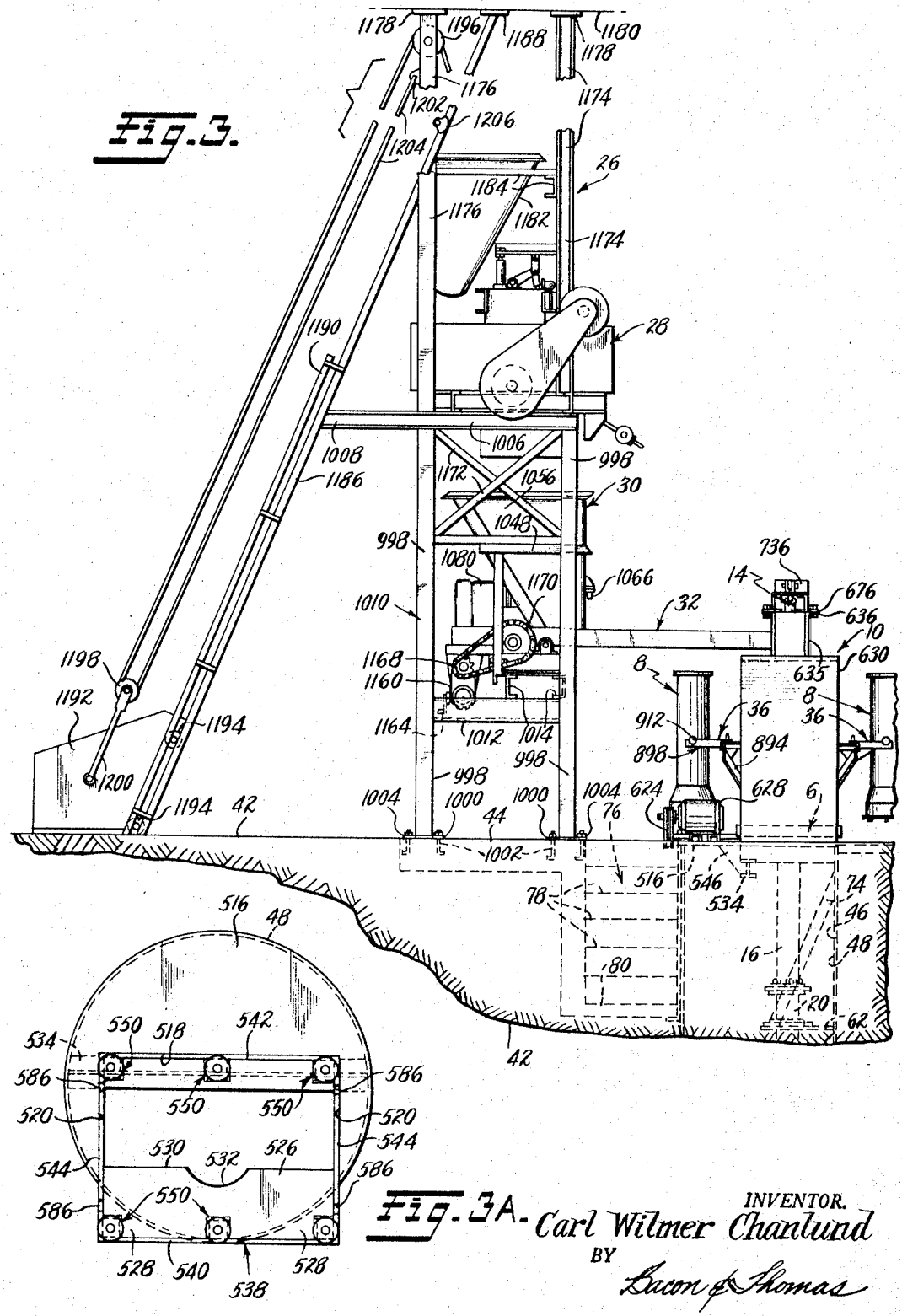
FIG. 3 is a fragmentary, left-side elevational view of the machine shown in FIG. 1.

Referring now to the drawings, the pipe making machine of the present invention is indicated generally at 2. Briefly, the automatic machine 2 of the invention comprises a well 4 having a vibration table 6 mounted across the upper end thereof, which table is supported by cushion legs, and upon which can be placed a vertical mold 8. Machine framework 10 extends above the vibration table 6, and an apron 12 is supported from said framework by a plurality of hydraulic jacks 14, said apron including a resilient cushion engageable with the upper end of the mold 8 when said apron is lowered. The hydraulic jacks 14 can be operated to move the apron 12 downwardly, whereby to clamp the mold 8 in position between the resilient cushion carried by said apron and the top surface of the vibration table 6.

Disposed within the well 4 is a core 16 having a rotatable packing head 18 mounted on the upper end thereof, said core being mounted on the upper end of a column 20 which, in turn, is carried by a lifting harness 22. The lifting harness 22 is connected to a pair of hydraulic lifting jacks 24 mounted within the well 4, which are arranged to elevate the column 20, core 16 and packing head 18 to move said packing head 18 and core 16 through an opening provided in the vibration table 6, whereby said core and packing head can be moved vertically through a mold 8 clamped in a vertical position on said vibrating table.

Disposed behind the framework 10 of the machine 2 is a concrete mixture charger apparatus 26, which includes a conventional batch weighing and mixing apparatus 28 supported vertically above a hopper 30. The lower end of the hopper 30 is positioned to dump concrete mixture onto the inner end of an endless conveyor 32, which conveyor is arranged to transfer the mixture from the hopper 30 to the upper, open end of the mold 8 positioned on the table 6.

The molds 8 are moved into position on and are removed from the vibration table 6 by a mold indexing and transfer mechanism 34, which includes a plurality of carriages 36 mounted for rotation about a column 38. The carriages 36 are arranged to be rotated by an indexer motor 40, in a manner to be hereinafter fully described, to move molds 8 onto and off the table 6, and are adaptable to handle different sizes of molds.

Briefly, the operating sequence of the apparatus of the present invention is as follows: Initially, the apron 12 is in a fully "UP" position, and the lifting harness 22 is in a fully "DOWN" position, whereby the core 16 and the packing head 18 are positioned below the vibration table 6. The indexer motor 40 is then actuated, causing the carriage 36 to rotate about the column 38 to thereby position a mold 8 on the vibrating table 6 in a vertical position and in alignment with the core 16 and packing head 18. The apron 12 is then driven downwardly by the hydraulic jacks 14, whereby to clamp the mold 8 between the resilient cushion carried by said apron and the vibration table 6. It should be noted that because the vibration table 6 is supported by cushion legs, the mold 8 is in effect clamped between said cushion legs and the cushion carried by the apron 12. The force with which the mold 8 is clamped in position should not be so great as to interfere with or damp the vibrations produced by the table 6, and should hold the mold 8 firmly in position and prevent a hammer effect between the vibration table and the mold.

The packing head 18 is then caused to rotate at a preselected speed, and the lifting jacks 24 are actuated to raise the lifting harness 22 a distance sufficient to cause the upper end of the core 16 and the rotating packing head 18 to move through the opening in the vibration table 6 and enter the lower end of the mold 8, where they pause momentarily. The vibration table 6 is actuated to vibrate the mold 8 rapidly in a vertical direction, and the charging apparatus 26 is then actuated to feed concrete mixture into the upper end of the mold 8. The concrete mixture batch can all be dumped at one time into the mold, but it is preferable to feed it gradually thereinto to give better control over the molding operation and to lessen separation in the mixture.

The first volume of concrete mixture that enters the mold 8 falls vertically onto the rapidly rotating packing head 18, and is floated outwardly thereby against the cylindrical wall of the mold 8. After a relatively thin layer of concrete mixture has built up on the packing head 18, the lifting jacks 24 are again actuated to continously move the lifting harness 22 upwardly at a pace corresponding to the rate at which concrete mixture is supplied to the mold 8 from the charger apparatus 26. The upward movement of the lifting harness 22, and hence of the core 16 and the packing head 18, is timed relative to the charger apparatus 26 so that a thin layer of concrete mixture of relatively constant depth will be present at all times during the molding operation on the upper end of the rotating packing head 18.

When the mold 8 is completely filled and the packing head 18 reaches the upper end thereof, the operation of the charger apparatus 26 is halted, and the vibration table 6 is stopped; the lifting jacks 24 are then actuated to lower the harness 22 and withdraw the core 16 from the molded product. The hydraulic jacks 14 are then actuated to raise the apron 12, and the mold indexing and transfer mechanism 34 is actuated to lift the filled mold 8 from the vibrating table 6, to transfer said mold 8 from the vibrating table 6, to transfer said mold off said table, and to position the next mold properly on the table. This completes one full cycle of operation for the machine.

The operation of the pipe making machine 2 is entirely automatic, and a suitable control circuit, which will be described in detail hereinafter, is provided so that the process can be halted at any step during a cycle, and so that it will pick up at the step where it left off when the machine is again started. Further, the control circuit of the invention is arranged so that an operator can assume manual control of the machine at anytime. The pipe making machine 2 will now be described in greater detail.

*The well and associated structure*

The well 4 and the structure mounted therein is best shown in FIGS. 1–3, 5–13 and 17–21, reference to which figures is now made. Referring to the drawings, the machine 2 of the invention is disposed to rest upon the earth 42, a concrete floor 44 of suitable thickness and reinforced in a suitable manner being provided in the region of the machine.

Figure 5:
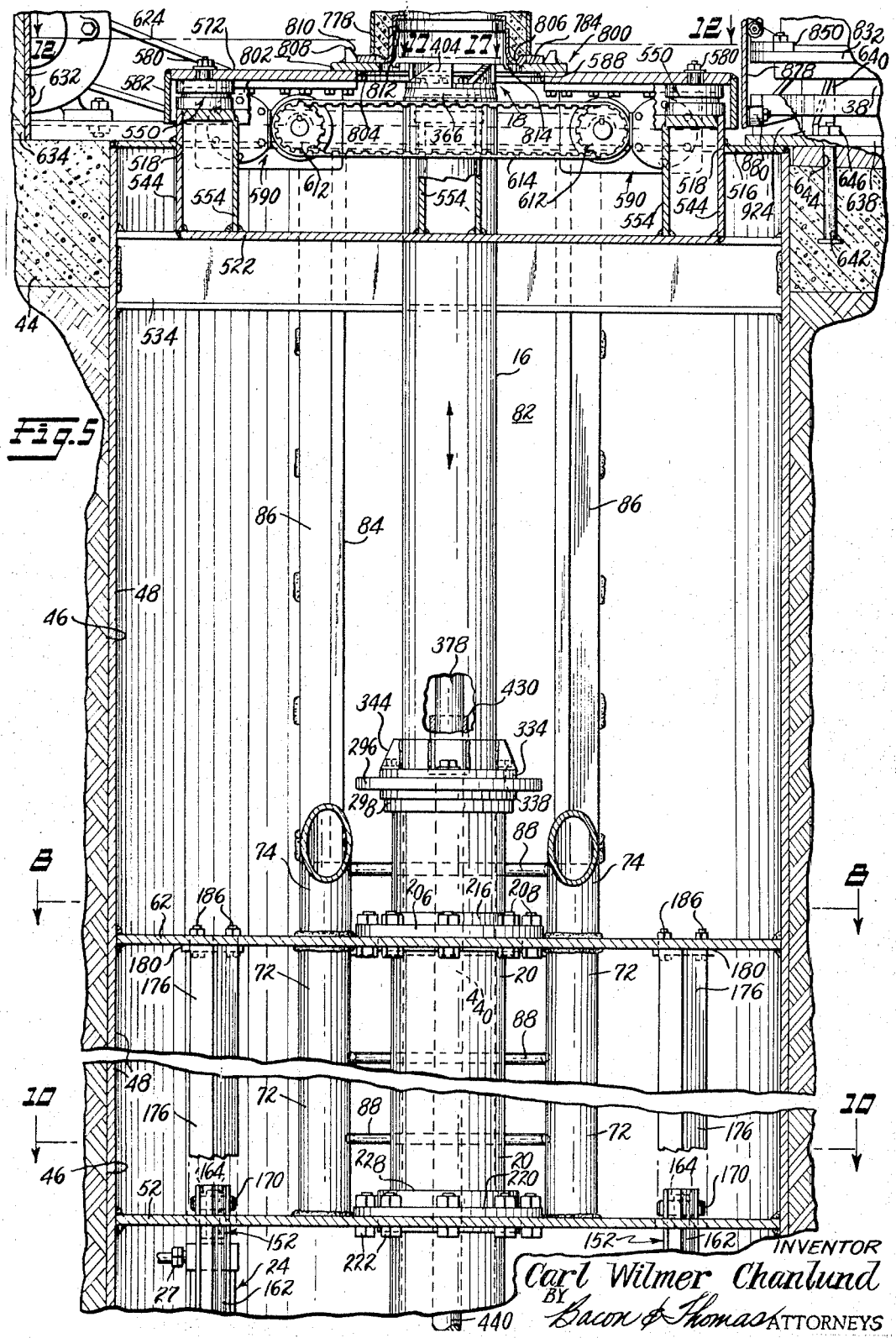
FIG. 5 is an enlarged, fragmentary elevational view, partially in section, of the vibration table and the upper portion of the well of the pipe making machine of FIG. 1.
Figure 6:
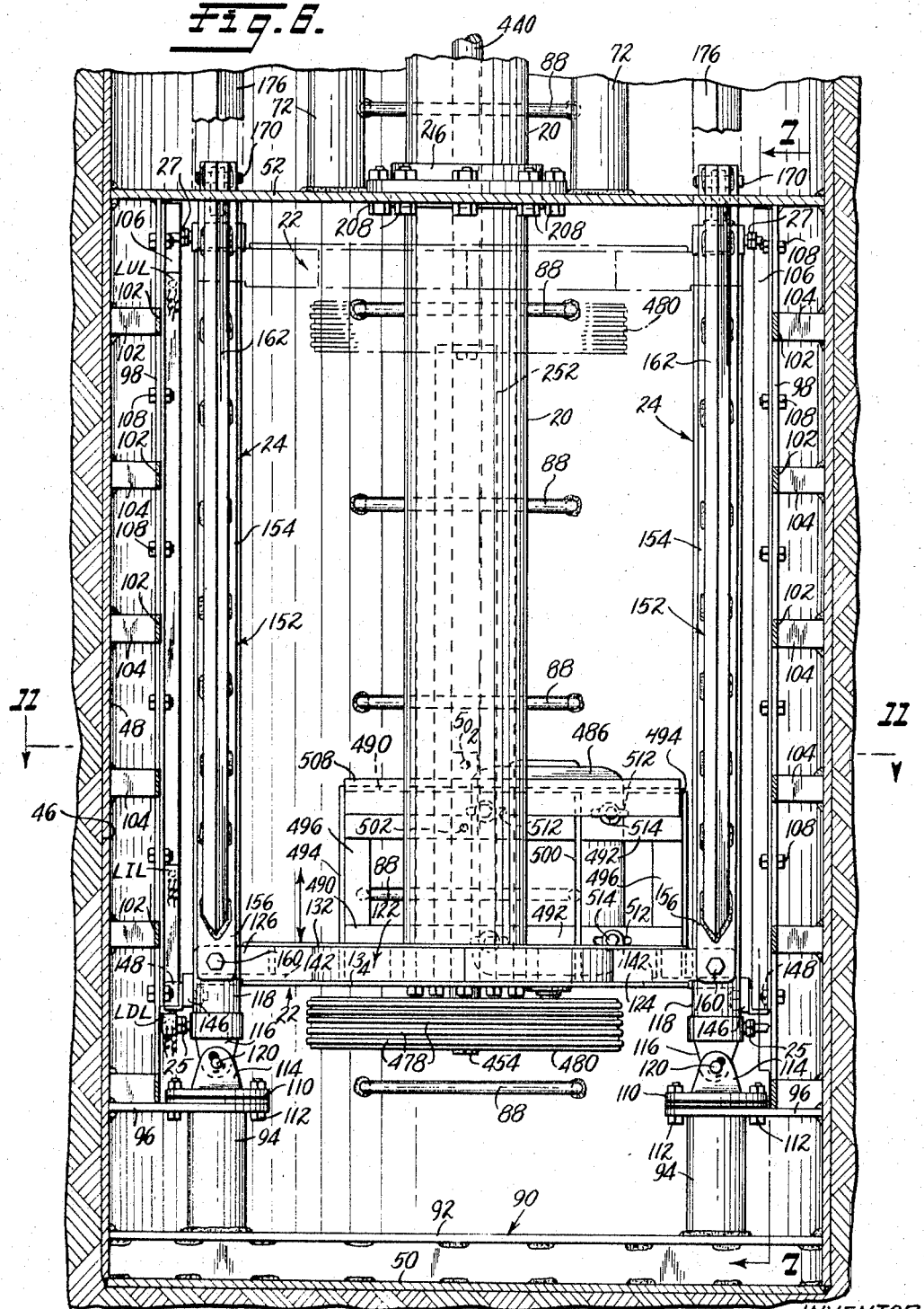
FIG. 6 is a fragmentary, elevational view, partially in section, of the lower portion of the well of the pipe making machine of FIG. 1.

A cylindrical hole 46 is provided in the earth 42 and is best shown in FIGS. 5 and 6, a cylindrical steel shell liner 48 is fitted within said hole. The shell liner 48 is closed at its lower end by a circular floor plate 50, which is welded to the liner to form a watertight chamber.

Figure 10:
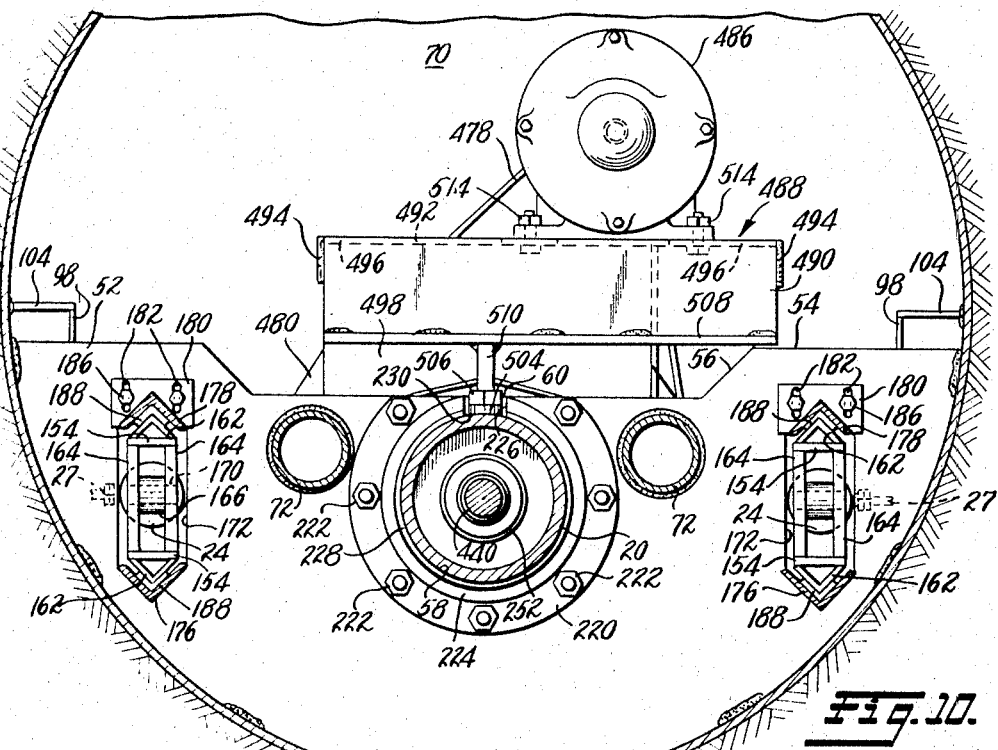
FIG. 10 is an enlarged, fragmentary, horizontal sectional view, taken on the line 10—10 of FIG. 5.
Figure 11:
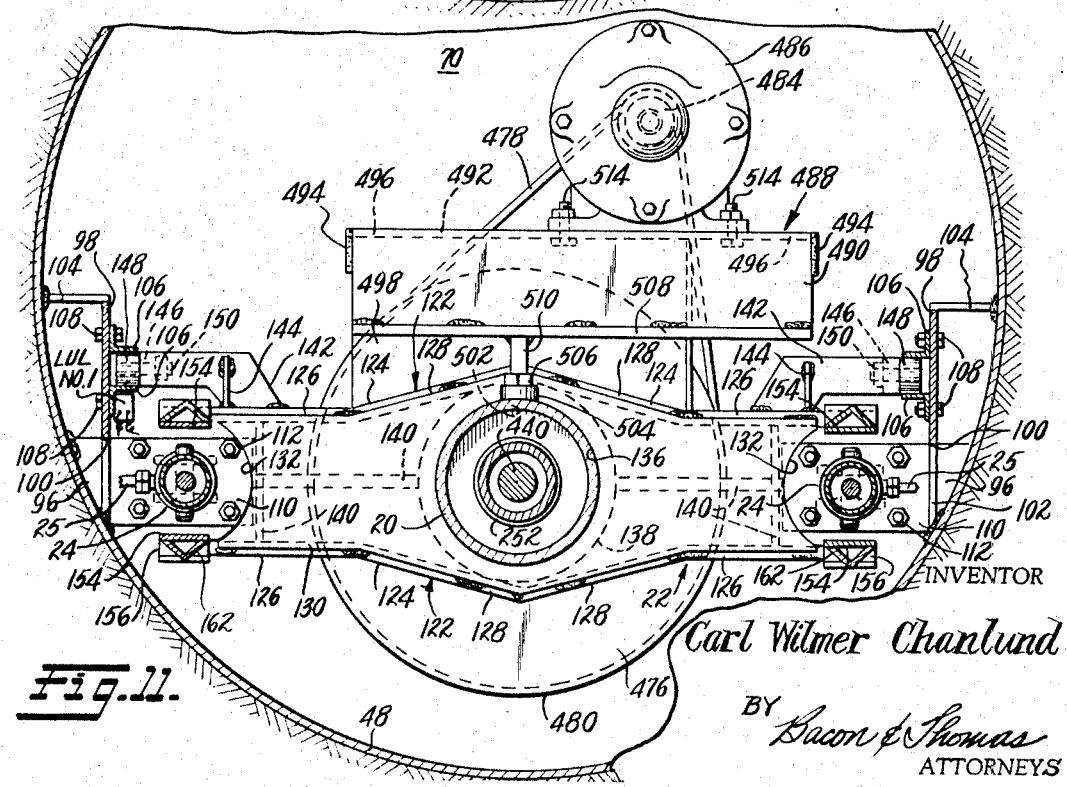
FIG. 11 is an enlarged, fragmentary, horizontal sectional view, taken on the line 11—11 of FIG. 6, and showing in particular the lifting harness of the invention and the structure associated therewith.
Figure 40:
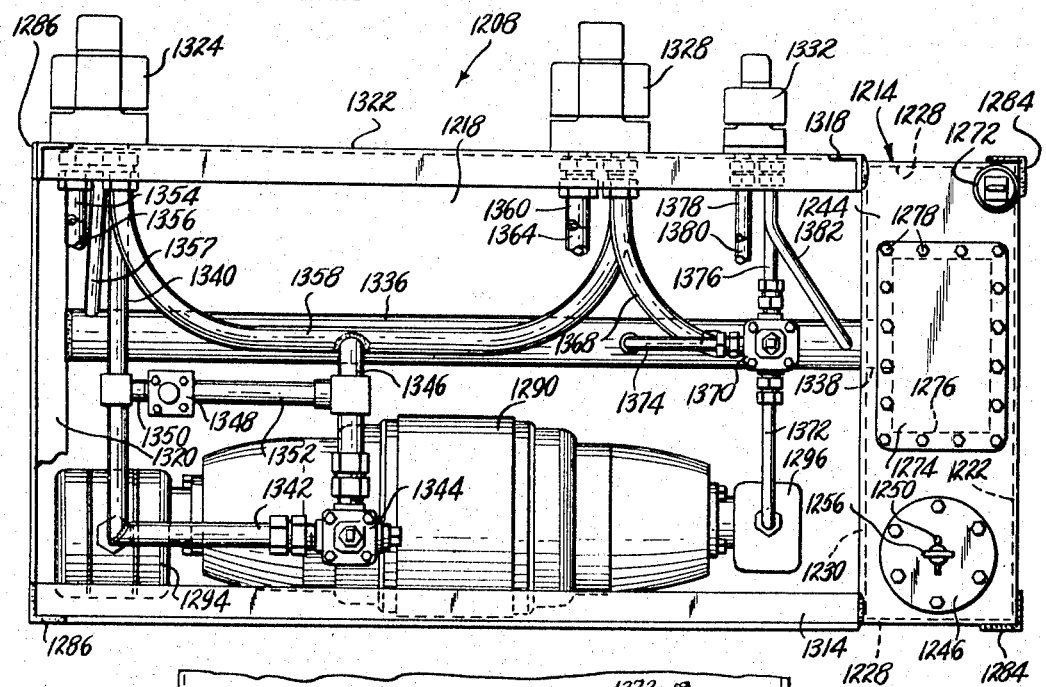
FIG. 40 is a plan view of the hydraulic unit shown in FIG. 37.
Figure 41:
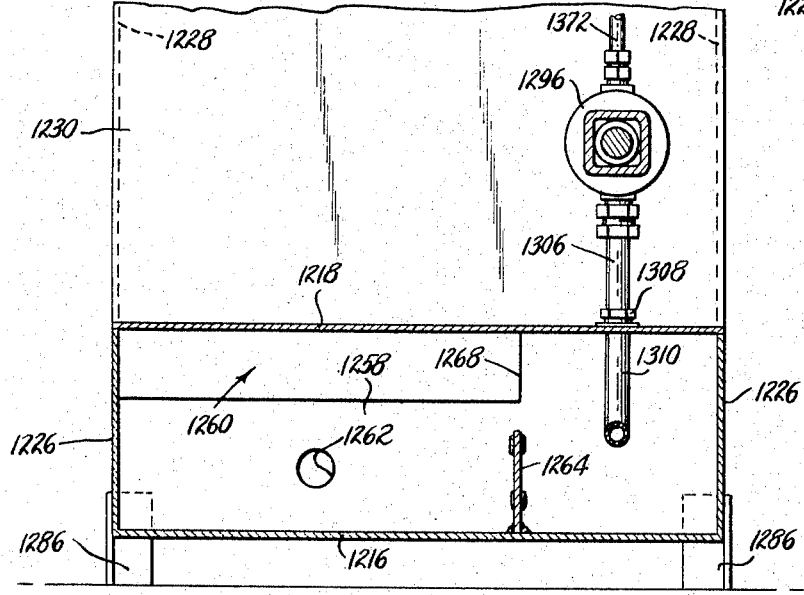
FIG. 41 is an enlarged, fragmentary, vertical sectional view through the operating fluid reservoir, taken on the line 41—41 of FIG. 37.

About midway of its height a transversely extending lower bulkhead 52 is welded to the interior of the shell 48, the lower bulkhead 52 being shown in plan view in FIG. 10. The lower bulkhead 52 is substantially semicircular in configuration, except that the free, straight edge 54 thereof has a central trapezoidal cutout 56 therein. The straight edge 54 of the bulkhead 52 is spaced from the center of the cylindrical shell 48, and a circular opening 58 is provided through said lower bulkhead, the opening 58 being positioned inwardly of the bottom edge of the cutout 56 in the straight edge 54. The lower bulkhead 52 has a notch 60 therein which communicates with the opening 58, and which is radially aligned with the center of the shell 48 and the center of the opening 58.

Figure 8:
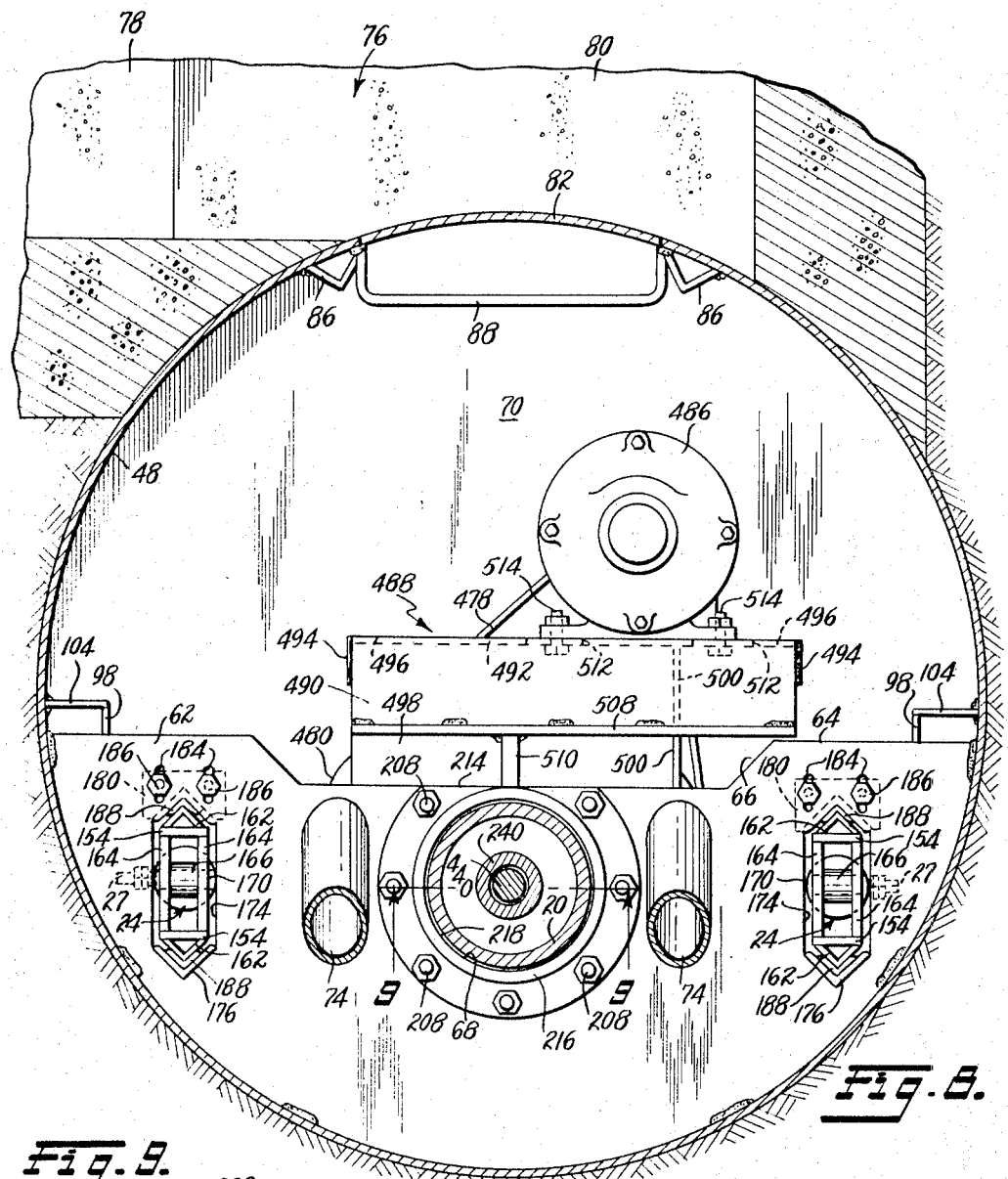
FIG. 8 is an enlarged, fragmentary, horizontal cross-sectional view, taken on the line 8—8 of FIG. 5.

Spaced a distance vertically above the lower bulkhead 52 is a parallel, upper bulkhead 62, said bulkhead 62 being shown in plan view in FIG. 8, and being substantially identical in configuration to the lower bulkhead 52. The upper bulkhead 62 includes a straight edge 64 positioned directly above the straight edge 54, and provided with a central trapezoidal cutout 66. The upper bulkhead 62 is also provided with a circular opening 68, which is vertically aligned with the opening 58 in the lower bulkhead 52.

The semicircular configuration of the lower and upper bulkheads 52 and 62 provides a clearance 70 along one side of the interior of the vertical cylindrical shell 48, whereby access may be had to the machinery disposed within the well 4. A pair of tubular braces 72 are welded to extend vertically between the lower bulkhead 52 and the upper bulkhead 62, said braces being disposed on either side of the circular openings 58 and 68. The bulkheads 52 and 62 are further braced by a pair of inclined cylindrical braces 74, the lower ends of which are welded to the top surface of the upper bulkhead 62 directly above the upper ends of the braces 72. The braces 74 incline outwardly away from the vertical clearance 70 within the well 4, and as shown in FIG. 13, are welded to the wall of the cylindrical shell 48 near the upper end thereof.

Referring to FIGS. 1 to 3 and 8, a stair well 76 is provided adjacent the upper end of the cylindrical well 4, said stair well having steps 78 leading down thereinto, which terminate in a landing 80. As is best shown in FIGS. 5, 6 and 8, the cylindrical shell 48 has a removable access panel, or door, 82 therein positioned opposite the bulkheads 52 and 62, said access panel 82 being detachably secured by suitable means (not shown) within a vertically elongated opening 84 in the shell 48. Vertical, parallel angle irons 86 are welded to the internal surface of the cylindrical shell 48 to extend along the vertical edges of the opening 84, said angle irons 86 extending to the lower end of the well 4. Horizontal steps 88 are welded at spaced intervals to extend between the angle irons 86, whereby the angle irons 86 and the steps 88 form a ladder to provide access to the lower end of the well 4.

Figure 7:
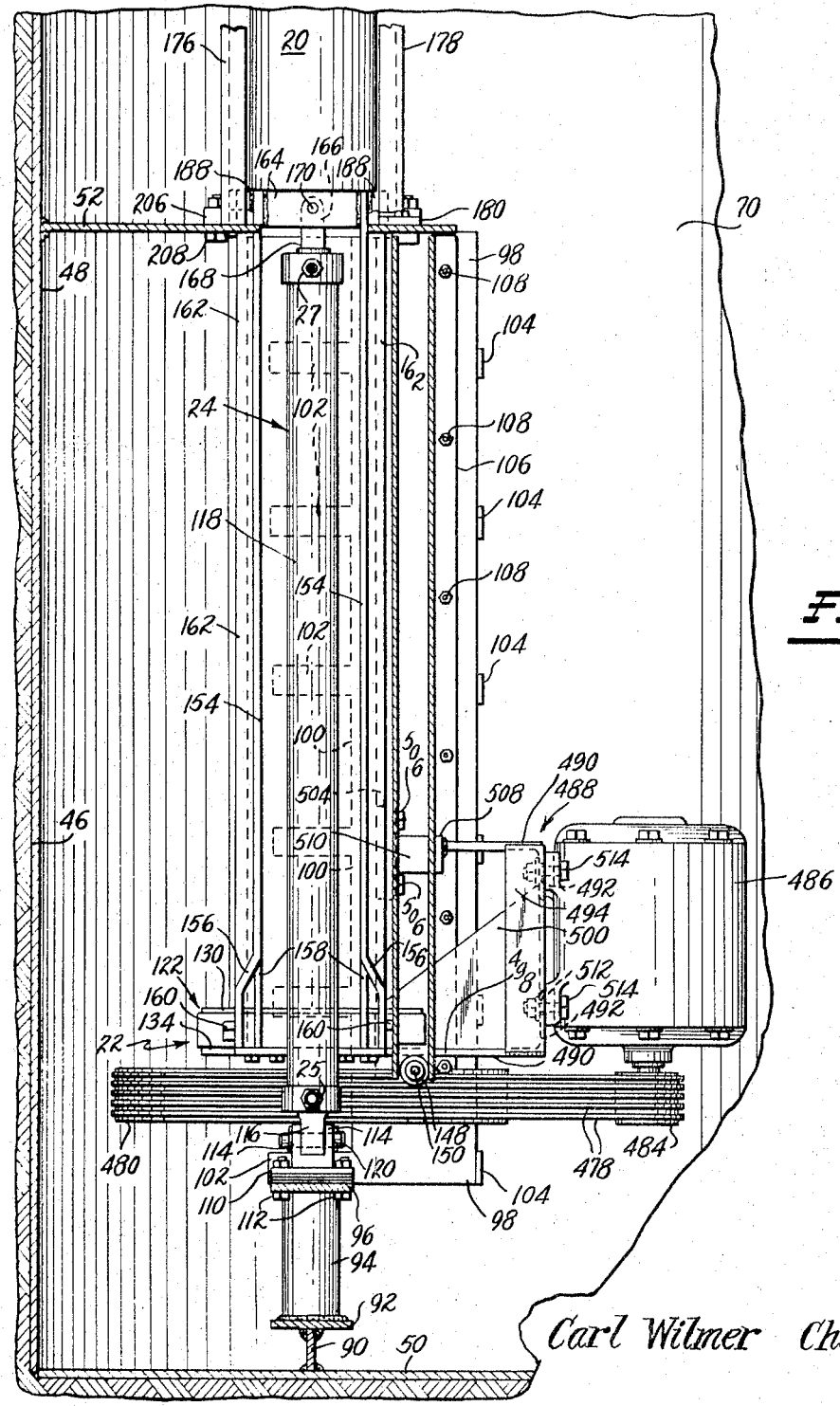
FIG. 7 is a fragmentary, vertical sectional view, taken on the line 7—7 of FIG. 6.

Referring now to FIGS. 1, 6 and 7, a fabricated T-section 90 is welded to the floor plate 50 of the well 4, said section lying directly under the center of the openings 58 and 68, and extending perpendicular to a line drawn from the center of the cylindrical shell 48 through the centers of said openings 58 and 68. The section 90 includes a horizontal top flange 92, near the ends of which is welded a pair of short, cylindrical upright standards 94, rectangular base plates 96 being welded atop said standards 94 and to the adjacent wall of the cylindrical shell 48 through the centers of said openings 58 and 68.

Referring now to FIGS. 1, 6, 7, 10 and 11, a pair of vertically oriented, parallel plates 98 is disposed with their lower edges resting on and welded to the base plates 96. The parallel plates 98 are provided with rectangular cutouts 100 along the edge thereof extending toward the side of the cylindrical shell 48 to which the bulkheads 52 and 62 are attached, said cutouts 100 each having a depth about equal to the width of the base plates 96. The cutouts 100 define a plurality of spaced rectangular tabs 102, which extend into engagement with and are welded to the wall of the cylindrical shell 48. The front, continuous edges of the parallel plates 98 are secured to the adjacent wall of the cylindrical shell 48 by a plurality of vertically spaced brace bars 104, which extend perpendicular to the plates 98 and are welded to said plates 98 and to the cylindrical shell 48.

Attached to each of the confronting surfaces of the parallel plates 98 is a pair of vertically disposed, parallel angle irons 106. The angle irons 106 are arranged on the parallel plates 98 with their base flanges extending oppositely, and are secured to their respective plates by bolts 108. The angle irons 106 extend vertically from just above the base pates 96 to the lower bulkhead 52, and the upstanding flanges thereof define confronting tracks utilized for a purpose to be hereinafter described.

Mounted on the base plates 96 are base flanges 110, said flanges 110 being secured to the plates 96 by bolts 112. Each of the flanges 110 has a pair of spaced ears 114 projecting upwardly therefrom, between each pair of which is received the lower end 116 of the cylinder member 118 of one of the hydraulic lifting jacks 24, said lower ends 116 being secured to their respective ears by pins 120.

The lifting harness 22 is best shown in FIGS. 1, 6, 7, 9 to 11, and 18, and comprises a pair of side rails 122, each of which includes a pair of bars 124. The outer ends 126 of the bars 124 on each end of the lifting harness 22 extend parallel, and the inner half 128 of each bar 124 is bent outwardly at an angle of about 15 degrees from the plane of its end portion 126. The confronting ends of the bars 124, comprising each side rail 122, are welded together.

Disposed to rest upon the side rails 122 is a top plate 130 (FIGS. 7 and 11), which is welded in position. The opposite ends of the top plate 130 are provided with arcuate cutouts 132, whereby to fit with substantial clearance about the hydraulic jacks 24. A bottom plate 134 (FIGS. 6 and 7) is similarly welded to the bottom edges of the side rails 122, and is identical in external configuration to the top plate 130.

The top plate 130 is provided with a circular opening 136 for receiving the lower end of the column 20, and a cylindrical collar 138 is welded between the top plate 130 and the bottom plate 134 about the opening 136 for receiving the lower end of said column 20 (FIG. 18). The inner diameter of the circular collar 138 is just slightly greater than the external diameter of the lower end of column 20. Longitudinal and transverse internal brace bars 140 are welded in position between the top plate 130 and the bottom plate 134 to add rigidity to the lifting hardness 22.

Welded to the opposite ends of the side rail 122 which is closest to the access clearance 70 are bracket arms 142, each of said bracket arms being braced by a gusset plate 144. The arms 142 terminate at their outer ends in downwardly directed flanges 146, which are positioned to confront the tracks defined by the upstanding flange of the pairs of vertical angle irons 106. A roller 148 is received between each pair of angle irons 106, and is secured to its associated confronting flange 146 by a bolt 150. The rollers 148 function to guide and to give stability to the lifting harness 22 during vertical movement thereof.

The lifting harness 22 is connected to the hydraulic lifting jacks 24 by harness stirrups 152, the construction of which is best shown in FIGS. 1, 5 to 8, 10 and 11. Each of the stirrups 152 includes a pair of vertical bars 154, each having an offset bend 156 near the lower end thereof which extends outwardly about its associated side rail end 126. A short bar 158 is welded to each of the bars 154 at the offset 156, whereby to define with the lower end of its associated bar 154 a bifurcated stirrup end for receiving the end 126 of an associated side rail 122. The ends 126 of the side rails 122 are secured to the lower ends of their associated stirrups by bolts 160.

Extending upwardly from the offset bend 156 on the outer surface of each of the bars 154 is an angle iron 162, said angle irons 162 being welded to the bars 154 with the free edges of their flanges in engagement with the said outer surfaces of their associated bars. The angle irons 162 define tracks, and the bars 154, with their attached angle irons 162, extend upwardly on opposite sides of the hydraulic jacks 24, and are disposed parallel to each other.

The upper ends of the bars 154 of each pair of stirrups 152 are connected by a pair of spaced, parallel cross-members 164. The cross-members 164 are welded in position, and between each pair thereof is received the free end 166 of the piston rod 168 of the hydraulic lifting jack 24 associated therewith. The piston rod ends 166 are secured to the cross-members 164 by pins 170.

The lower bulkhead 52 and the upper bulkhead 62 have aligned, elongated holes 172 and 174, respectively, therein, which holes are aligned with and of a size to receive the stirrups 152. Fixed angle iron rails 176 are welded to extend between the bulkheads 52 and 62 on the ends of the elongated holes 172 and 174 spaced farthest from the edges 54 and 64, respectively. A pair of adjustable angle iron rails 178, having outwardly directed flanges 180 on the opposite ends thereof, is disposed parallel to the fixed rails 176, and extend between the bulkheads 52 and 62. Slots 182 and 184 are provided in the bulkheads 52 and 62, respectively, and the adjustable rails 178 are secured to said bulkhead 52 and 62 by bolts 186 which pass through openings in the flanges 180 and through the slots 182 and 184. The rails 178 are thus adjustable toward and away from the fixed rails 176 to vary the spacing therebetween, and the confronting rails 176 and 178 are arranged to extend parallel to each other between the lower bulkhead 52 and the upper bulkhead 62 and define a channel for slideably receiving and guiding the stirrups 152. The upper ends of the angle iron tracks 162 have bronze wear plates 188 secured thereto, and are received between the rails 176 and 178. Thus, when the hydraulic lifting jacks 24 are actuated to move the stirrups 152, and hence the lifting harness 22, vertically of the well 4, the movement of said lifting harness 22 is guided by the interengaged angle iron tracks 162 and rails 176 and 178, and by the rollers 148 received between the upstanding flanges of the vertical angle irons 106.

When the lifting harness 22 is in its fully "DOWN" position, as shown in FIG. 6, the piston rods 168 of the draulic lifting jacks 24 will be received within their associated cylinders 118. When it is desired to cause the lifting harness 22 to move vertically of the well 4, pressurized fluid is supplied to the hydraulic lifting jacks 24 through fluid connections 25 to cause the piston rods 168 to extend relative to the cylinder members 118. Such extension of the piston rods 168 in turn will move the stirrups 152 upwardly between the rails 176 and 178, which movement thereby cause the lifting harness 22 to also move upwardly. Reverse, or lowering, movement of the lifting harness 22 is brought about an analogous manner by draining fluid through the fittings 25 while supplying pressurized fluid to the jacks through fittings 27 at the upper end thereof.

The column 20 is carried by the lifting harness 22, and has mounted thereon the core member 16 and the packing head 18. Referring to FIG. 18, the column 20 is shown to be provided with an inwardly directed flange 190 at the lower end thereof, said flange having a plurality of circumferentially spaced, threaded bores 192 extending axially thereinto. A circular disc 194 is received within the collar 138 carried by the lifting harness 22, and has a raised circular boss 196 on the upper surface thereof which is received within the outer end of a counterbore 198 provided in the flange 190. A plurality of axially extending bores 200 extend through the disc 194, and are aligned with the bores 192 and with bores 202 provided in the bottom plate 134 of the lifting harness 22. The column 20 is secured to the lifting harness 22 by bolts 204, which pass through the aligned bores 202 and 200, and which are threaded into the bores 192.

Figure 9:
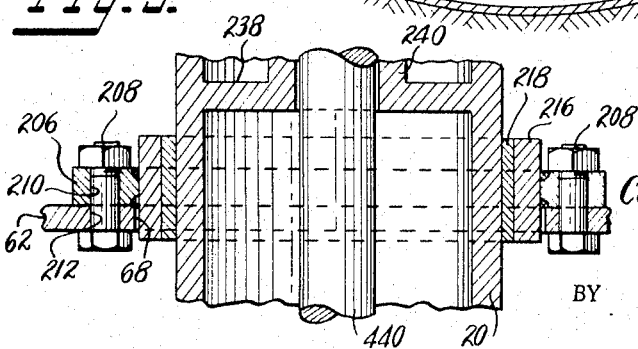
FIG. 9 is an enlarged, fragmentary, vertical sectional view, taken on the line 9—9 of FIG. 8.

The column 20 extends upwardly through the lower and upper bulkheads 52 and 62. Referring to FIGS. 8 and 9, the column 20 extends through the circular opening 68 provided in the upper bulkhead 62, said opening being substantially larger in diameter than the outer diameter of the column 20. A circular ring 206 extends about the circumference of the opening 68, and is secured to the top surface of the upper bulkhead 62 by a plurality of circumferentially spaced bolts 208, which bolts pass through aligned holes 210 and 212 in the ring 206 and the bulkhead 62, respectively. The ring 206 is not continuous, but rather is cut off at 214 to lie flush with the bottom edge of the trapezoidal cutout 66 in the bulkhead 62.

A cylindrical collar 216 is received within the opening in the annular ring 206, the inner diameter of the ring 206 being slightly less than the diameter of the opening 68. The collar 216 is welded medially thereof to the ring 206, and is fitted with a bushing sleeve 218 having an internal diameter just slightly greater than the external diameter of the column 20. Thus, the column 20 is guided for vertical movement by the bushing sleeve 218 carried by the collar 216 and the ring 206.

Refering to FIG. 10, the opening 58 in the lower bulkhead 52 has a circular ring 220 secured thereabout by bolts 222, said ring 220 being identical to the ring 206, except that it terminates at the edges of the notch 60 in the lower bulkhead 52. A collar 224, corresponding to the collar 216, is welded within the ring 220, and is provided with a radial notch 226 identical in width to and in alignment with the notch 60. A bushing sleeve 228 is received within the collar 224, and is also provided with a radial notch 230, therein, aligned with the notches 226 and 60. The bushing sleeve 228 is in vertical alignment with the bushing sleeve 218, and because the column 20 passes through the two axially spaced bushing sleeves 218 and 228, it is confined and guided for movement only along its vertical axis.

The column 20 is of sufficient length so that the upper end thereof will project above the upper bulkhead 62 when the lifting harness 22 is in its fully lowered position. Referring to FIG. 17, the upper end of the column 20 is provided with a counterbore 232, which terminates at its upper end in an inturned annular flange 234. A pair of axially spaced, upper and lower radial partitions 236 and 238 extend from the side wall of the column 20, and support an axially centered collar 240. The collar 240 is provided with an axially extending cylindrical bore 242, and projects upwardly above the upper partition 236. The upwardly projecting end of the collar 240 includes a cylindrical portion 244 positioned adjacent the partition 236, and a reduced cylindrical portion 246 axially spaced from the portion 244, the portions 246 and 244 being connected by a tapered collar portion 248. The collar 240 terminates at its upper end in an externally threaded portion 250.

Referring again to FIG. 18, an axially extending hollow cylindrical sleeve 252 is positioned concentrically within the lower end of column 20, the lower end of the sleeve 252 having an annular flange 254 thereon of a size to be snugly received within the counterbore 198 between the bottom wall thereof and the boss 196. An O-ring seal 256 is disposed in an annular groove in the upper face of the flange 254, and functions to seal the joint between said flange and the bottom wall of the counterbore 198 against the passage of fluid.

The sleeve 252 extends vertically for a substantial portion of the length of the column 20, and terminates at its upper end in an inwardly directed flange 257 having an axial bore 258 and a counterbore 260 therein. A needle bearing 262 is received within the counterbore 260, and is secured in position by a snap ring 264. The sleeve 252 is provided with a plurality of axially and circumferentially spaced radial ports 266 throughout its length, and the column 20 has a threaded filling port 268 therein above the upper end of the sleeve 252, through which lubricating oil 270 can be placed in the lower end of the collar 20. A plug 272 is threaded into the opening 268 to close the same, and the radial ports 266 through the sleeve 252 provide for circulation of the oil within said sleeve.

Referring again to FIG. 17, a supporting head 274 for carrying the core 16 and the packing head 18 is received upon the collar 240. The supporting head 274 includes a cylindrical body 276 provided with an annular flange 278 at the upper end thereof. The body 276 has upper and lower cylindrical bores, 280 and 282, respectively, therein, which are separated by a radial shoulder 284. A counterbore 286 is provided in the lower end of the cylindrical body 276.

The outer race 277 of an angled roller bearing 288 is received within the counterbore 286, the inner race 289 of said bearing being received on the cylindrical portion 244 of the collar 240. The outer race 291 of an oppositely inclined roller bearing 290 is received within the upper bore 280, and rests on the shoulder 284. The inner race 293 of the bearing 290 is received on the upper cylindrical portion 246 of the collar 240. The bearing 290 is secured in position by a nut 292 received on the threaded end 250 of the collar 240, which nut 292 also functions to urge the bearing 290 into engagement with the shoulder 284, the bottom wall of the counter bore 286 into engagement with the outer race 277 of the roller bearing 288, and the inner race 289 of the roller bearing 288 into engagement with a shoulder 294 at the lower end of the cylindrical portion 244 of the collar 240. Thus, the supporting head 274 is secured against axial shifting relative to the collar 240, and is rotatably mounted thereon. The nut 292 is secured in position by a conventional locking element 293.

Received on the annular flange 278 of the supporting head 274 is a circular adapter plate 296, the lower face of which has an annular collar 298 thereon of a size to receive the annular flange 278. The adapter plate 296 is secured to the flange 278 by a plurality of circumferentially spaced bolts 300, which are received within countersunk bores 302 in the adapter plate 296, and which are threaded into aligned bores 304 provided in the flange 278.

Referring to FIGS. 17 and 19, the adapter plate 296 is provided with a plurality of circumferentially spaced, threaded bores 306, 308, 310, 312 and 314, arranged to lie on concentric circles, four bores to each circle. The adapter plate 296 is also provided with an upwardly extending cylindrical hub 316 on the top surface thereof, which hub is provided with a counterbore 318 within which is received a needle bearing 320, the bearing 320 being secured in position by a snap ring 322. An annular seal 324 of conventional construction is received within the outer end of the counterbore 318 above the snap ring 322. The adapter plate 296 is provided with a radial bore 326 which extends to a recess 328 in the outer periphery of said plate, and which has a lubrication fitting 330 threadably secured within its outer end. The bore 326 is arranged to conduct lubricant to the needle bearing 320.

The core 16 is positioned to rest on the adapter plate 296, and comprises a cylindrical shell 332 provided with an annular flange 334 at the lower end thereof. The flange 334, as is best shown in FIGS. 17 and 19, is provided with four circumferentially spaced bores 336 for receiving bolts 338 utilized to secure the core 16 of the adapter plate 296. The bores 336 in flange 334 are arranged in alignment with the bores 310 on the middle one of the five concentric circles of bores arranged on the adapter plate 296.

The purpose for the five concentric circles of bores on the adapter plate 296 is to permit the mounting on said adapter plate of cores 16 of varying sizes. For example, in FIG. 17, a core 16', having a substantially larger diameter than the core 16, is shown in phantom lines, and is arranged so that the bores 336' in the flange 334' thereof are in alignment with the bores 306 in the outermost of the five concentric circles of bores in the adapter plate.

The cylindrical shell 332 has an annular closure plate 340 welded within the lower end thereof, said plate 340 being spaced axially a short distance from the lower end of the shell 332 and having a circular opening 342 therein of a size to receive the cylindrical hub 316. Gusset plates 344 are welded on the exterior of the cylindrical shell 332, and are arranged in pairs, one on each side of each of the bores 336. The upper end of the cylindrical shell 332 is closed by a circular disc 346 welded thereto.

The outer surface of the cylindrical shell 332 has a reduced diameter portion 348 extending from the gusset plates 334 to the upper end of the shell, the circular disc 346 having an external diameter corresponding to that of the reduced diameter portion 348. Received over and secured to the reduced diameter portion 348 and the closure plate 346 is a cylindrical sleeve 350 of a hardened, wear-resistant material capable of withstanding abrasion. Typically the shell 332 will be about ⅛ inch thick, and will be made from high carbon steel such as that known in the trade as "T–1" or "A-R."

The closure disc 346 has a bore 352 extending therethrough, said bore 352 including a lower counterbore 354, an intermediate counterbore 356, and an outer counterbore 358. An annular seal 360 is received within the lower counterbore 354, and the cylindrical body of a bronze bushing 362 is received within the intermediate counterbore 356. The bushing 362 includes an annular flange 364 at the upper end thereof, which is received within the outer counterbore 358, and which has an axial thickness greater than the depth of said counterbore 358.

Mounted on the upper end of the core 16 is the packing head 18, said packing head including a circular base plate 366 having a periphery 368 which tapers upwardly and inwardly at an angle of about 7½ degrees, and which is hardened to withstand wear. The lower face of the base plate 366 is provided with a cylindrical collar 370 having a circular bore 372 extending therethrough, the bore 372 terminating at its upper end in a counterbore 374. The reduced diameter end 376 of an upper drive shaft 378 is received within the bore 372, and has a threaded bore 380 in the upper end face thereof. A washer 382 is received within the counterbore 374, and the base plate 366 of the packing head 18 is secured to the upper end of the upper drive shaft 378 by a bolt 384 passing through the washer 382 and threaded into the bore 380.

The packing head 18 is keyed to the upper drive shaft 378 to prevent relative rotation therebetween. Referring to FIG. 20, keyways 386 and 388 are provided on diametrically opposite sides of the wall of the bore 372 and on the upper end 376 of the upper drive shaft 378, respectively. Received within the confronting keyways 386 and 388 are axially extending keys 390, which insure that undesired relative rotation between the base plate 366 and the drive shaft 378 cannot occur.

The bolt 384 is provided with an axial bore 392 extending therethrough, the outer end of said bore 392 being threaded to receive a lubrication fitting 394. A transverse bore 396 in the upper drive shaft portion 376 intersects the lower end of the threaded bore 380 below the lower end of the bolt 384, and communicates with an annular manifold groove 398 provided in the outer surface of the reduced diameter drive shaft end portion 376. The bushing 362 is provided with a plurality of bores 400 therethrough, aligned with the annular groove 398. Thus, lubricant forced into the bore 392 through the fitting 394 passes through the bore 396, the groove 398, and the bores 400, until it reaches the engaged rotational surfaces between the collar 370 and the bushing 362. The seal 360 blocks the passage of the lubricant downwardly below the upper closure disk 346 into the interior of the core. It should be noted that the flange 364 of the bushing 362, being of greater depth than the counterbore 358 within which it is received, prevents the undersurface of the base plate 366 from engaging with the upper surface of the disk 346.

Referring now to FIGS. 5, 12, 17 and 21A, the top surface of the base plate 366 is provided with six circumferentially spaced threaded bores 402, said bores being positioned on a circle having a diameter equal to about five-eighths that of the plate 366. Positioned on the top surface of the plate 366 are three wings 404, each of which includes a base plate 406 in engagement with the top face of the base plate 366, and a vertical arcuate wall 408.

Referring in particular now to FIG. 21A, the relative dimensions of one of the wings 404 is shown in detail. The base plate 406 is provided with a pivot bore 410, positioned to confront one of the bores 402. An arcuate slot 412 is provided in the plate 406, the center 414 of said slot 412 being radially displaced from the center of the bore 410 by a radial angle A of about 60 degrees.

The outer periphery 416 of the wing 404 is arcuate, and is drawn from a center point P positioned on a radial line extending from the center of the base plate 366 through the center 414 of the slot 412. The center point P is spaced radially from the center of the base plate 366 a distance B, which distance is equal to about one-quarter the radius of the base plate 366. The radius R of the outer periphery 416 of the wing 404 is thus equal to about three-quarters the radius of the base plate 366, whereby the periphery 416 curves more sharply than the outer periphery 368 of said plate 366.

The tip of the leading edge 418 of the arcuate wall 408 is spaced radially a distance C from the center of the opening 410, which distance for a base plate 366 having a diameter of about 8 inches would be about ½ inch. The leading edge 418 extends upwardly at an angle of about 45 degrees, and merges in a rounded corner 420 with the upper edge 422 of the arcuate wall 408, said upper edge 422 being disposed horizontally. The trailing edge 424 of the arcuate wall 408 is vertical, and lies on a radial line displaced 90 degrees from a radial line passing from the center of the base plate 366 through the center of the opening 410. The overall height of each wing 404 will be about 2 inches, for an 8-inch diameter base plate 366.

Each wing 404 is secured to the top surface of the base plate 366 by bolts 426 and 428, the bolt 426 passing through the pivot opening 410 into one of the bores 402, and serving as a pivot pin. The bolt 428 passes through the arcuate slot 412 into another of the bores 402, and the wing 404 can be swung inwardly and outwardly about the bolts 426 by first loosening the bolts 428, positioning the wing 404 to the desired position, and then tightening the bolt 428. The operation of the packer head 18 in general, and of the wings 404 in particular, will be described in detail hereinafter.

The upper drive shaft 378 extends downwardly through the interior of the core 16, and is received within the upper end of a connecting sleeve 430 (best shown in FIGS. 17 and 21). The lower end of the drive shaft 378 is provided with diametrically opposed keyways 432, which are positioned to confront diametrically opposed keyways 434 in the connector sleeve 430. Keys 436 are positioned within the confronting keyways 432 and 434, and function to connect the lower end of the drive shaft 378 to the connector sleeve 430.

Received within the lower end of the connector sleeve 430 is the upper end 438 of a lower drive shaft 440, said upper drive shaft end 438 having diametrically opposed keyways 442 therein positioned to confront keyways 444 in the sleeve 430. Keys 446 are received within the confronting keyways 442 and 444, and function to connect the lower drive shaft 440 to the connector sleeve 430, and hence to the upper drive shaft 378.

The lower drive shaft 440 extends downwardly through the seal 324, the needle bearings 320, the cylindrical bore 242, the needle bearing 262, the sleeve 252, through a bore 448 in the disk 194, and outwardly beneath the lifting harness 22 through a bore 450 in the bottom plate 134 thereof. The lower end of the drive shaft 440 has a diameter substantially less than the internal diameter of the sleeve 252, whereby to provide a substantial flow space around said drive shaft for flow of the oil 270.

The lower drive shaft 440 has an intermediate reduced diameter portion 452 near its lower end, and a further reduced diameter lower end portion 454. The bore 448 in the disk 194 is of greater diameter than the bore 450 through the bottom plate 134, whereby a shoulder 451 is defined for supporting a conventional annular shaft seal 456 to prevent flow of the oil 270 out of the column 20. The bore 448 also includes an intermediate counterbore 458 and an outer counterbore 460, and a ball bearing unit 462 is received within the outer counterbore 460 and is secured by a snap ring 464.

The inner race 461 of the ball bearing 462 is received on the reduced diameter portion 452 of the lower drive shaft 440, and is in engagement with the radial shoulder 466 extending between the main body of the shaft 440 and the reduced shaft portion 452, whereby said lower drive shaft 440 is vertically supported within the column 20. The outer race 468 of the ball bearing 462 has a spherical outer surface, and is received within a mating annular ring 470, whereby the ball bearing unit 462 is self-centering. The purpose for the intermediate counterbore 458 is to provide a space into which the inner and outer races 461 and 468 of the ball bearing 462 can oscillate.

The lower end 454 of the lower drive shaft 440 has a keyway 472 therein, and is received within the cylindrical bore 474 in the hub of a pulley 476, the pulley 476 having a plurality of belt-receiving grooves on the periphery thereof to accommodate a plurality of drive belts 478. A key 480 is received within the keyway 472 and a mating keyway 482 in the hub of the pulley 476 to the drive shaft 440.

Referring to FIGS. 1, 6 to 8, 10 and 11, the drive belts 478 extend from the pulley 476 to the drive pulley 484 of an electric motor 486. The motor 486 is mounted on the lifting harness 22 by a bracket 488, said bracket including a pair of horizontal angle irons 490 positioned with their vertical flanges 492 confronting each other and lying in the same plane.

The horizontal angle irons 490 are connected at their opposite ends by vertical angle irons 494, the base flanges 496 of the angle irons 494 being cut out at the upper and lower ends of said angle irons to accommodate the vertical flanges 492 of the horizontal angle irons 490. A bottom plate 498 extends from the horizontal flange of the lower horizontal angle iron 490, and is welded to the confronting side rail 122 of the lifting harness 22. A vertically disposed gusset plate 500 is welded to the plate 498, and to the vertical flanges 492 of the horizontal angle irons 490.

The face of the column 20 confronting the upper angle iron 490 is provided with a pair of vertically aligned, threaded bores 502, and a base plate 504 is received on said column face and is secured by bolts 506 which pass through holes in the base plate 504 and which are threaded into the bores 502. A brace bar 508 is welded to the forward edge of the horizontal flange of the upper horizontal angle iron 490, and a strut 510 is welded to extend between the base plate 504 and the brace bar 508, whereby to add stability to the motor bracket 488. The width of the base plate 504 and the strut 510 is less than the width of the notches 60, 226 and 230, whereby when the column 20 is moved vertically of the lower bulkhead 52, said elements 504 and 510 can pass through said notches.

The confronting vertical flanges 492 of the horizontal angle irons 490 are provided with horizontally extending slots 512, for receiving bolts 514 utilized to secure the motor 486 to the bracket 488. The elongated slots 514 allow the motor 486 to be shifted, whereby to position the drive pulley 484 in the desired position relative to the pulley 476.

The core 16 and packing head 18 are thus seen to be carried by the lifting harness 22. The rotatable packing head 18 is seen to be connected to the upper drive shaft 378 and the lower drive shaft 440, and to the motor 476 through the drive belts 478 and the pulleys 484 and 476. Further, it is noted that the core 16 is mounted to be free to rotate independently of the column 20 and of the packing head 18. In use, the column 20 can be elevated or lowered by actuating the hydraulic lifting jacks 24, and the packing head 28 can be rotated during elevation or lowering of said column 20.

Because different size cores 16 and packing heads 18 are rotated at different speeds, the motor 476 is of the type which can operate at the different speeds required. Further, it is seen that if for any reason it becomes necessary to rotate the core 16 either clockwise or counterclockwise, this can be done at any time during the production cycle.

*The vibration table and supporting structure*

The cylindrical shell 48 received in the hole 46 has a cover plate 516 welded thereto, and the vibration table 6 of the invention is mounted at the upper end of the well 4 and projects above said cover plate 516. The construction of the vibration table 6 is best seen by reference to FIGS. 1 to 5, 3A, and 12 to 16.

The cover plate 516 has a rectangular notch therein, defined by a rear edge 518 and a pair of parallel side edges 520. The opening defined by the notch in the cover plate is disposed directly above the upper bulkhead 62, and the rear edge 518 of said notch extends parallel to the straight edge 64 of said upper bulkhead.

Referring in particular to FIG. 13, an arcuate section is removed from the upper end of the cylindrical shell 48 to define a notch, said notch being defined by a radial bottom edge 522 and a pair of vertical side edges 524, the side edges 524 meeting with the tips of the side edges 520 of the notch in the cover plate 516. A rectangular supporting plate 526 is received within the notch in the upper end of the cylindrical shell 48, and engages the annular, radial bottom edge 522 of said notch. The supporting plate 526 is welded to the shell 48, and the outer tips 528 thereof (FIG. 3A) extend beyond said cylindrical shell. The inner edge 530 of the supporting plating 526 extends parallel to the rear edge 518 of the notch in the cover plate 516, and has a centrally positioned arcuate cutout 532 (FIG. 3A) therein to provide clearance for passage of the core 16 and packing head 18.

An I-beam 534 is welded to extend across the upper end of the cylindrical shell 84 parallel to the inner edge 530 of the supporting plate 526, said I-beam 534 being positioned on the opposite side of the center line of the cylindrical shell 18 from the supporting plate 526. The I-beam 534 includes a top flange 536, the top surface of which is level with the top surface of the supporting plate 526.

Received within the notch in the cover plate 516 and the notch defined by the side edges 524 and the bottom edge 522 is a rectangular frame 538, comprising front and back plates 540 and 542, and a pair of side plates 544, respectively. The back plate 542 is disposed vertically and is welded to the cover 516 and to the top flange 536 of the I-beam 534, and is braced on the rear side thereof by gusset plates 546 which are welded thereto, and to the I-beam 534 and the cover plate 516.

The side plates 544 extend forwardly from the back plate 542, and are welded to the cylindrical shell 48 along the vertical edges 524. The side plates 544 are also welded to the top flange 536 of the I-beam 534, to the supporting plate 526.

The front plate 540 extends vertically, and is welded to the supporting plate 526 and to the forward vertical edges of the side plates 544. A plurality of spaced angle irons 548 are embedded in the concrete 44, and the front plate 540 is welded thereto to firmly anchor it in position. The plates 540, 542 and 544 comprising the rectangular frame 538 have a greater height than the length of the vertical edges 524, and hence said frame 538 projects substantially above the cover plate 516.

The vibration table 6 is mounted on six spaced cushion supports, three of which are secured to the I-beam 534, and the other three of which are mounted on the supporting plate 526. The supports 550 are all identical in construction, and hence a description of one will suffice for all.

Each of the supports 550 includes a rectangular base plate 552, which is welded to the rectangular frame 538 to be flush with the top surface thereof. The base plates 552 are braced in position by rectangular plates 554, which plates 554 are welded to their associated I-beam 534, supporting plate 526, and the rectangular frame 538.

Referring now in particular to FIGS. 13 and 15, a cylindrical collar 556 is welded to the top surface of each of the plates 552, and is provided with a counterbore 558 in the upper end thereof. A circular plate 560 is received within the counterbore 558, and a thick, circular, resilient cushion 562 is partially received within the counterbore 558 and rests on the circular plate 560. An upper cylindrical collar 564 is positioned to confront the cylindrical collar 556, and has a counterbore 566 in the lower end thereof. A stepped, top circular plate 568 is received within the cylindrical collar 564, the radial shoulder 570 on said stepped plate 568 being in engagement with the bottom wall of the counterbore 566. The upper cylindrical collar 564 is received over the upper end of the cushion 562, and the latter has a thickness substantially greater than the distance between the confronting surfaces of the top plate 568 and the plate 560. Thus, the collars 556 and 564 are mounted in spaced-apart relationship.

The vibration table 6 includes an elongated, rectangular platform 572, which is disposed to rest upon the cushion legs or supports 550. Each of the top plates 568 is provided with a stud 574, and the platform 572 is provided with bores 576 through which said studs project. The platform 572 is secured in position by washers 578 and nuts 580 received on the projecting studs 574.

The platform 572 further includes downwardly projecting elongated bars 582 welded to extend around the periphery thereof, and which thus define a skirt. Rigidity is added to the platform 572 by a pair of longitudinal stringers 584, which are welded to the undersurface of said platform and to the adjacent bars 582. The side plates 544 of the rectangular frame 538 are provided with notches 586 for receiving the stringers 584, which notches are of sufficient width and depth to insure that the stringers 584 will not contact the bodies of the side plates 544 during operation of the vibration table 6.

The platform 572 has a central circular opening 588 therein, which is in alignment with the core 16 and the packing head 18 positioned in the well 4 therebelow. Secured to the underside of the platform 572 on opposite sides of the circular opening 588 is a pair of vibrator units 590. The construction and operation of the vibrator units 590 are described in detail in applicant's co-pending application Ser. No. 336,456, entitled "Vibration Table." Thus, the vibrator units 590 will be described only briefly herein.

The vibrator units 590 are identical, and each includes a rectangular housing 592 open at its upper end, and provided with a peripheral flange 594 which is secured to the undersurface of the vibration table platform 572 by bolts 596. The housing 592 is provided with a drain plug 598, and normally contains an amount of oil sufficient to lubricate the elements mounted therein.

A pair of parallel shafts 600 and 602 extend longitudinally through the housing 592, and are mounted for rotation within the end walls thereof. The shaft 600 has a pair of axially spaced, identical, eccentric weights 604 thereon, and the shaft 602 has thereon a centrally positioned eccentric weight 606, equal in mass to the combined masses of the weights 604, and identical in cross-section to that of said weights 604. The shafts 600 and 602 are interconnected for common rotation in opposite directions by interengaged gears 608 and 610, respectively, mounted thereon.

The shafts 600 of the two vibrator units 590 include end portions which extend beyond the end walls of their associated housings 592. Sprocket gears 612 are mounted on the ends of the shafts 600 projecting from a comon end of their housings 592, and a cog belt 614 extends between and drivingly connects the sprocket gears 612 of the two vibration units 590. The sprocket gears 612 and the cog belt 614 function to insure synchronous operation of the two vibrator units 590.

The other end of one of the shafts 600 has a universal coupling 616 secured thereto, to which coupling 616 in turn is connected one end of a drive shaft 618. The other end of the drive shaft 618 is supported by a pillow block bearing 620, and has a multi-groove pulley 622 mounted thereon. The pulley 622 is connected by a plurality of belts 624 to the pulley 626 on a motor 628 which is mounted to drive said vibrator units 590.

The operation of the vibration table 6 and the vibrating units 590 is substantially identical to that described in applicant's above-identified, co-pending patent application. However, the operation thereof will be briefly described herein, with particular reference to FIGS. 14 and 16.

The shafts 600 and 602 are connected to rotate in opposite directions and at exactly the same speed by the intermeshed gears 608 and 610. Depending upon the relative arrangement of the eccentric weights 604 and 606, the vibrator units 590 can create and exert vibration forces in nearly any direction.

Referring to FIG. 14, it is first assumed that when the weight 606 is in the vertical position shown, the eccentric weights 604 are at the same instant in time, in the vertical position indicated at A. With the weights thus arranged, when the shafts 600 and 602 are rotated, the eccentric weights 604 and 606 will exert a resultant up-and-down vibration force which is strictly vertical, as indicated by the vector A—A in FIG. 16. If now the eccentric weight 606 remains in a vertical position, and the intermeshed gears 608 and 610 are adjusted to rotate the eccentric weights 604 to the position indicated in FIG. 14 by phantom lines at B, then upon operation of the unit 590 the resultant vibration force will be on a 45 degree angle to the horizontal, as is indicated by the vector B—B in FIG. 16.

Further, if the weights 604 are moved to the position indicated at C in FIG. 14 while the weight 606 is vertical, then the resultant vibrational force will be purely horizontal along the vector C—C of FIG. 16. Similarly, if the weights 604 are positioned as shown at D in FIG. 14 while the weight 606 is vertical, then the resultant force upon operation of the vibrator unit 590 will be along the vector D—D in FIG. 16. The relative positions of the weights 604 and 606 can be changed by disengaging the gears 608 and 610, rotating the shafts 600 and 602 to the proper relationship, and then again meshing said gears.

It is thus readily seen that various combinations of relative positions for the weights 604 and 606 can produce various resultant vibrational force directions. However, in the instant invention, a strictly vertical vibration force is desired, and hence the weights 604 and 606 are arranged so that they will point upwardly at the same instant in time.

It should be noted that the cog belt 614 will keep the two vibrator units 590 synchronous; thus, if the weights 604 and 606 of both of said units are arranged to provide a strictly vertical vibrational force, then the cog belt 614 and the sprocket gears 612 will keep the two separate vibrator units 590 synchronous to insure strictly vertical vibrational movement for the vibration table 6.

In operation it is apparent that the vibration table 6 will move rapidly up and down in a vertical direction in response to vibration forces created by the vibrator units 590. The relatively thick cushions 562 cushion vibrational forces and tend to confine them to the vibration table 6, and thus aid in preventing the undesirable transmission of vibration to other structural components of the invention.

*The framework, the hydraulically-operated apron, and the mold*

The framework 10 positioned above the well 4 supports the hydraulically-operated apron 12, which apron 12 functions to clamp a vertically disposed mold 8 to the vibrating table 6. The structure of the framework 10 and the hydraulically-operated apron 12 is best shown in FIGS. 1 to 5, 12 and 22 to 31.

Referring to FIG. 1, a supporting pier 630 is positioned to the left of the well 4 on the concrete platform 44, the construction of said pier being best shown in FIGS. 5 and 12. Referring to FIGS. 5 and 12, the pier 630 comprises an encircling metallic shell 632, filled with reinforced concrete 634. The supporting pier 630 terminates at its upper end in an I-beam extension 635, to the upper side edges of which are welded a pair of projecting flanges 636.

Positioned on the opposite side of the well 4 from the pier 630 is the column 38. The column 38 and the pier 630 are in alignment with the vibration table 6, and in particular with the central opening 588 provided in said vibration table. The cylindrical column 38 terminates at its lower end in an annular flange 638, and a plurality of circumferentially spaced, radial gusset plates 640 are welded to extend between the flange 638 and the body of the column 38. The concrete platform 44 beneath the column 38 is provided with a plurality of embedded, upwardly projecting bolts 642, which pass through aligned, circumferentially spaced bores 644 in the flange 638, said flange being fastened to the bolt 642 by nuts 646 to thereby secure the column 38 in position. As is best shown in FIG. 25, the edge of the flange 638 which confronts the well 4 and the vibration table 6 has an arcuate cutout 648 therein to provide clearance.

Referring to FIG. 27, the column 38 has a circular closure plate 650 welded within the upper end thereof, said plate being provided with a plurality of circumferentially spaced threaded bores 652. Secured to the upper end of the column 38 is an extension 654, which comprises a cylindrical member 656 having a closure plate 658 welded within the lower end thereof. The plate 658 is provided with a plurality of circumferentially spaced bores 660 aligned with the bores 652, and the extension 654 is secured to the column 38 by bolts 662 which pass through the bores 660, and which are received within the threaded bores 652.

The cylindrical member 656 is provided with a cutout 664 in its rear face to provide access to the interior thereof, and as is best shown in FIG. 22 the forward face thereof is cut away to define inclined edges 666, thus providing clearance for the hydraulic apron jack 14 mounted adjacent to the extension 654. The cylindrical member 656 terminates at its upper end in a closure plate 668, which plate 668 rests thereon and is welded in position.

The closure plate 668 is level with the top of the extension 635 on the supporting pier 630, and a fabricated beam 670 rests on said closure plate and on the top of the extension 635, and extends above the vibration table 6. The fabricated beam 670 comprises a pair of confronting front and rear channel members 672 and 674, respectively, which are welded to the closure plate 668. The ends of the channel members 672 and 674 which rest on the pier extension 635 are provided with flanges 676 on the lower edges thereof, which are secured to the flanges 636 by bolts 678. A bottom plate 680 is welded to the undersurfaces of the lower flanges of the channel members 672 and 674, and terminates short of the pier extension 635 and the extension 654 to provide spaces therebetween for reception of the hydraulic apron jacks 14. The channel members 672 and 674 are further braced by transverse end plates 682 welded to extend across the upper, outer ends thereof, and by angled transverse reinforcing plates 684 welded to extend between the vertical sides of said channel members at the opposite ends thereof.

The fabricated beam 670 has mounted thereon a pair of identical apron guides 686, which guides are secured to the apron 12 and which confine said apron to movement in a strictly vertical direction. Referring in particular to FIGS. 22 and 28 to 30, the bottom plate 680 is provided with circular openings 688 near the opposite ends thereof, and cylindrical sleeevs 690 are welded to project downwardly from said bottom plate 680, one of said sleeves 690 being disposed concentrically about each of the openings 688. The channel members 672 and 674 are further braced in the region of the openings 688 by pairs of transverse plates 689, said plates 689 being welded to extend between the members 672 and 674 on opposite sides of the openings 688.

Each of the sleeves 690 has an annular flange 692 welded to the lower end thereof, and a cylindrical guide sleeve 694 is received within each of the cylindrical sleeves 690, the openings in the flanges 692 being of sufficient diameter to provide for ready insertion of the guiding sleeves 694. The sleeves 690 each have four circumferentially spaced bores 695 therethrough near the upper ends thereof, and nuts 697 are welded to the exteriors of said sleeves about the bores 695. Centering bolts 699 are threaded through the nuts 697, and function to center and support the upper ends of the cylindrical guide sleeves 694.

The guide sleeves 694 are provided with counterbores 696 in the opposite ends thereof, and have annular flanges 698 welded to their lower ends; the inner diameters of the flanges 698 are identical to the diameters of the adjacent counterbores 696. Bushings 700 are received and secured within the counterbores 696, and have inner diameters somewhat less than the inner diameters of the guide sleeves 694. The flanges 698 are secured to the flanges 692 by bolts 702, which bolts 702 pass through circumferentially spaced bores 704 in the flanges 698, and are received within threaded bores 706 provided in the flanges 692. Cylindrical pistons 708 are slideably received within the aligned bushings 700, and are closed at their upper ends by plates 710.

Referring to FIG. 31, each flange 698 and its associated guide sleeve 694 are provided with axial, confronting bores 712 and 714, respectively, which communicate with a blind transverse bore 716 that leads to the annular space between the associated guide sleeve 694 and piston 708. A lubrication fitting 718 is threadably received within the outer end of each bore 712, and provides a means for injecting lubricant into said annular space.

The pistons 708 extend vertically downwardly, and terminate at their lower ends in circular flanges 720 welded thereto, and which are attached to the apron 12. The apron 12 in plan view has the general shape of an elongated diamond, with the four corners thereof being rounded, and includes a side rail 722 having reinforcing ribs 724 welded to the opposite external sides thereof. A bottom plate 726 is welded to the side rail 722, and a pair of transverse, vertical plates 728 are welded within the opposite ends of the apron 12 to extend between the opposite walls of the side rail 722, and are also welded to the bottom plate 728. The side rail 722, the plates 728, and the bottom plate 726 thus define an open container for receiving concrete mixture which overflows during filling of a mold 8.

Attaching plates 730 are welded between the opposite upper edges of the side rails 722 at the opposite ends of the apron 12 and to the transverse plates 728, and the flanges 720 are in engagement therewith. The flanges 720 are secured to the attaching plates 730 by circumferentially spaced bolts 732. The apron 12 is thus guided for strictly vertical motion by the pistons 708, which are slideably received within the bushings 700 carried by their associated apron guides 686.

Angle irons 734 are welded to extend between the top edges of the channel members 672 and 674, and are positioned inwardly from the end plates 682. The angle irons 734 include upwardly extending flanges 736, and a pair of spaced, parallel inclined bars 738 are welded to extend between said flanges 736 and the end plates 682. The upper ends 740 of the cylinder members 742 of the hydraulic apron jacks 14 are received between the bars 738 at the opposite ends of the fabricated beam 670, and are pivotally secured thereto by pins 744.

The opposite ends of the apron 12 have pairs of upwardly inclined, spaced ears 746 welded thereto, between which are received the lower ends of the piston members 748 of the hydraulic apron jacks 14, said piston members 748 being secured to the ears 746 by pins 750. The hydraulic apron jacks 14 are provided with fluid fittings 752 and 754 at the upper and lower ends of the cylindrical members 742, respectively, and it is readily seen that by supplying fluid under pressure to the fittings 752, the pistons 748 can be caused to extend to thereby move the apron 12 vertically downwardly. Similarly, by supplying fluid to the lower fittings 754 while exhausting it from the fittings 752, the pistons 748 can be driven upwardly to vertically raise the apron 12.

Referring to FIG. 22, the bottom plate 726 of the apron 12 is provided with a centrally positioned opening 756, a plurality of circumferentially spaced bores 758 being provided in said bottom plate 726 surrounding the opening 756. An adapter flange 760, sized to the dimensions of the mold 8 being utilized, is secured to the underside of the bottom plate 726. The adapter flange 760 includes a radial plate 762 having a plurality of circumferentially spaced bores 764 extending therethrough, which are aligned with the bore 758. Bolts 766 extend through the aligned bores 758 and 764, and secure the adapter flange 760 to the apron 12.

The radial plate 762 of the adapter flange 760 is provided with a centrally positioned, flared opening 768, and has a cylindrical collar 770 welded to the lower face thereof concentrically about the opening 768. The lower edge 772 of the collar 770 is chamfered to provide a guiding surface. A thick, annular, resilient cushion 774 is received within the collar 770 and is secured in position by an adhesive, or by some other suitable fastener means. The cushion 774 is provided with a central opening 776 in alignment with, and of about the same diameter as, the opening 768 in the bottom plate 726; the diameters of the openings 768 and 776 are slightly greater than the external diameter of the core 16, whereby said core can be passed therethrough.

The molds 8 are all identical in construction, and are best shown in FIGS. 1, 1A, 5 and 22. Each of the molds 8 comprises an axially split, cylindrical sheet metal body 778, having a bell-shaped lower end 780. Flanges 782 and 784 are welded to the upper and lower ends, respectively, of the mold body 778, and are diametrically split to provide for opening of the mold 776. As is best shown in FIG. 1A, the confronting edges of the halves of the upper flange 782 are spaced apart, the like confronting edges of the lower flange 784 being similarly spaced.

The axially split molds 8 are held in a closed position by a plurality of axially spaced clasps 788, which can be of any suitable type. The clasps 788 shown in the drawings are of the over-center type, and the construction of one of said clasps 788 is shown in FIG. 1A.

Referring to FIG. 1A, a pair of ears 790 is welded to project radially outwardly from the axially split body 778 along the confronting edges of the axial split 792 therein. Links 794 are pivotally connected at one end thereof to the ears 790, and the other ends of said links are pivotally connected to an over-center operating handle 796. It is readily seen that when the handle 796 is moved to the position shown by phantom lines in said FIG. 1A, the mold 8 will be caused to open along the axial split 792.

The reason for the axially split construction for the molds 8 is so that each can be opened after a pipe section has been cast therein, whereby to provide a small clearance between the internal walls of the mold and molded pipe section to facilitate removal of the latter. It should be noted that the present invention contemplates vibration of the molds 8 only in a vertical direction, which insures that any accidental scoring of the internal surfaces of the molds 8 because of relative movement between the molds and the aggregate-containing concrete mixture therein caused by the vibrations will result in vertical scoring grooves only, and not in circumferentially directed scoring grooves which might function to lock a pipe section within its mold. Thus, the products can be readily removed from the molds.

It is also to be understood that, in place of the axially split molds 8, molds could be utilized which taper slightly inwardly from the bottom to the top thereof. In this instance, the taper of the mold should be sufficient to allow for ready removal of a molded pipe section therefrom.

Referring to FIG. 22, an annular forming band 798 is secured within the upper end of each mold 8, and has an internal configuration conforming to the desired external configuration for the spigot end of the molded pipe section. The band 798 can be accurately dimensioned, and because of the method and apparatus employed in the present invention, the finished molded pipe section will conform to the internal configuration of the band 798 within very close tolerances.

Referring in particular to FIG. 5, the vibration table 6 is provided with an adapter flange 800, sized to the dimensions of the mold 8 being utilized therewith. The adapter flange 800 comprises an annular plate 802, having an annular rim 804 secured to the lower face thereof, the rim 804 having an outer diameter just slightly less than the diameter of the opening 588 in the platform 572 of the table 6. The top face of the table platform 572 has an annular recess 801 therein (FIG. 14) within which the plate 802 is received. Thus, when the adapter flange 800 is placed on the platform 572 with the rim 804 received within the opening 588, it will be properly positioned thereon and will be secured against relative sliding motion. The plate 802 is provided with a circular opening 806 disposed concentrically of the rim 804, and has a plurality of circumferentially spaced ears 808 welded to the upper surface thereof, radially outwardly of said opening 806. The ears 808 have tapered surfaces 810 on the inner edges thereof for guiding the flange 784 on the lower end of a mold 8 into position, and the inner edges of said ears 808 lie on a circle having a diameter slightly greater than the external diameter of said flange 784. Thus, the ears 808 function to position the flanges 784 concentrically of the openings 806 and 588 during placement of molds 8 on the vibration table 6.

A mold form 812 (FIG. 5) is secured within the lower end of each mold 8, and has an external configuration corresponding to the desired internal configuration for the socket end of the molded pipe section. The mold form 812 is provided on the lower end thereof with a plurality of circumferentially spaced lugs 814, which are received within the opening 806 in the plate 802 to further insure proper centering of the associated mold 8. When a mold 8 has been placed in position on the vibration table 7, with the lower flange 784 thereof properly positioned on the adapter flange 800, the hydraulic apron jacks 14 are actuated to move the apron 12 downwardly. The upper flange 782 on the mold 8 disposed on the table 6 is thereby received within the collar 770 on the adapter flange 760, the chamfered edge 772 on said collar facilitating entry of said flange 782. After the flange 782 engages the resilient cushion 774, the hydraulic apron jacks 14 are further actuated to somewhat compress said cushion 774. Thus, the mold 8 is clamped tightly in a vertical position on the vibration table 6, and in effect is cushioned at its opposite ends between the resilient cushion 774 and the resilient cushions 552. The mold 8 is clamped between the cushions 774 and 552 with force sufficient to retain it in a vertical position during vibration, but not so great as to adversely affect vibration of the mold. As the vibration table 6 vibrates vertically, the resilient cushion 774 functions to cushion such vibrations, whereby to keep the mold 8 tightly clamped in position. When the mold 8 has been properly filled, the hydraulic apron jacks 14 are actuated to elevate the apron 12, thereby releasing the mold 8 from its clamped position.

*The mold indexing and transfer mechanism*

The molds 8 are placed in position on, and are removed from, the vibration table 6 by the mold indexing and transfer mechanism 34, which is best shown in FIGS. 1 to 5 and 22 to 27.

Referring in particular to FIGS. 26 and 27, the cylindrical column 38 has axially spaced, lower and upper annular flanges 816 and 818 welded thereto, said flanges being spaced inwardly from the opposite ends of said column 38. The lower flange 816 has an annular ball-bearing race 820 on the upper, outer edge thereof, and the upper flange 818 has a similar race 822 formed thereon. A plurality of ball bearings 824 is received in the lower race 820, said balls being carried by a frusto-conical carrier 826.

A cylindrical sleeve 828 is telescopically received on the column 38, and has an inner diameter substantially larger than that of said column. The sleeve 828 has a flange 830 on the lower end thereof, said flange having a ball-bearing race 832 formed on the lower, inner edge thereof, which race 832 is positioned to confront the ball-bearing race 820 and to engage with the ball-bearings 824.

The upper end of the sleeve 828 has a counterbore 834 therein, and an annular flange 836 is welded to the upper end of said sleeve and extends radially inwardly over the counterbore 834 and nearly into engagement with the column 38. A cylindrical ball-bearing carrier 838 is welded centrally of the annular flange 836 to project downwardly therefrom, and carries a plurality of ball-bearings 840 which are received within the race 822. Thus, the cylindrical sleeve 828 is rotatably mounted on the column 38 by the ball-bearings 824 and 840.

An annular cylindrical ring 842 is disposed to rest in notches 844 cut in the gussets 640 which extend between the flange 638 and the column 38, the ring 842 having an internal diameter larger than the external diameter of the cylindrical sleeve 828, and being welded in position concentrically thereabout. The axial height of the ring 842 is equal to about one-third the distance between the top surface of the flange 638 and the bottom surface of the flange 830, and said ring 842 is positioned about midway between said two flanges. Referring in particular to FIGS. 24 to 26, the annular ring 842 has a notch 846 extending axially therethrough on the side of said ring facing the vibration table 6, said notch 846 being disposed on a line extending from the center of the column 38 to the center of the opening 588 provided in the vibration table platform 572.

The carriages 36 are supported on the cylindrical sleeve 828 by upper and lower carriage supports 848 and 850, respectively. It will be noted that in the embodiment of the invention shown four carriages 36 are employed, spaced 90 degrees apart around the periphery of the cylindrical sleeve 828. Accordingly, four upper supports 848 and four lower supports 850 are also employed.

Referring to FIG. 23, the upper carriage supports 848 are shown in plan view, each of said supports including an arcuate segment 852 provided with a plurality of elongated slot openings 854. The slots 854 extend parallel to each other, and each segment 852 is secured by bolts 856 to an annular flange 858 welded to the cylindrical sleeve 828 centrally thereof. A pair of parallel arms 860 is welded to each arcuate segment 852, and project radially outwardly therefrom. A pair of confronting rollers 862 is secured to the outer ends of the parallel arms 860 by bolts 864.

The lower carriage supports 850 are shown in plan view in FIG. 24, and each of said supports 850 includes an arcuate segment 866 secured to the flange 830 by bolts 868. A pair of parallel arms 870 is welded to each of the segments 866, and project radially outwardly therefrom a distance substantially less than the distance which the arms 860 project from the segments 852. A pair of oppositely directed rollers 872 is mounted on each pair of arms 870 by bolts 874. It should be noted that the parallel arms 870 are spaced closer together than are the parallel arms 860, and that the rollers 872 project outwardly beyond the tips of their associated arms 870.

Each of the carriages 36 includes a pair of parallel, vertical rectangular bars 876, which bars are spaced apart so that the distance measured between their outer surfaces is just slightly less than the distance measured between the confronting surfaces of the parallel arms 860 on the upper carriage support 848. The rollers 872 and the arms 870 are proportioned so that the distance measured between the outer edges of the oppositely extending rollers 872 is just slightly less than the distance measured between the confronting inner surfaces of the bars 876. Thus, the vertical, parallel bars 876 are received between the arms 860 (FIG. 23), and are disposed outwardly of the rollers 872 (FIG. 24).

A vertically disposed plate 878 is welded to the front edges of each pair of parallel bars 876, that is, the edges of said bars which face away from the cylindrical sleeve 828. The plate 878 serves to connect the parallel bars 876, and the rollers 872 on the lower supports 850 are positioned to engage with the inner surface of said plate. The rollers 862 on the upper carriage supports 868, by distinction, are positioned to engage the outer surface of the plate 878 along the vertical side edges thereof.

The vertical plate 878 has a roller 880 mounted on the face thereof confronting the cylindrical sleeve 828, said roller 880 being carried by a bolt 882, and having a diameter slightly less than the width of the notch 846 in the ring 842. The center line of the roller 880 is positioned midway between the parallel vertical bars 876, and is arranged to roll on the track defined by the upper surface of the annular cylindrical ring 842.

Each carriage 36 further includes a pair of horizontally spaced, parallel angle irons 884, which are welded at their inner ends to the external surfaces of the parallel bars 876 near the upper ends thereof. The angle irons 884 are braced by an angle iron cross-member 886 positioned medially the length thereof, and by gusset plates 888 welded to extend between said cross-member 886 and the vertical plate 878. A vertical end plate 890 is welded to the outer ends of the angle irons 884, and said angle irons 884 are provided on the top surface thereof with a pair of parallel, aligned pins 892.

Inclined angle irons 894 extend from the rear face of the end plate 890 to near the lower ends of the parallel bars 876, and are welded in position, the upper ends of the inclined angle irons 894 having a transversely extending angle iron 891 welded therebetween. Gusset plates 896 are welded to extend between the angle irons 884 and 894 to further brace the carriage assembly.

Referring to FIG. 22, it will be seen that the upper and lower rollers 862 and 872 and the vertical plate 878 will cooperate when a weight is placed on the carriage 36 in the vicinity of the pins 892 to retain the parallel bars 876 in a vertical position. At the same time, the rollers 862 and 872 make it possible to readily raise and lower the carriage 36 relative to the cylindrical sleeve 828 on the column 38.

Received on the pins 892 carried by each carriage 36 is an adapter 898, sized to the dimensions of the mold 8. Each adapter 898 includes an angle iron 900 having a pair of aligned, spaced holes 902 in the upper, horizontal flange thereof, positioned to be engageable on the pins 892. The holes 902 are positioned so that when the angle iron 900 is positioned on the pins 892, the vertical flange 904 of said angle iron will engage with the external surface of the end plate 890.

The adapter 898 further includes a pair of spaced, parallel arms 906 welded to the vertical flange 904 of the angle iron 900 to project outwardly therefrom, said arms 906 being braced by gusset plates 908. The arms 906 have upwardly facing, generally V-shaped notches 910 therein near their outer ends.

Each of the molds 8 is provided with a pair of diametrically opposed, oppositely extending stub shafts 912, braced by gussets 914 extending between the top surfaces thereof and the adjacent surface of the mold body 778. The stub shafts 912 are each provided with a pair of axially spaced flanges 916, which are spaced apart a distance slightly greater than the thickness of one of the parallel arms 906. The portions of the stub shafts 912 positioned between the flanges 916 are receivable in the notches 910 in the arms 906.

The mechanism 34 is further provided with lifting apparatus to raise the rollers 880 out of the notch 846 provided in the annular ring 842, which thereby also raises the associated carriage 36. Referring now in particular to FIGS. 23 to 26, a pair of ears 918 is welded to the flange 638, and is positioned diametrically opposite the notch 846 in the annular ring 842. The lower end of the cylindrical column 38 is provided with front and rear notches 920 and 922, respectively, both of which are in alignment with the spaced ears 918 and the notch 846, the front notch 920 having a greater height than the rear notch 922. A lifting arm 924 extends through the aligned notches 920 and 922, and terminates at its rear end in an upwardly extending pivot arm portion 926 provided with a bore 928. The pivot arm portion 926 of the lifting arm 924 is connected to the ears 918 by a pin 930.

The lifting arm 924 is proportioned so that the lower surface 932 of the forward end thereof can engage and rest on the flange 638. The forward end of the lifting arm 924 is provided with a top surface 934, positioned so that when the lower surface 932 is in engagement with the flange 638 said surface 934 will project above the top surface of the flange 638 a distance equal to about one-third the distance between said flange 638 and the center line of the pin 930. The width of the forward end of the lifting arm 924 is slightly less than the width of the notch 846, so that it can be received within said notch. When the lifting arm 924 is elevated to the position indicated by phantom lines in FIG. 26, the top surface 934 of the forward end thereof will be positioned substantially flush with the top surface of the annular ring 842, whereby it will form a continuation of the track defined by said top surface.

The lifting arm 924 is provided with a centrally positioned pivot bore 936, which is positioned vertically so that it will be aligned with the bore 928 when the lower surface 932 of said lifting arm is in engagement with the flange 638. A yoke 938 is pivotally connected to the lifting arm 924 by a pin 940 passing through the bore 936, and a lift rod 942 is connected to said yoke 938 and extends upwardly therefrom.

Referring now to FIG. 27, aligned bores 944 and 946 are provided in the plates 650 and 658, respectively, said bores being substantially larger in diameter than the lift rod 342. The upper end of the lift rod 942 is received within the bores 944 and 946, and has a yoke 948 mounted thereon. The cylindrical member 656 has a pair of aligned notches 950 and 952 therein, the notch 952 extending vertically a distance greater than the notch 950. A pair of ears 954 is welded to the cylinder 656 adjacent the notch 950, and an actuator arm 956 extends through the openings 950 and 952, and is pivotally attached at one end thereof to the ears 954 by a pivot pin 958. The notches 950 and 952 are positioned so that the actuator arm 956 extends at a right angle to the lifting arm 924, and the actuator arm 956 is pivotally connected to the yoke 948 by a pin 957.

The rear channel 674 of the fabricated beam 670 has a pair of ears 960 welded thereto directly above the opening 952, and the upper end of the cylindrical member 962 of a form lifting hydraulic jack 964 is pivotally connected to said ears 960 by a pin 966. The lower end of the piston 968 of the hydraulic jack 964 extends downwardly and terminates in a yoke 970, said yoke 970 being pivotally connected to the extending end of the actuator arm 956 by a pin 972. The hydraulic jack 964 has upper and lower fluid fittings 974 and 976, and is operable by fluid pressure to raise and lower the lift rod 942.

The cylindrical sleeve 828 is provided adjacent the upper end thereof with an annular flange 978. An annular gear 980 is received over the upper end of the sleeve 828, and is disposed to rest on the flange 978, to which it is secured by bolts 982. The indexer motor 40 is mounted on the column 38 by a bracket 984, and has a gear 986 secured to the output shaft thereof which engages with the gear 980, whereby the cylindrical sleeve 828 can be rotated about the column 38 by said motor. The bracket 984 comprises an arcuate plate 988 secured to the column 38 by bolts 990, said plate 988 having a pair of bracket arms 992 extending therefrom to which the motor 40 is secured by bolts 994.

The operation of the mold indexing and transfer mechanism is as follows. Assuming that the apparatus is in the condition shown in FIG. 22, with a concrete product 996 having been formed within the mold 8 positioned on the table 6, the hydraulic apron jacks 14 are first actuated to elevate the apron 12. The hydraulic jack 964 is then actuated by admitting pressurized operating fluid into the lower fitting 976, whereupon the lift rod 942 is raised to thereby elevate the lifting arm 924. When the lifting arm 924 is elevated, the roller 880 is raised out of the notch 846, which thereby also causes the entire carriage 36 and the adapter 898 positioned over the table 6 to be elevated.

The distance between the top surface 934 of the lifting arm 924 when said lifting arm is in its "DOWN" position, with the bottom surface 932 thereof in engagement with the flange 638, and the upper surface of the annular ring 842 is such that: (1) when said lifting arm 924 is lowered to its "DOWN" position the flange 784 on the mold 8 will rest on the adapter 800, and the arms 906 will be out of engagement with the stub shafts 912; and (2) when said lifting arm 924 is elevated so that the surface 934 is level with the upper surface of said annular track 842, the arms 906 will engage the stub shafts 912 and hold the mold 8 elevated so that the flange 784 thereon will be spaced vertically above the ears 808.

After the hydraulic jack 964 has been actuated to raise the carriage 36 to thereby elevate the flange 784 above the ears 808, the indexer motor 40 is actuated to rotate the cylindrical sleeve 828 through 90 degrees, whereby to transfer the mold 8 containing the product 996 off the vibration table, and to bring the next mold 8 into position over said vibration table.

While the cylindrical sleeve 828 is rotating through 90 degrees to the next position, the hydraulic jack 964 is automatically actuated, in a manner hereinafter described, in a reverse direction to thus lower the lifting arm 924 into engagement with the flange 638. The control circuit of the invention is arranged to rotate the cylindrical sleeve 828 through 90 degrees, thus bringing the next mold 8 into position over the adapter 800. At this point, the roller 880, associated with the carriage 36 which is carrying the next mold 8, will enter the notch 846. The lifting arm 924 being at this point lowered, the roller 880 will enter the notch 846, thus lowering the said next mold 8 onto the adapter 800. As has been described earlier, when a mold 8 is thus lowered, the tapered surfaces 810 on the ears 808 guide the flange 784 properly into position.

The control circuit for the invention, as will be described hereinafter, is arranged to cause the indexer motor 40 to cease operation when the rollers 880 enter the notch 846. The hydraulic apron jacks 14 are actuated after an empty mold 8 is in position on the vibration table 6 to lower the apron 12 for clamping said mold in position, and this completes one full cycle of operation for the mold indexing and transfer apparatus 34.

*The concrete mixing and mold charging apparatus*

The concrete mixing and mold charging apparatus 26 is positioned behind the well 4 and the framework 10, and includes the batch mixing and weighing apparatus 28 which empties mixed concrete into the hopper 30, from which hopper it is carried by the conveyor 32 to the apron 12. The apparatus 26 is best shown in FIGS. 1 to 4 and 32 to 36.

Referring now to the drawings, the apparatus 26 is supported on the concrete floor 44 by four vertically disposed I-beams 998, which have base plates 1000 secured to their lower ends. The base plates 1000 have holes therein for receiving the upper ends of bolts 1002 embedded in the floor 44, and are secured in position by nuts 1004. A pair of I-beams 1006 are welded to the upper ends of the I-beams 998, and include rearwardly extending portions 1008, the I-beams 1006 extending transversely of the apparatus 26 between the front and rear I-beams 998 disposed at each end of the supporting framework 1010 of which the I-beams 998 and 1006 are a part.

Extending between the front and rear I-beams 998 at each end of the framework 1010 are transversely extending, confronting channel members 1012, the members 1012 being positioned vertically above the floor 44 so that their upper edges lie about midway of the vertical distance between the apron 12 and the carriages 36. The channel members 1012 support the inner end of the conveyor 32, as well as the hopper 30, and have positioned thereon a pair of longitudinally extending, confronting channel members 1014, the channel members being positioned near the forward ends of the channel members 1012.

Referring to FIGS. 4 and 32–34 in particular, a circular plate 1016 is disposed to rest upon the longitudinally extending channel members 1014, and has a plurality of threaded bores 1018 therein positioned to confront bores 1020 in the top, horizontal flanges of the channel members 1014. Bolts 1022 extend through the bores 1020 and are received within the threaded bores 1018, and function to secure the circular plate 1016 to the channel members 1014, and hence to the framework 1010.

The upper surface of the circular plate 1016 has an annular bearing race 1024 therein near its outer periphery, within which is received a plurality of ball bearings 1026, the ball bearings 1026 being carried by an annular ring 1028. Disposed to rest upon the circular plate 1016 is a square turntable plate 1030, the plate 1030 having an annular race 1032 in the lower surface thereof positioned to confront the race 1024, and to receive the ball bearings 1026. The plates 1030 and 1016 are secured together at the center thereof by a bolt 1034, and the square plate 1030 has a circular skirt 1036 welded to the undersurface thereof and extending about the circular plate 1016.

The square turntable plate 1030 has front and rear plates 1038 and 1040 welded to the front and rear edges thereof, respectively, the plates 1038 and 1040 extending laterally from the side edges of the plate 1030. The rear plate 1040 projects both above and below the square turntable plate 1030, whereas the front plate 1038 only extends vertically above said plate 1030.

Welded to the ends of the front plate 1038 is a pair of vertically extending angle irons 1042, a similar pair of angle irons 1044 being welded to extend vertically from the opposite ends of the rear plate 1040. Channel members 1046 extend transversely between the ends of the front and rear plates 1038 and 1040, and function to brace the framework carried by the turntable plate 1030. The upper ends of the front and rear angle irons 1042 and 1044 are bridged by transversely extending angle irons 1048, positioned with their horizontal flanges confronting, the angle irons 1048 projecting forwardly beyond the front angle irons 1042 and rearwardly beyond the rear angle irons 1044. The forward ends of the angle irons 1048 are connected by an angle iron 1050, disposed with its horizontal flange facing outwardly, and the rear ends of said angle irons 1048 are connected by an angle iron 1052, disposed with its horizontal flange facing inwardly toward the angle iron 1050.

The hopper 30 is supported by the angle irons 1048, 1050 and 1052, and comprises a vertical front plate 1054, a pair of inwardly inclined, generally triangular-shaped side plates 1056, and an inwardly inclined, generally triangular-shaped rear plate 1058, the edges of the plates 1054, 1056 and 1058 being welded to rounded corner sections 1060. The hopper 30 is disposed to rest on the side angle irons 1048 and the front and rear angle irons 1050 and 1052, and is welded thereto. The hopper 30 terminates at its lower end in a transversely elongated opening 1062 (best seen in FIG. 2), and the lower end thereof is braced by a pair of inclined angle irons 1064 extending between the forward edge of the hopper 30 and the front, vertical angle irons 1042.

The hopper 30 has a pillow block bearing 1066 secured to the front plate 1054 thereof directly over the opening 1062, and positioned upwardly from said opening about one-third the height of the hopper. A similar pillow block bearing 1068 is secured to the inwardly inclined, rear plate 1058 of the hopper 30, and a shaft 1070 is rotatably mounted within the aligned pillow block bearings 1066 and 1068, and projects rearwardly from the hopper 30. A plurality of hubs 1074, each having a radially projecting finger 1072 thereon, is received on the shaft 1070, the hubs 1074 being secured in spaced relation to said shaft with each finger 1072 being displaced about 120 degrees from its two next adjacent fingers.

Figure 4:
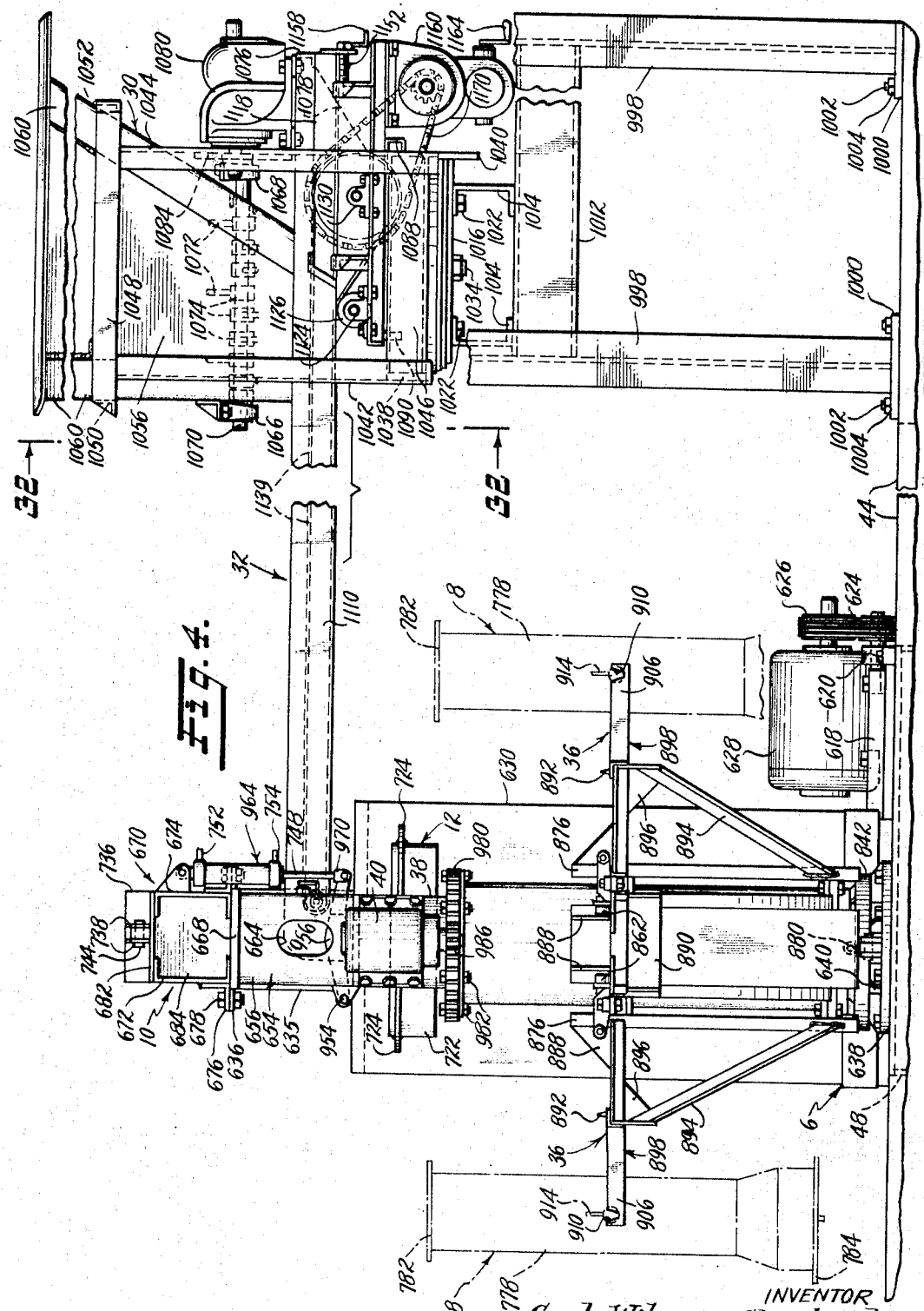
FIG. 4 is a enlarged fragmentary, side elevational view, taken along the line 4—4 in FIG. 2.

A motor bracket 1076 is welded to the rear angle irons 1044, and includes a supporting gusset plate 1078 (shown by broken lines in FIGS. 4 and 32). A motor 1080 is mounted on the bracket 1076, and includes a pulley 1082 which is drivingly connected by a belt 1086 to a pulley 1084 carried by the free end of the shaft 1070. Thus, when the motor 1080 is activated, the shaft 1070 will be caused to rotate, and the fingers 1072 carried by said shaft will function to agitate and work downwardly concrete mixture disposed within the hopper 30.

Welded to extend longitudinally between the rear angle irons 1044 at the upper edge of the rear plate 1040 is a channel member 1088. A longitudinally extending bar 1090 is welded to extend between the transverse channel members 1046 near the forward ends thereof, the top flanges 1092 of said channel members 1046 having notches 1094 therein to receive the opposite ends of said bar 1090. The top surfaces of the bar 1090 and the channel member 1088 lie in a common horizontal plane, and a pair of spaced, parallel angle irons 1096 are received and welded thereon, the angle irons 1096 being disposed with their horizontal flanges 1098 disposed at the top thereof, and extending oppositely. The forward ends of the angle irons 1096 are bridged by an end plate 1100, and the rear ends thereof extend rearwardly beyond the channel member 1088, and have a mounting plate 1102 welded to extend between the lower edges thereof.

Welded to extend vertically from the top flanges 1098 of each of the angle irons 1096 is a pair of axially spaced, vertical supporting angle irons 1104, the supports 1104 on the angle irons 1096 being positioned oppositely each other, and being interconnected by transverse angle irons 1106 disposed with their vertical flanges directed downwardly. The horizontal flanges 1108 of the transverse angle irons 1106, which are thus part of a frame including the angle irons 1096 and 1104 and the plates 1100 and 1102, function to support the inner end of the conveyor 32.

The conveyor 32 includes a pair of elongated, rectangular side plates 1110 which are connected by an inverted, elongated, U-shaped channel member 1112. The distance measured transversely between the outer edges of the side plates 1110 is substantially less than the distance between the angle iron rails 1096, as is best shown in FIG. 36. Inclined, front spacer blocks 1114 are welded externally of the side plates 1110 in the vicinity of the front pair of supports 1104 and rear, vertically disposed spacer blocks 1116 are welded to the exterior of the side plates 1110 at the rear ends thereof. Welded to the spacer blocks 1114 and 1116 on each side of the conveyor 32 are angle irons 1118, the lower, horizontal flanges 1120 of which project outwardly from the side plates 1110. Generally L-shaped hooks 1122 are welded to the upper ends of the supports 1104, and engage over the horizontal flanges 1120 to secure the side plates 1110 against displacement vertically, while allowing for translational movement thereof relative to the supports 1104.

A pair of opposed pillow block bearings 1124 is secured to the rails 1096 near the forward ends thereof, and support therebetween an idler roller 1126 mounted upon a shaft 1128. A similar pair of pillow block bearings 1130 is positioned medially of the rails 1096, and support a driving drum 1132 fixed to a shaft 1134. A roller 1136 is supported on a transversely extending shaft 1138 at the forward end of the conveyor 32, and an endless belt 1139 is received over the drum 1132 and the roller 1136, and engages the top surface of the idler roller 1126.

As is best seen in FIGS. 35, 36, the channel member 1122 terminates at its forward end short of the roller 1136, and the vertical flanges 1140 thereof have arcuate cutouts 1142 at their rear ends to provide clearance for the drum 1132. The side plates 1110 also have cutouts 1144 therein to provide clearance for the drum 1132, which drum, as is best shown in FIG. 36, extends laterally beyond said side plates 1110. As is also best shown in FIG. 36, the channel member 1112 terminates a short distance forwardly of the center line of the drum 1132, and is positioned vertically from the shaft 1134 supporting the drum 1132 a distance slightly less than the radius of said drum. Thus, the endless belt 1139 is arranged to feed substantially tangentially from the drum 1132 as said drum rotates counterclockwise, as viewed in FIG. 35.

A plate 1146 is welded to extend between the rear ends of the side plates 1110, and extends downwardly therefrom. The vertical flange 1150 of the rear transverse angle iron 1106 has a rearwardly extending stud bolt 1152 welded thereto, which is receivable within an aligned bore 1154 in the downwardly projecting portion of the plate 1146. A nut 1156, having a handle 1158 welded thereto, is received on the stud bolt 1152, and by tightening the nut 1156, it is readily seen that the side plates 1110 can be caused to slide forwardly relative to the supports 1104. Such forward movement causes the endless belt 1139 to be stretched between the roller 1136 and the drum 1132, and over the outer surface of the idler roller 1126. Thus, the tension on the endless belt 1139 can be readily adjusted merely by turning the handle 1158.

A motor 1160 is secured to the mounting plate 1102 by bolts 1162, and includes a variable speed drive operable by a handle 1164. The free end of the shaft 1134 supporting the drum 1132 has a sprocket gear 1166 mounted thereon, which is in alignment with a smaller driving gear 1168 mounted on the output shaft of the variable speed motor 1160. A chain 1170 interconnects the gears 1166 and 1168, and provides a positive drive, that is, a drive that will not slip, between the motor 1160 and the drum 1132. By manipulating the handle 1164, the speed of the output gear 1168 on the motor 1160 can be readily varied, whereby the speed at which the endless belt 1139 moves can be readily adjusted to provide the desired rate of flow of concrete mixture into a mold 8. It will be noted that the forward end of the conveyor 32 is positioned centrally over and above the opening 768 in the apron 12, so that concrete mixture carried on the belt 1139 will be dumped directly into a mold 8 positioned below said opening 768, any excess material being captured and held by the apron.

The I-beams 998 are cross-braced near the upper end thereof by bracing 1172, to prevent the framework 1010 from swaying. Welded to the transverse I-beams 1006 to extend upwardly therefrom are front and rear, vertical I-beams 1174 and 1176, respectively, which terminate at their upper ends in flanges 1178 which are secured to a ceiling 1180, or some other suitable overhead structure. Supported by the transverse I-beams 1006 and the I-beams 1174 and 1176 is the automatic batch weighing and mixing apparatus 28. The apparatus 28 is of conventional construction, and is designed to automatically weigh the aggregate and cement for a batch of concrete mixture to provide the desired proportions and amount, and to then automatically mix the constituents to the desired consistency. A hopper 1182, supported by framing members 1184, is positioned directly above the apparatus 28, and functions to receive materials to be utilized by said apparatus 28.

Two spaced, inclined rails 1186 are secured at their lower ends to the earth 42, and at their upper ends 1188 to the ceiling 1180 directly over the hopper 1182. The lower ends of the rails 1186 have parallel rails 1190 secured thereto in spaced relationship. A cart 1192 is arranged for travel on the rails 1186, and includes wheels 1194 receivable between the confronting rails 1186 and 1190. A pulley 1196 is provided between the rear I-beams 1176 at the upper ends thereof, and the cart 1192 is also provided with a pulley 1198 mounted centrally on a pivoted handle 1200. One end 1202 of a rope or cable 1204 is secured between the upper end of the I-beams 1176 directly beneath the pulley 1196, and passes downwardly over the pulley 1198, and then upwardly over the pulley 1196. Thus, the pulleys 1196 and 1198 and the rope or cable 1204 provide a block and tackle arrangement for elevating the cart 1192 to the hopper 1182. Stops 1206 are provided on the rails 1186 over the hopper 1182, and are positioned so that the cart 1192 will be halted thereby when it reaches said stops 1204 so that the contents thereof can be readily dumped into the hopper 1182.

In operation, ingredients for a concrete mixture are carried to the hopper 1182 by the cart 1192, and are dumped thereinto. The apparatus 28 then functions to mix a batch of concrete of predetermined amount, and dumps said mixture into the feed hopper 30. After a mold 8 has been placed in position on the vibrating table 6 and has been clamped by the apron 12, the motors 1180 and 1160 are activated, whereby the concrete mixture is fed from the hopper 30 onto the inner end of the moving belt 1139 of the conveyor 32. The speed of the endless belt 1139 of the conveyor 32 is adjusted by the handle 1164 to correspond to the rate at which the core 16 and the packing head 18 moves vertically of the mold 8, and the conveyor 32 conveys the concrete mixture to a waiting mold 8.

When the packing head 18 has moved vertically completely through the mold 8, the operation of the conveyor 32 and of the motor 1080 is automatically halted by the control circuitry of the invention, the vibration table 6 is deenergized and allowed to stop, and the core 16 and the packing head 18 are automatically retracted, after the packing head is first cleaned with a stiff bristle club. Any surplus of concrete mixture remaining within the apron 12 that is from one molding cycle is manually placed in the next mold 8 after it has been transferred into position on the vibration table 6.

*The hydraulic unit and the hydraulic system*

The hydraulic jacks 14, 24 and 964 are all supplied with operating fluid from a hydraulic unit 1208, the unit 1208 being best shown in FIGS. 37 to 41, and being indicated diagrammatically in FIG. 43 as a component of the hydraulic system of the invention.

The hydraulic unit 1208 is placed in the vicinity of the pipe making machine 2, and is connected with the various hydraulic jacks by suitable conduits to be described hereinafter. The hydraulic unit 1208 includes a reservoir 1210, comprising a horizontal portion 1212 and a vertical portion 1214. The reservoir 1210 includes bottom and top walls 1216 and 1218, respectively, outer end walls 1220 and 1222, and side walls 1224. The side walls 1224 are generally L-shaped, and each includes a horizontal portion 1226 and a vertical portion 1228, the end wall 1222 being coextensive in height with the vertical side wall portions 1228. An inner end wall 1230 is welded to the inner edges of the vertical side wall portions 1228, and extends downwardly into the horizontal reservoir portion 1212 a distance equal to about one-half the height thereof.

The vertical reservoir portion 1214 is closed by a bottom plate 1232, having a circular opening 1234 therein. A web 1236 extends diametrically across the opening 1234, and is provided with a central opening 1238. The lower end of a cylindrical collar 1240 is received within the opening 1234 and is welded to the bottom plate 1232, and has external threads 1242 on the upper end thereof.

The vertical reservoir portion 1214 is closed at the upper end thereof by a top plate 1244, said top plate having a collar bushing 1246 mounted thereon in alignment with the opening 1238 in the web 1236. An elongated valve stem 1248 is slideably received within the bushing 1246, and the lower end thereof projects downwardly through the opening 1238 in the web 1236. The valve stem is normally secured in an "OPEN" position by a key 1250, which passes through aligned bores in the bushing 1246 and the valve stem 1248.

Welded to the valve stem 1248 near the lower end thereof is a downwardly facing, cup-shaped valve disk 1252, having internal threads 1254 which are engageable with the threads 1242 on the collar 1240. The disk 1252 is positioned vertically on the valve stem 1248 so that it will be spaced a substantial distance above the top edge of the collar 1240 when the valve stem 1248 is secured in an "OPEN" position by the key 1250. When the key 1250 is removed, the valve stem 1248 is slid downwardly through the collar 1240 and the opening 1248, whereby the disk 1252 is brought into engagement with the collar 1240. The valve stem 1248 is then rotated by means of a loop handle 1256 on the upper end thereof, whereby the disk 1252 is threaded onto the collar 1240, thereby closing the passage between the vertical reservoir portion 1214 and the horizontal reservoir portion 1212.

The horizontal reservoir portion 1212 has a transverse wall 1258 therein spaced axially a short distance from the vertical reservoir portion 1214, said wall 1258 having a rectangular cutout opening 1260 in the upper end thereof. The opening 1260 has a height and a width equal to about one-third and two-thirds, respectively, of the height and width of the horizontal reservoir portion 1212. A circular opening 1262 is positioned in the wall 1258 about medially of the length of the rectangular opening 1260, and upwardly from the bottom edge of said wall 1258 a distance equal to about one-third the height thereof. A longitudinally extending baffle plate 1264 is welded at its opposite ends to the wall 1258 and the end wall 1220, and is provided with a plurality of spaced bores 1266 therethrough. The baffle plate 1264 is positioned directly below the vertical edge 1268 of the opening 1260, and extends vertically for about one-half the height of the horizontal reservoir portion 1212.

In use, the horizontal and vertical reservoir portions 1212 and 1214 are substantially filled with an operating fluid 1270, the valve disk 1252 being normally in the "OPEN" position shown in FIG. 37. The vertical reservoir portion 1214 is equipped with a fluid level gauge 1272, mounted on the top plate 1244 thereof, whereby the level of the fluid 1270 can be readily determined. The top plate 1244 of the vertical reservoir portion 1214 is provided with an access plate 1274 positioned over an access opening 1276 therein, said plate 1274 being secured by bolts 1278. Similarly, the horizontal portion 1226 of one of the side walls 1224 has a pair of spaced access plates 1280 secured thereon over access openings therein, said plates being secured by bolts 1282.

The reservoir 1210 has a pair of stub legs 1284 welded at the lower, outer corners of the vertical reservoir portion 1214, and a pair of vertical angle irons 1286 is welded to the outer corners of the horizontal reservoir portion 1212, the lower ends of said angle irons 1286 defining a second pair of legs for supporting the reservoir 1210. A motor bracket 1288 is secured centrally of the top plate 1218 of the reservoir 1210, and a motor 1290 is secured thereto by bolts 1292. The motor 1290 is provided with an output shaft at each of the opposite ends thereof, to which shafts is connected a pair of hydraulic pumps 1294 and 1296.

The hydraulic pump 1294 is utilized to pump the hydraulic fluid 1270 under pressure to the hydraulic jacks 14, 24 and 964, whereby to operate the same. The hydraulic pump 1296 is utilized to provide hydraulic operating fluid to auxiliary equipment associated with the pipe making machine 2, such as hydraulic stripping apparatus utilized to remove the mold 8 from a finished molded concrete product.

A nipple 1298 is connected to the inlet side of the pump 1294, and extends to a fitting 1300 provided in the top plate 1218 of the horizontal reservoir portion 1212. An elbow-shaped inlet conduit 1302 is secured to the fitting 1300, and terminates at its inner end in a filter unit 1304 disposed within the trough defined by the baffle plate 1264 and the adjacent side wall 1226 of the reservoir 1210. Similarly, a nipple 1306 extends from the inlet of the pump 1296 to a fitting 1308, also provided in the top reservoir plate 1218. An elbow-shaped inlet conduit 1310 is connected to the fitting 1308, and has a filter 1312 provided on the inner end thereof which is also received within the trough partially defined by the baffle plate 1264. The purpose for the access plates 1280 is to provide access to the filter units 1304 and 1312, to service the same.

The rear one of the angle irons 1286 extends upwardly a distance equal to the height of the vertical reservoir portion 1214, and a longitudinal angle iron 1314 extends between the upper end of said rear angle iron 1286 and the inner end wall 1230. The front one of the angle irons 1286 includes a portion 1316 which projects above the vertical reservoir portion 1214, and a stub angle iron 1318 is welded to the inner end wall 1230 in alignment with the projecting portion 1316. The two angle irons 1286 are connected by a transverse angle iron 1320, and a pair of spaced, parallel, longitudinally extending angle irons 1322 extend between the projecting portion 1316 and the angle iron stub 1318.

Flow to and from the hydraulic jacks 24 is controlled by a solenoid-operated valve 1324, said valve being secured to the confronting vertical flanges of the angle irons 1322 by bolts 1326. Similarly, flow to and from the hydraulic jacks 14 is controlled by a solenoid-operated control valve 1328, which is secured to the angle irons 1322 by bolts 1330. A hydraulic control valve 1332 associated with the pump 1296 is also mounted on the angle irons 1322, and is secured thereto by bolts 1334. A manifold return conduit 1336 is welded to extend between the central portion of the angle iron 1320 and the vertical reservoir portion 1214, the outer end of said manifold conduit being closed, and the inner end 1338 thereof opening into the reservoir 1210.

The inlet of the solenoid control valve 1324 is connected with the outlet of the pump 1294 by a conduit 1340. A branch conduit 1342 is connected to the conduit 1340 and to the inlet of a suitable pressure relief valve 1344, the outlet of said pressure relief valve 1344 being connected to the return manifold 1336 by a conduit 1346. Thus, it is seen that if an undesirable pressure build-up occurs in the solenoid control valve 1324, the relief valve 1344 will open to allow draining of fluid from the pump 1294 into the manifold return 1336.

In the operation of the invention, it is desirable to maintain a relatively constant fluid flow to the solenoid control valve 1324. For this purpose, a conventional flow control valve 1348 is positioned between the conduits 1340 and 1346, and is connected thereto by conduits 1350 and 1352, respectively. The outlet of the flow control valve 1348 thus discharges into the conduit 1352, and thence into the manifold return 1336 through the conduit 1346.

The flow control valve 1324 is constructed to provide for flow in either direction through both the fittings 27 and the fittings 25 on the hydraulic lifting jacks 24. As is shown diagrammatically in FIG. 43, a conduit 1354 extends between one of the outlets on the valve 1324 and the fittings 25 at the lower ends of the hydraulic column lifting jacks 24. A conduit 1356 extends from another outlet of the valve 1324, and connects with the fittings 27 at the upper ends of the hydraulic lifting jacks 24. Fluid returning to the control valve 1324 from the hydraulic lifting jacks 24 is connected to the return manifold 1336 through a return conduit 1357. Another, continuously open, outlet of the valve 1324 is connected to the inlet of the hydraulic control valve 1328 by a conduit 1358. Thus, operating fluid flows to the hydraulic control valve 1328 through the hydraulic control valve 1324 and the connecting conduit 1358.

One of the outlets on the hydraulic control valve 1328 is connected to the fittings 754 at the lower ends of the hydraulic apron jacks 14 by a conduit 1360, a branch conduit 1362 extending from the conduit 1360 to the lower fitting 752 on the hydraulic mold-lifting jack 964. Another outlet of the hydraulic control valve 1328 is connected by a conduit 1364 to the fittings 752 at the upper ends of the hydraulic apron jacks 14, a branch conduit 1366 connecting the conduit 1364 with the fitting 752 at the upper end of the hydraulic mold-lifting jack 964. The hydraulic control valve 1328 is operable to provide for flow in either direction through both of the conduits 1360 and 1364, and the outlet of said control valve is connected to the return manifold 1336 by a conduit 1368.

The outlet of the pump 1296 is connected to the inlet of a pressure relief valve 1370 by a conduit 1372, the overflow outlet of said valve 1370 being connected to the manifold return 1336 by a conduit 1374. The normal flow outlet of the valve 1370 is connected to the inlet of the control valve 1332 by a conduit 1376. The control valve 1332 is provided with a pair of conduits 1378 and 1380, which leads to auxiliary equipment to be operated thereby, and the return outlet for the control valve 1332 is connected to the return manifold 1336 by a return conduit 1382. The operation of the hydraulic control system will be described in greater detail in connection with the electrical control circuit.

The electrical control circuit

The electrical control circuit of the invention is shown schematically in FIG. 42, and is arranged for either manual or automatic operation of the pipe making machine 2, at the discretion of the operation. The control circuit includes a plurality of limit switches positioned at strategic locations on the pipe making machine 2, and a plurality of selector switches mounted on one or more suitable control panels. For clarity, the limit switches and the selector switches are grouped separately in FIG. 42.

The plurality of limit switches includes a single pole, double throw switch ADL (FIG. 28) secured to the bottom plate 680 of the fabricated beam 670 adjacent one of the apron guides 686, and operated by a lug 1384 secured to the associated piston 708. The limit switch ADL includes a pair of terminals 1386 and 1388, and a blade 1390 that moves from the terminal 1386 to the terminal 1388 as the piston 708 moves from the fully "DOWN" position, shown in FIG. 28, to an elevated position. The switch ADL is adjusted so the blade 1390 thereof will contact terminal 1386 only after the apron 12 has moved downwardly sufficiently to properly clamp a mold 8 in position on the vibration table 6.

The pressure with which a mold 8 is clamped between the cushion 774 carried by the apron 12 and the vibration table 6 is important, in that if the pressure is insufficient the mold 8 may become displaced during the molding operation. On the other hand, if the pressure exerted thereon by the apron 12 is too great, the mold 8 may not vibrate properly, and the concrete mixture may therefore not be properly compacted. The clamping pressure should also be such that no hammer effect will be produced between the vibration table 6 and the mold 8. The flow control valve 1348 is arranged to control the fluid pressure supplied to the hydraulic apron jacks 14, and thus also controls the clamping force exerted on the mold 8. The switch ADL is arranged to be actuated in the "DOWN" position of the apron 12 only after the correct clamping pressure has been applied to the mold 8 by said apron, which clamping pressure will vary with the size of the mold. As is evident, more force is required to properly clamp a 16 inch diameter mold for example, than to clamp a mold having an 8 inch diameter, for example.

Secured to the flange 698 of one of the apron guides 686 is a double pole, single throw limit switch AUL (FIG. 28) which includes four terminals 1392, 1394, 1396 and 1398, and a pair of blades 1400 and 1402. The switch AUL is normally position with the blades 1400 and 1402 thereof in contact with the terminals 1394 and 1398, respectively, this normal condition occurring when the apron 12 is positioned below its "UP" position. When the apron 12 is raised to its fully "UP" position, the switch AUL is operated by engagement with the flange 720, whereupon the blades 1400 and 1402 are moved to the terminals 1392 and 1396, respectively; when the apron 12 is lowered out of engagement with the limit switch AUL, said switch reverts to its original condition.

A double pole, single throw limit switch LDL is attached to one of the plates 98 near the lower end thereof (FIG. 6), and incluses four terminals 1404, 1406, 1408, and 1410, and a pair of blades 1412 and 1414. When the lifting harness 22 is in its fully "DOWN" position, the roller 148 associated with the limit switch LDL will actuate said switch to hold the blades 1412 and 1414 in contact with the terminals 1406 and 1410, respectively. When the lifting harness 22 moves upwardly from its "DOWN" position, the blades 1412 and 1414 will move to the terminals 1404 and 1408, respectively.

Also mounted on one of the plates 98 is a pair of single pole, double throw limit switches LIL and LUL, the switch LIL being positioned a relatively short distance above the limit switch LDL, and the limit switch LUL being positioned near the top of the plate 98 on which it is mounted. The switches LIL and LUL are both arranged to be actuated by the lifting harness 22 as it passes vertically thereby.

The limit switch LIL includes a pair of terminals 1416 and 1418 and a blade 1420, and is positioned with said blade contacting the terminal 1418 when the lifting harness 22 is positioned therebelow.

As was discussed earlier, after a mold 8 is clamped in position on the vibration table 6, the lifting harness 22 is caused to move upwardly until the packing head 18 and the upper end of the core 16 are received within the lower end of said mold. The vertical movement of the lifting harness 22 is then halted momentarily in this intermediate position, while concrete mixture is fed into the mold 8 by the conveyor 32. After the lower end of the mold 8 is properly filled, and after about a two-inch layer of concrete mixture has accumulated on the packing head 18, the lifting harness 22 again is caused to move upwardly.

The limit switch LIL is arranged so that when the lifting harness 22 reaches the intermediate position, with the packing head 18 and the upper end of the core 16 disposed within the lower end of the mold 8, the blade 1420 thereof will move to the terminal 1416. When the lifting harness 22 moves downwardly at the completion of an operating cycle, it returns the blade 1420 to the terminal 1418.

The limit switch LUL includes a pair of terminals 1422 and 1424 and a blade 1426, and is positioned with the blade 1426 in contact with the terminal 1424 when the lifting harness 22 is below its fully "UP" position. When the lifting harness 22 reaches its "UP" position, the blade 1426 is moved to the terminal 1422, where it remains until said lifting harness is lowered.

Mounted on the column 38 above the gear 980 is a single pole, double throw limit switch IPL (FIG. 22), which includes a pair of terminals 1428 and 1430, and a blade 1432. The switch IPL is arranged so that the blade 1432 is in contact with the terminal 1430, except when one of the rollers 880 is positioned in alignment with the notch 846. When the latter occurs, a lug 1434 carried by the gear 980 actuates the switch IPL, moving the blade 1432 to the terminal 1428.

The control circuit of the invention is connected to a suitable A.C. power source 1436 by a pair of power leads 1438 and 1440, the lead 1440 extending to a terminal 1444 of a master control switch SM. A lead 1446 connects the blade 1442 of the switch SM with the power lead 1438, and is connected across a pump motor starter 148, which is in turn connected to the motor 1290.

A lead 1450 connects the blade 1442 of the switch SM with the blade 1452 of a starting switch ST, and with the blade 1432 of the limit switch IPL. A lead 1454 connects the terminal 1456 of the starting switch ST with the terminal 1430 of the limit switch IPL, and with the terminal 1406 of the limit switch LDL.

The blade 1412 of the limit switch LDL is connected to the blade 1402 of the limit switch AUL by a lead 1458, and the terminal 1396 of said switch AUL is connected across an indexing motor starter 1460 by a lead 1462 to the power lead 1438. The starter 1460 is in turn connected to the indexer motor 40, and when supplied with current actuates the same.

The terminal 1428 of the limit switch IPL is connected by a lead 1464 to the blades 1466 and 1468 of a momentary sequence starting switch $S_2$ and a sequence control switch $S_3$, respectively, and to the blade 1470 of a lift-down relay 1472. The relay 1472 includes a pair of terminals 1474 and 1476, the terminal 1476 being connected to the power lead 1438 by a lead 1478 through the coil of said relay, and the blade 1470 being in contact with the terminal 1474 when said relay is not activated.

A lead 1480 connects the terminal 1474 of the relay 1472 with one blade 1482 of a pair of blades 1482 and 1484 of a sequence relay 1486. The sequence relay 1486 includes a pair of terminals 1490 and 1492, which are engaged by the blades 1484 and 1482, respectively, when the relay 1486 is energized; when the relay 1486 is not energized, the blade 1482 engages the terminal 1490, while the blade 1484 engages a blind terminal 1494. The terminal 1492 is connected through the coil of the sequence relay 1486 by a lead 1496 to the power lead 1438.

The sequence starting switch $S_2$ includes a terminal 1498, which is connected to the lead 1496, and hence to the terminal 1492 of sequence relay 1486, by a lead 1500. The switch $S_3$ includes a terminal 1502, which is connected to the sequence relay blade 1484 by a lead 1504. The switches ST and $S_2$ are the two operating switches for the machine 2, and can conveniently be placed on a pendant-type control box to permit an operator to carry them about the vincinity of the machine 2 so he can readily observe the machine's operation.

A lead 1506 extends from the terminal 1490 of the sequence relay 1486, and connects to the blade 1390 of the limit switch ADL. The terminal 1386 of the switch ADL is connected to the blade 1426 of the limit switch LUL by a lead 1508, and the terminal 1424 of the switch LUL is connected to the blade 1420 of the switch LIL by a lead 1510, and to the terminal A of a selector switch $S_{11}$ by a lead 1512.

The selector switch $S_{11}$ further includes a terminal M and a blade 1514, the latter being connected through a packing head motor starter 1516 by a lead 1518 to the power lead 1438. The starter 1516, when energized, starts the motor 486 to thereby cause the packinghead 18 to rotate. The selector switch $S_{11}$ is arranged in the circuit so that when the blade 1514 engages the terminal A of said switch, the starter 1516 will be energized automatically in proper sequence. By manually moving the blade 1514 to the terminal M, the starter 1516 can be operated out of sequence, as will be described later. The selector switches $S_5$, $S_6$, $S_7$, $S_8$, $S_9$ and $S_{10}$ are all provided with terminals M and A for a like purpose, the switches $S_5$ and $S_7$ having two pair of terminals M and A, and the switches $S_6$, $S_8$, $S_9$ and $S_{10}$ each having one pair of terminals M and A.

The sequence control switch $S_3$ includes a second terminal 1520, to which is connected a lead 1522. The lead 1522 extends to the M terminals of the selector switches $S_5$ through $S_{11}$. The switch $S_5$ and $S_7$ include pairs of blades 1524 and 1526, and 1528 and 1530, respectively, and the M terminals of the switch $S_5$ and $S_7$ associated with the blades 1526 and 1530, respectively, are blind. The selector switches $S_6$, $S_8$, $S_9$, and $S_{10}$ include blades 1531, 1532, 1534 and 1536, respectively, which are movable between the M and A terminals thereof.

The motors 1080 and 1160 on the charger apparatus 26 are connected to a feed motor starter 1538, which is connected by a lead 1540 between the blade 1534 of switch $S_9$ and power lead 1438. The vibration table motor 628 is connected to a motor starter 1542, which in turn is connected between the blade 1536 of switch $S_{10}$ and the power lead 1438 by a lead 1544. The A terminals of the switches $S_9$ and $S_{10}$ are both connected to a common lead 1546 by leads 1548 and 1550, respectively, and thus when the switches $S_9$ and $S_{10}$ are both in their automatic mode (with the blades 1534 and 1536 in contact with their A terminals), the motors 1080, 1160 and 628 will be started simultaneously when the lead 1546 is energized, said motors being connected in series.

The lead 1546 is connected to the terminal 1416 of limit switch LIL, and also to the blade 1552 of the selector switch $S_4$, which switch $S_4$ includes a pair of terminals 1554 and 1556. The selector switch terminals 1554 and 1556 are connected to a pair of leads 1566 and 1568 which extend to the power lead 1438, and which have time delay relays 1562 and 1564 connected thereacross, respectively, and said switch $S_4$ functions to connect either of said relays into the control circuit. The time delay relay 1562 has a shorter time delay than the relay 1564, and both are utilized to determine the length of time that the packer head 18 and the upper end of core 16 pause within the lower end of a mold 8.

The time delay relay 1562 includes a blade 1570 and terminal 1572, the latter being connected to lead 1566. Similarly, relay 1564 includes a blade 1576 and a terminal 1578, the latter being connected to the lead 1568. The blades 1570 and 1576 are connected to a common lead 1582, which extends to the terminal 1418 on the limit switch LIL, and which thus is connected to the lead 1510 when the blade 1420 is engaged with said terminal 1418. The lead 1582 also is connected to A terminal associated with the blade 1530 of switch $S_7$ by a lead 1584.

The blade 1530 of switch $S_7$ is mechanically connected to the blade 1528 so that both must operate simultaneously, and is connected through a lead 1586 to the power lead 1438. The lead 1586 is connected across one of the operating solenoids 1588 of the solenoid control valve 1324, the valve 1324 being arranged so that when the solenoid 1588 is energized, fluid will be supplied through the conduit 1354 to the fittings 25 of the lifting jacks 24, while at the same time the conduit 1356 will be connected to drain. Thus, when the solenoid 1588 is energized, the lifting harness 22 will be elevated.

The blade 1528 of switch $S_7$ is connected by a lead 1590 to the power lead 1438, the lead 1590 being connected across a second operating solenoid 1592 of the. solenoid control valve 1324. When the solenoid 1592 is energized, the control valve 1324 is arranged to exhaust fluid from the conduit 1354 while furnishing pressurized fluid to the conduit 1356, which thereby moves the lifting harness 22 downwardly. The blades 1528 and 1530 of the switch $S_7$ cannot both be energized at the same time when said switch is in its automatic mode, and because the blades are mechanically connected, they cannot both be energized manually at the same time. Thus, the solenoids 1588 and 1592 cannot be simultaneously energized. A lead 1593 connects the leads 1590 and 1478, and hence connects blade 1528 to the coil of relay 1472.

The A terminal associated with the blade 1528 of valve $S_7$ is connected by a lead 1594 with the terminal 1408 of limit switch LDL. The blade 1414 of the switch LDL is connected by a lead 1596 to the blade 1400 of limit switch AUL, and to the terminal 1422 of the limit switch LUL.

The A terminal associated with the blade 1524 of switch $S_5$ is connected by a lead 1599 to the terminal 1388 of limit switch ADL, and said blade 1524 is connected to power lead 1438 by a lead 1600 that is connected across one operating solenoid 102 of the solenoid-operated control valve 1328. When the solenoid 1602 is energized, the valve 1328 is arranged to supply fluid to conduit 1364, while the conduit 1360 is connected to drain. This causes the hydraulic apron jacks 14 to move the apron 12 downwardly, and the mold-lifting jack 964 to lower the lifting arm 924 to thereby allow a mold 8 to be lowered into position on the vibration table 6.

A lead 1604 connects the terminal 1394 of limit switch AUL with the A terminal of selector switch $S_6$, and the blade 1531 of said switch is connected by a lead 1606 to the A terminal of switch $S_5$ associated with the blade 1526. The blade 1526 is connected to power lead 1438 by a lead 1608, which is connected across the second operating solenoid 1610 of valve 1328. The valve 1328 is arranged so that when the solenoid 1610 is energized, fluid will be supplied to conduit 1360 and will be drained from conduit 1364, thereby causing the apron 12 and a form 8 positioned on the vibration table 6 to be elevated. The blades 1524 and 1526 are mechanically connected to prevent both solenoids 1602 and 1610 from being simultaneously operated.

*The operating cycle*

The automatic operating cycle for the pipe making machine 2 will now be described, with particular reference to FIGS. 42 and 43. Before operating the machine 2 in its automatic mode, the blades of the selector switches $S_5$ through $S_{11}$ must be engaged with their respective A terminals, and the blade 1468 of switch $S_3$ is engaged with the terminal 1502.

The decision as to which time delay relay 1562 or 1564 to employ when operating the machine 2 in its automatic mode is determined primarily by the diameter of the mold 8 being utilized. For smaller mold diameters, the shorter time delay of relay 1562 is sufficient, whereas for a larger mold, which requires more time to fill the lower end thereof, the longer time delay of relay 1564 is desirable. For purposes of this description, the time delay relay 1562 is selected, and accordingly blade 1552 of switch $S_4$ is engaged with the terminal 1554.

Before an operating cycle is started, the apparatus 28 is employed to make a suitable quantity and type of concrete mixture, which is then placed in the hopper 30. The concrete mixture utilized is preferably a dry, or no-slump, mixture, having no material larger than one-third the wall thickness of the pipe. If too wet a mixture is employed, it may be impossible to remove the core 16 and the packing head 18 from the mold 8 at the end of the molding operation without the product slumping. In addition, too wet a mixture can make it impossible to remove the product from the mold. The reason for this is that the wet mixture will form a vacuum in the mold and tend to stick therein. Further, a wet mixture can form an undersizeable web-like structure of unsound characteristics.

At the beginning of an operating cycle, the lifting harness 22 is fully "DOWN," and the apron 12 is in its fully "UP" position. Thus, the blade 1386 of limit switch ADL is engaged with terminal 1388, and the blades 1400 and 1402 of limit switch AUL are engaged with the terminals 1392 and 1396, respectively. Further, the blades 1412 and 1414 of limit switch LDL are engaged with their respective terminals 1406 and 1410, and the blades 1420 and 1426 of the limit switches LIL and LUL are engaged with the terminals 1418 and 1424, respectively.

When a cycle begins, one of the carriages 36 will initially be centered on the vibration table 6, so that the limit switch IPL will be positioned with its blade 1432 in engagement with the terminal 1428. As soon as the indexer motor 40 starts, however, the carriage 36 will rotate sufficiently to return blade 1432 to the terminal 1430, where it will remain until the next carriage 36 is properly indexed.

To start operation of the machine 2, the master switch SM is first closed, thus starting the pump motor 1290 on the hydraulic unit 1208. The solenoid-operated control valves 1324 and 1328 are arranged so that fluid flowing thereto at this point in the operating cycle will be returned to the reservoir 1210.

With master control switch SM closed, the starting switch ST is then momentarily depressed, thus connecting lead 1450 to lead 1454. The lead 1454 being energized, current flows through blade 1412 of limit switch LDL, lead 1458, and blade 1402 of limit switch AUL to lead 1462, whereby the indexer motor starter 1460 is energized to thus start the motor 40. The carriages 36 are thereby rotated about the column 38, and immediately after such rotation commences blade 1432 will return to terminal 1430, thereby making a by-pass circuit around switch ST.

The indexer motor 40 will operate until the next adjacent carriage 36, carrying a mold 8, is properly indexed on the vibration table 6. At this point, switch IPL will be actuated to move blade 1432 to terminal 1428, thereby de-energizing the indexer motor 40. When the blade 1432 engages terminal 1428, lead 1464 is energized, which thereby also energizes the M terminals of selector switches $S_5$ through $S_{11}$, provided the blade 1468 of switch $S_3$ is in contact with terminal 1520. With these M terminals energized, any one of the selector switches $S_5$ through $S_{11}$ can be operated manually to supply current to its associated components. For automatic operation, however, blade 1468 is placed in contact with terminal 1502, as described earlier.

With a mold 8 thus indexed into position on vibrator table 6, and with lead 1464 energized, the sequence starting switch $S_2$ is momentarily depressed, thus connecting lead 1464 with lead 1500. When lead 1500 is energized, sequence relay 1486 is activated to connect the blades 1482 and 1484 to the lead 1496 and 1506, respectively. The lead 1496 is thus connected to lead 1464 through blade 1470 of the relay 1472, and lead 1480, thus by-passing switch $S_2$.

With blade 1484 in contact with lead 1506 and with blade 1468 of switch $S_3$ in contact with terminal 1502, blade 1390 of limit switch ADL is energized. The blade 1390 being in contact with terminal 1388 at this time, lead 1599 is energized, which, in turn, energizes the solenoid 1602 through switch $S_5$. Thus, the hydraulic jacks 14 and 964 are caused to extend, thereby lowering the mold 8 onto the vibration table 6, and moving the apron 12 downwardly to engage the resilient cushion 774 with the mold 8 to clamp said mold in position.

When apron 12 reaches its fully "DOWN" position, blade 1390 moves to the terminal 1386, thus de-energizing solenoid 1602, and energizing the lead 1508. The blade 1426 at this time being in contact with terminal 1424, lead 1512 is energized to thereby start the packing head motor 486. In addition, lead 1510 is energized, which, in turn, energizes lead 1582 through blade 1420 of switch LIL.

When lead 1582 is energized, the solenoid 1588 of solenoid control valve 1324 is also energized through switch $S_8$, lead 1584, switch $S_7$ and lead 1586. This causes the hydraulic lifting jacks 24 to operate to slowly raise the lifting harness 22, whereby the rotating packing head 18 and the upper end of the core 16 enters the lower end of mold 8. When the lifting harness 22 moves from its "DOWN" position, the blades 1412 and 1414 of switch LDL move to the terminals 1404 and 1408, respectively.

When the core 16 has entered several inches into the lower end of the mold 8, the vertically moving lifting harness 22 will reach and actuate the limit switch LIL to move blade 1420 to terminal 1416. This energizes lead 1546, starting the feed motors 1080 and 1160 and the vibration table motor 628, and energizing the relay 1562. Simultaneously, lead 1582 is de-energized, thus de-energizing solenoid 1588 and causing the lifting harness 22 to stop its vertical movement.

The packing head 18 and the upper end of the core 16 are thus positioned within the lower end of the mold 8, with the packing head 18 rotating. Concrete mixture is supplied to the mold 8 by the conveyor 32, and falls onto the packing head 18, which floats it outwardly into engagement with the wall of said mold. Simultaneously, the mold 8 is vibrated vertically by the table 6, which compacts the concrete mixture. This continues for a period of time until the lower end of the mold 8 is filled and until about a two-inch working layer of concrete builds up on the packing head 18. This time period, as has been mentioned, is determined largely by the size of the mold 8, and is measured by the time delay relay 1562.

When the prescribed period of time has elapsed, relay blade 1570 moves to terminal 1572, thus again energizing lead 1582 and solenoid 1588. The lifting harness 22 then resumes its upward movement.

The rate at which the lifting harness 22 moves upwardly is preferably chosen to correspond to the rate of operation of the conveyor 32, so that a constant working layer of about two inches of concrete mixture remains on the packing head 18. The packing head 18 is rotated at a surface speed of about 800 feet per minute, and as it rotates the leading edges 418 of the wings 408 work the concrete mixture, and the outer arcuate surfaces 416 of said wings move the mixture outwardly. Because the curvature of the outer peripheries 416 of the wings 408 is less than the diameter of the core 16, said wings exert a troweling action on the concrete. The tapered periphery 368 on the base plate 366 functions to facilitate insertion of the packing head and to properly size the inside diameter of the pipe section, and trowels the inner surface thereof to a smooth finish.

The floating, rotatable core 16 is an important feature of the invention, and functions as a follower for the packing head 18 to help compact the concrete mixture, the core 16 and the packing head 18 applying pressure to the concrete mixture in a circumferential direction to compact the mixture. Further, the core 16 holds the concrete mixture in place during vibration of the mold, and results in a pipe of uniform internal diameter; it is readily seen that without the core 16 the concrete mixture would tend to slump during vibration of the mold 8, which slumping would produce a deformed product. The diameter of the wings 408 is preferably about 1/16 inch diameter of the tapered base plate 366, and the outer diameter of the wings 4__8 is preferably about 1/16 inch less than the diameter of the core.

The surface speed of the rotating packing head 18, as has been stated, is preferably about 800 feet per minute. Thus, when making pipe having an internal diameter of 8 inches, the packing head 18 will preferably be rotated at about 400 r.p.m. For a larger pipe the rotational speed for the packing head would be proportionately less.

The preferable range of surface speeds for the packing head 18 has been found to be from about 600 f.p.m. to about 1000 f.p.m., with the optimum results being had at about 800 f.p.m. If the surface speed is too high, there will be a tendency for both the packing head 18 and the concrete mixture to over-heat. Such over-heating will dry the moisture out of the concrete mixture, causing it to scale and not properly set up. Too slow a speed will cause no significant damage, but has the principal disadvantage of unnecessarily slowing down the manufacturing process.

The vibration table 6 vibrates the mold 8 at a frequency of about 4200 vibrations per minute, each with an average vertical amplitude of about 3/32 of an inch. The combined actions of the vibration table, the rotating packing head 18, and the core 16 function to uniformly distribute concrete mixture within the mold 8, and to compact the mixture into a homogeneous structure.

Upward movement of the lifting harness 22, and hence of the column 20, continues until the mold 8 is completely filled, and the packing head 18 projects thereabove. When the rotating packing head 18 moves vertically from the mold it is quickly cleaned by applying a stiff brush thereto, the concrete mixture thus removed therefrom being received in the apron 12. The upper end of the mold is also cleaned with a brush before the core 16 is lowered, to remove any material which might be carried into the pipe bore by the packing head 18 during withdrawal thereof, thus eliminating the possibility of any such material scoring the inner pipe wall. Concrete accummulating in the apron 12 is pushed into the next mold 8 at the beginning of the next molding operation.

When the lifting harness 22 reaches its fully "UP" position, limit switch LUL is activated, moving the blade 1426 to contact 1422, thus connecting lead 1596 to lead 1508, and disconnecting lead 1508 from the leads 1510 and 1512. This, in turn, deenergizes the solenoid 1588, and the motors 486, 628, 1080 and 1160. With deenergization of the motor 628, the vibration table 6 comes to a stop.

Actuation of switch LUL also energizes the solenoid 1592 through switch S$_7$, lead 1594, limit switch LDL, and lead 1596. The relay 1472 is also energized, through lead 1593, thus moving blade 1470 to terminal 1476 to connect the relay 1472 with lead 1464.

The energized lead 1596 also energizes the solenoid 1610 through lead 1608, switches S$_5$ and S$_6$, and limit switch AUL. Thus, the apron 12 is moved upwardly by the apron jacks 14, while the lifting harness 22 is moved downwardly by the lifting jacks 24. Further, the mold-lifting jack 964 is actuated to raise the carriage 36 positioned over the vibration table, and to thus raise the mold 8 containing the molded pipe section 996.

The lifting harness 22 moves downwardly past limit switch LIL, moving the blade 1418 back to the terminal 1418, and engages the limit switch LDL. When the lifting harness 22 moves downwardly initially, limit switch LUL returns to its original condition. However, energy is maintained to the solenoids 1610 and 1592 by the relay 1472 and the lead 1593.

When the lifting harness 22 has moved fully into its "DOWN" position, limit switch LDL is actuated to move the blades 1412 and 1414 into engagement with the terminals 1406 and 1410. This completes a cycle of operation.

It is important that the vibration table 6 come to a complete stop before the core 16 and the packing head 18 are lowered. Otherwise, if the vibration table 6 is still operating as the core 16 is withdrawn, the unsupported inner wall of the molded product will slump and deform because of the vibrations produced by the vibration table. As described hereinabove, actuation of the switch LUL by the lifting harness 22 when it reaches its fully "UP" position de-energizes the vibration table motor 628, thus providing for stopping of the vibration table before withdrawal of the core 16. Typically, the vibration table 6 will require but a very few seconds to come to a dead stop after the motor 628 is de-energized.

It is again emphasized that the machine and method of the invention will produce hollow, elongated products having a uniform bore therethrough, and having no spiral or circumferentially extending scores or grooves on the exterior thereof. The core 16 functions to size the bore of the product and to make it uniform throughout, and the withdrawal of the packing head 18 and the core 16 from a position extending above the mold 8 to a position spaced therebelow insures that there will be no radially inwardly extending webs or ribs formed at the ends or elsewhere in the product.

Reinforcing members, as has been described, can be utilized within the mold 8 to reinforce the wall of the product, and will not interfere with the operation of the invention. More importantly the pipe making machine and method of the invention will in no way place torsion stress on such reinforcing members.

The instant pipe making machine can be utilized to manufacture various sizes of pipe, from several inches in diameter up to a few feet. The core 16, the packing head 18, the adapter plates on the vibration table 6 and the apron 12, and the indexer mechanism must, of course, be changed to accommodate different size molds 8. Further, the speed at which the packing head 18 rotates must be adjusted for each size mold 8, to provide the desired surface speed therefor.

The operating cycle can be interrupted at any point in its sequence by moving the blade 1468 of the sequence control switch S$_3$ to terminal 1520. When the blade 1468 is again returned to terminal 1502, an examination of the circuit will reveal that the machine 2 will recommence operation where it left off. While blade 1468 is in contact with terminal 1520, any of the selector switches S$_5$ through S$_{11}$ can be manually operated, as explained earlier, to thereby operate their associated apparatus.

Obviously, many modifications and variations of the present invention are possible in the light of the above teachings. It is therefore to be understood that within the scope of the appended claims, the invention may be practiced otherwise than as specifically described.

I claim:
1. In a machine for making a hallow, elongated cast product; means for supporting and vibrating an elongated, hollow, vertically disposed mold; a core follower arranged to be moved upwardly into the lower end of said mold;

a packing head rotatably mounted upon the upper end of said core follower; means connected to said packing head and extending through said core follower for effecting rotation of said packing head independently of said core follower, said core follower having a diameter at least equal to the diameter of said rotatable packing head and a length substantially equal to the height of said vertically disposed mold; and lifting means connected to said core follower operable to move said core follower vertically through said mold while said mold is being vibrated and while material is being placed therein, and while said packing head is rotating.

2. In a machine as recited in claim 1, wherein said means for supporting and vibrating said mold includes: a vibration table; and clamping means arranged to clamp said mold to said table in a vertical position.

3. In a machine as recited in claim 1, wherein said packing head includes: a circular base plate; and a plurality of circumferentially spaced wings attached to the upper surface of said base plate, each of said wings including an arcuate, axially extending wall portion, the outer radius of curvature of said wall portion being less than the radius of said base plate.

4. In a machine as recited in claim 1 in which a well is disposed below said mold supporting and vibrating means, and wherein said packing head and core follower lifting means includes: a lifting harness disposed within said well; lifting means connected to said lifting harness, and operable to raise and lower said harness within said well to thereby raise and lower said packing head and said core follower.

5. In a machine for making a hollow, elongated cast product; means for supporting and vibrating an elongated, hollow, vertically disposed mold; a core follower arranged to be moved upwardly into the lower end of said mold; a packing head rotatably mounted upon the upper end of said core follower; means connected to said packing head and extending through said core follower for effecting rotation of said packing head independently of said core follower operable to move said core follower vertical least equal to the diameter of said rotatable packing head and a length substantially equal to the height of said vertically disposed mold; lifting means connected to said core follower operable to move said core follower vertically through said mold while said mold is being vibrated while material is being placed therein, and while said packing head is rotating; and means arranged to feed material into said mold while said mold is vibrating, and while said rotatable packing head and said core follower are being moved vertically therethrough.

6. In a machine as recited in claim 5, wherein said means to vibrate said mold is arranged to vibrate said mold in a strictly vertical direction.

7. In a machine as recited in claim 5, wherein said rotatable packing head includes a circular base plate having a frusto-conical rim, and a plurality of circumferentially spaced wings attached to said base plate, said wings each including an axially extending, arcuate wall portion, the outer periphery of said wall portion having a smaller radius of curvature than the radius of said circular base plate, the diameter of a circle containing the outer surfaces of said wings being less than the maximum diameter of said frusto-conical rim.

8. In a machine as recited in claim 5, including additionally indexing and transfer means operable to place a mold on, and to remove a mold from, said mold supporting means.

9. In a machine as recited in claim 8, wherein said indexing and transfer means includes: a vertical column; a cylindrical sleeve rotatably mounted on said column; a cylindrical collar fixedly mounted on said column below said sleeve, and having an indexing notch extending axially therethrough, the top surface of said cylindrical collar defining an annular track; at least one carriage mounted on said cylindrical sleeve for vertical sliding movement thereon, said carriage including a roller engageable on said annular track and receivable within said notch; means on said carriage for engaging a mold; means, including a motor, connected between said column and said cylindrical sleeve for rotating said sleeve about said column; and lifting means carried by said column, and operable when said roller is received within said indexing notch to engage and lift said roller out of said notch.

10. In a machine for making a hollow, elongated cast product: a vibration table to receive and support thereon a vertically disposed, elongated hollow mold; means connected with said table and operable to vibrate said table and mold; means positioned above said vibration table for clamping said vertically disposed mold thereto; a core follower arranged to be moved upwardly into the lower end of said mold; a packing head rotatably mounted upon the upper end of said core follower; means connected to said packing head and extending through said core follower for effecting rotation of said packing head independently of said core follower, said core follower having a diameter at least equal to the diameter of said rotatable packing head and a length substantially equal to the height of said vertically disposed mold; lifting means connected to said core follower operable to move said core follower and packing head vertically through said mold while said mold is being vibrated and while material is being placed therein, and while said packing head is rotating; and conveyor means arranged to continuously feed material into said mold while said mold is being vibrated and while said rotatable packing head and said core follower are being moved vertically therethrough.

11. In a machine as recited in claim 10, including additionally, mold indexing and transfer means operable to position a mold on, and to remove a mold from, said vibration table.

12. In a machine as recited in claim 9, wherein said rotatable packing head comprises: a rotatably mounted circular base; and a plurality of circumferentially spaced wings secured to the upper surface of said circular base, each of said wings including: a horizontal base portion pivotally attached to said circular base for adjustment relative thereto; and arranged for pivoting radially thereon; and a vertical arcuate wall extending upwardly from said base portion, the external radius of curvature of said arcuate wall being substantially less than the radius of said circular base plate.

13. In a machine as recited in claim 10 wherein a well is positioned beneath said vibration table, said table having an opening therethrough aligned with said well, and wherein said lifting means includes: a lifting harness disposed within said well; means attached to said lifting harness, and operable to raise and lower said harness within said well, said core follower and said packing head being supported by said lifting harness and being aligned with said opening in said vibration table.

14. In a machine as recited in claim 10, including additionally a control circuit connected with said vibration table, said mold clamping means, said means for effecting rotation of said packing head, said lifting means, and said material feed means, and arranged to be selectively operable in either an automatic or a manuel mode for operating said machine.

15. In a machine as recited in claim 14, wherein said control circuit is arranged so that when operated in its automatic mode, said packing head is raised within a mold positioned on said vibration table in alignment therewith at a rate corresponding to the rate at which material is fed into said mold.

16. In a machine as recited in claim 10, wherein said means to feed material into a mold positioned on said vibration table includes: a hopper for receiving and storing said material and a conveyor arranged to extend between said hopper and said mold, said hopper and said conveyor being carried by a frame mounted for limited rotation on a turntable.

17. In a machine as recited in claim 10, wherein said vibration table is supported by means including resilient cushion means, and wherein said means positioned above said vibration table for clamping said vertically disposed mold thereto includes a resilient cushion means, whereby when said mold is clamped in position on said table, it is in effect clamped between resilient cushion means.

18. In a machine for making a hollow, elongated cast product: a vibration table to receive and support thereon a vertically disposed, elongated hollow mold; means connected with said table and operable to vibrate said table and mold; means positioned above said vibration table for clamping said vertically disposed mold thereto, said means including a vertically movable apron, and hydraulic jack means for vertically moving said apron; mold indexing and transfer means disposed adjacent to said vibration table, and operable to place a mold on, and to remove a mold from, said vibration table; a core follower arranged to be moved upwardly into the lower end of said mold; a packing head rotatably mounted upon the upper end of said core follower; means connected to said packing head and extending through said core follower for effecting rotation of said packing head independently of said core follower, said core follower having a diameter at least equal to the diameter of said rotatable packing head and a length substantially equal to the height of said vertically disposed mold; lifting means connected to said core follower operable to move said core follower and packing head vertically through said mold while said mold is being vibrated and while material is being placed therein, and while said packing head is rotating.

19. In a machine as recited in claim 18, wherein said mold indexing and transfer means includes: a vertical column disposed adjacent to said vibration table; a sleeve rotatably supported on said column; a plurality of carriages mounted on said sleeve for vertical sliding movement axially of said sleeve; means arranged to rotate said sleeve relative to said column to selectively position said carriages in indexed positions over said vibration table, each of said carriages being arranged and operable to lift and transfer a mold; and means for alternately raising and lowering said carriages while they are in an indexed position over said vibration table, to thereby alternately raise a vertical mold from said table and to lower a vertical mold to rest on said table.

20. In a machine for making a hollow, elongated cast product: a vibration table adapted to receive and to support thereon a vertically disposed, elongated hollow mold, and operable to vibrate said mold in a vertical direction, there being a well disposed beneath said vibration table, and said table having an opening therethrough aligned with said well; means supported above said vibration table, and operable to clamp a vertically disposed mold to said table in an indexed position, wherein said mold is aligned with said opening; mold indexing and transfer means disposed adjacent to said vibration table, and operable to place a vertically disposed mold on said vibration table in said indexed position, with the interior thereof aligned with said opening; a lifting harness disposed within said well, and supporting a core follower which is receivable through said opening and within a vertical mold when positioned on said vibration table in alignment therewith; means attached to said lifting harness and operable to raise and lower said harness within said well; a packing head rotatably mounted upon the upper end of said core follower; and means carried by said lifting harness and extending through said core follower for effecting rotation of said packing head independently of said core follower, said lifting harness being operable to move said core follower vertically through said mold while said mold is being vibrated and while material is being placed therein, and while said packing head is rotating.

21. In a machine as recited in claim 20, including additionally, means arranged to feed material into the upper end of a vertical mold disposed in an indexed position on said vibration table while said mold is vibrating, and while said rotating packing head is being moved vertically therethrough, said feeder means including a storage hopper and a conveyor.

22. In a machine as recited in claim 21, including additionally, a control circuit selectively operable in either an automatic or a manual mode, said circuit including a starting switch and a sequence switch, and being connected with said vibration table, said mold clamping means, said mold indexing and transfer means, said lifting harness, said packing head, and said feeder means, and arranged so that when said starting switch is depressed a mold will be indexed into position on said vibration table, and so that when said sequence switch is depressed said machine will automatically complete an operating cycle.

23. In a machine as reicted in claim 21, wherein said feeder means includes: a first frame; a hopper supported by said first frame, and having an opening in the lower end thereof; a second frame disposed below said hopper; a conveyor supported on said second frame, including: an idler roller and a drive drum mounted on said second frame in spaced relationship; a pair of spaced, parallel, vertically disposed side plates, the rear ends of said side plates being slidably mounted on said second frame, and the forward ends thereof projecting horizontally from said second frame and terminating over said vibration table; an end roller supported between said side plates at the forward end thereof; an endless belt received on said end roller and said drive drum, and engaged with said idler roller; means connected between said side plates and said second frame, and operable to slide said side rails relative to said second frame to vary the tension on said belt; and means, including a motor, connected to said drive drum for driving said endless belt, said hopper opening being positioned over the rear end of said endless belt.

24. In a machine as recited in claim 20, wherein said mold clamping means includes a pair of hydraulic operating jacks, said mold indexing and transfer means includes a hydraulic operating jack arranged to raise and lower a mold disposed on said vibrating table, and said means operable to raise and lower said lifting harness includes a pair of hydraulic operating jacks, all of said hydraulic jacks being connected into a hydraulic system including: a reservoir; a pump means connected to said reservoir; a first solenoid operated valve, said first valve being connected to said pump, said reservoir, and said lifting harness jacks; and a second solenoid operated valve connected to said first valve, said reservoir, said mold indexing hydraulic jack, and said pair of mold clamping jacks.

25. In a machine as recited in claim 20, wherein said means operable to clamp a mold to said vibration table includes: framework extending above said vibration table; a pair of pistons supported by said framework for vertical sliding movement; an apron secured to the lower ends of said pistons, and including a side rail and a bottom plate, said bottom plate having an opening therein aligned with the opening in said vibration table; an adaptor secured to the undersurface of said bottom plate about the opening therein, and including a cylindrical rim, and an annular, resilient cushion received and secured within said rim, said annular cushion being engageable with the upper end of a vertical mold disposed in said indexed position on said vibration table, when said apron is moved downwardly; and a pair of hydraulic jacks connected to extend between said framework and said apron, and operable to raise and lower said apron.

26. In a machine as recited in claim 25, including additionally, guide means on said vibration table about said opening therethrough to guide a vertical mold into said indexed position.

27. In a machine as recited in claim 20, wherein said mold indexing and transfer mechanism includes: a vertical column disposed adjacent to said vibration table; a sleeve rotatably mounted on said column; a cylindrical collar mounted on said column below the lower end of said sleeve, and having an axially extending index notch therethrough; at least one carriage mounted on said sleeve for vertical sliding movement, and including a roller engageable on the upper annular surface of said collar and receivable in said notch; means connected to rotate said sleeve to align said roller with said notch; and means carried by said column operable to lift said roller from said index notch, said carriage being adapted to carry a mold.

28. A packing head for a concrete pipe making machine, comprising: supporting means; a rotatably mounted circular base mounted on said supporting means; and a plurality of circumferentially spaced wings secured to the upper surface of said circular base, each of said wings including: a horizontal base portion; means pivotally attaching said base portion to said circular base for adjustment relative thereto, arranged so that said wings can pivot inwardly and outwardly along a radius of said circular base; means separate from said pivotal attaching means for securing said base portion to said circular base in a desired position; and a vertical arcuate wall extending upwardly from said base portion, the external radius of curvature of said arcuate wall being substantially less than the radius of said circular base plate, the top edge of said arcuate wall being horizontal, and the leading edge thereof tapering upwardly at an angle from the vertical.

29. A packing head as recited in claim 28, wherein the peripheral edge of said circular base plate is tapered inwardly from the bottom to the top thereof.

30. A packing head as recited in claim 28, wherein said supporting means for rotatably mounting said circular base includes: a column; and a core rotatably mounted on said column, said circular base plate rotatably mounted on the upper end of said core, and being rotatable relative to both said column and said core.

31. In a packing head for a concrete pipe making machine, said packing head including a normally horizontally disposed, circular base plate, a wing adapted to be pivotally mounted on said base plate, comprising: a horizontal base, said horizontal base having a bore through one end thereof to receive a bolt for pivotally mounting said wing to said base plate, and an arcuate slot drawn on a radius from the center of said bore to receive a bolt for fixing said wing to said base plate in a desired position; and an arcuate wall extending upwardly from the outer periphery of said horizontal base, said arcuate wall having a radius of curvature substantially less than the radius of said circular base plate, the upper edge of said arcuate wall being horizontal and the leading edge thereof extending upwardly and rearwardly at an angle to the vertical.

32. In a machine for making concrete pipe, an indexing and transfer apparatus for placing a mold in, and removing a mold from, an indexed position, including: a vertical column; a cylindrical sleeve rotatably mounted on said column; a cylindrical collar fixedly mounted on said column below said sleeve, and having an indexing notch extending axially therethrough, the top surface of said cylindrical collar defining an annular track; at least one carriage mounted on said cylindrical sleeve for vertical sliding movement thereon, said carriage including a roller engageable on said annular track and receivable within said notch; means on said carriage for engaging a mold; means including a motor, connected between said column and said cylindrical sleeve for rotating said sleeve about said column; and lifting means carried by said column, and operable when said roller is received within said indexing notch to engage and lift said roller out of said notch.

33. An indexing and transfer apparatus as recited in claim 32, wherein said lifting means includes: a pivotally mounted lift arm, arranged with the free end thereof normally positioned below and in alignment with said indexing notch; and hydraulic jack means connected to said lift arm, and operable to raise and lower said free end of said arm.

34. In a machine for making a hollow, elongated cast product; a mold platform having an opening therein that is axially aligned with the lower end of a mold when said mold is mounted on said platform; a rotatable packing head; support means of uniform dimension disposed below and carrying said packing head; means for moving said support means and packing head vertically through said opening and into said mold to maintain casting material in said mold at a substantially uniform dimension, said packing head being rotatable independently of said support means; means extending through said support means for rotating said packing head; and means for vibrating said mold platform while said packing head and said support means are being moved vertically upwardly through said mold, and while said packing head is being rotated.

35. In a machine as recited in claim 34; means, including cushion means, engageable with the upper end of a mold mounted on said mold support for clamping the mold to said support.

36. In a machine as recited in claim 35, wherein said mold support is mounted on means including a cushion means.

References Cited

UNITED STATES PATENTS

| | | | |
|---|---|---|---|
| 1,899,115 | 2/1933 | Schultz | 25—36 |
| 2,530,687 | 11/1950 | Dixon | 25—36 |
| 3,302,262 | 2/1967 | Chanlund | 25—36 X |
| 3,095,628 | 7/1963 | Norton et al. | 25—36 |
| 3,358,342 | 12/1967 | Spence | 25—36 X |

FOREIGN PATENTS

| | | |
|---|---|---|
| 412,048 | 6/1934 | Great Britian. |
| 775,919 | 5/1957 | Great Britian. |
| 173,320 | 11/1934 | Switzerland. |

J. SPENCER OVERHOLSER, *Primary Examiner.*

R. D. BALDWIN, *Assistant Examiner.*

U.S. Cl. X.R.

25—41